Dec. 20, 1966 W. R. WEDMORE 3,293,368
MARKER FOR A COMMUNICATION SWITCHING NETWORK
Filed Aug. 27, 1963 55 Sheets-Sheet 1
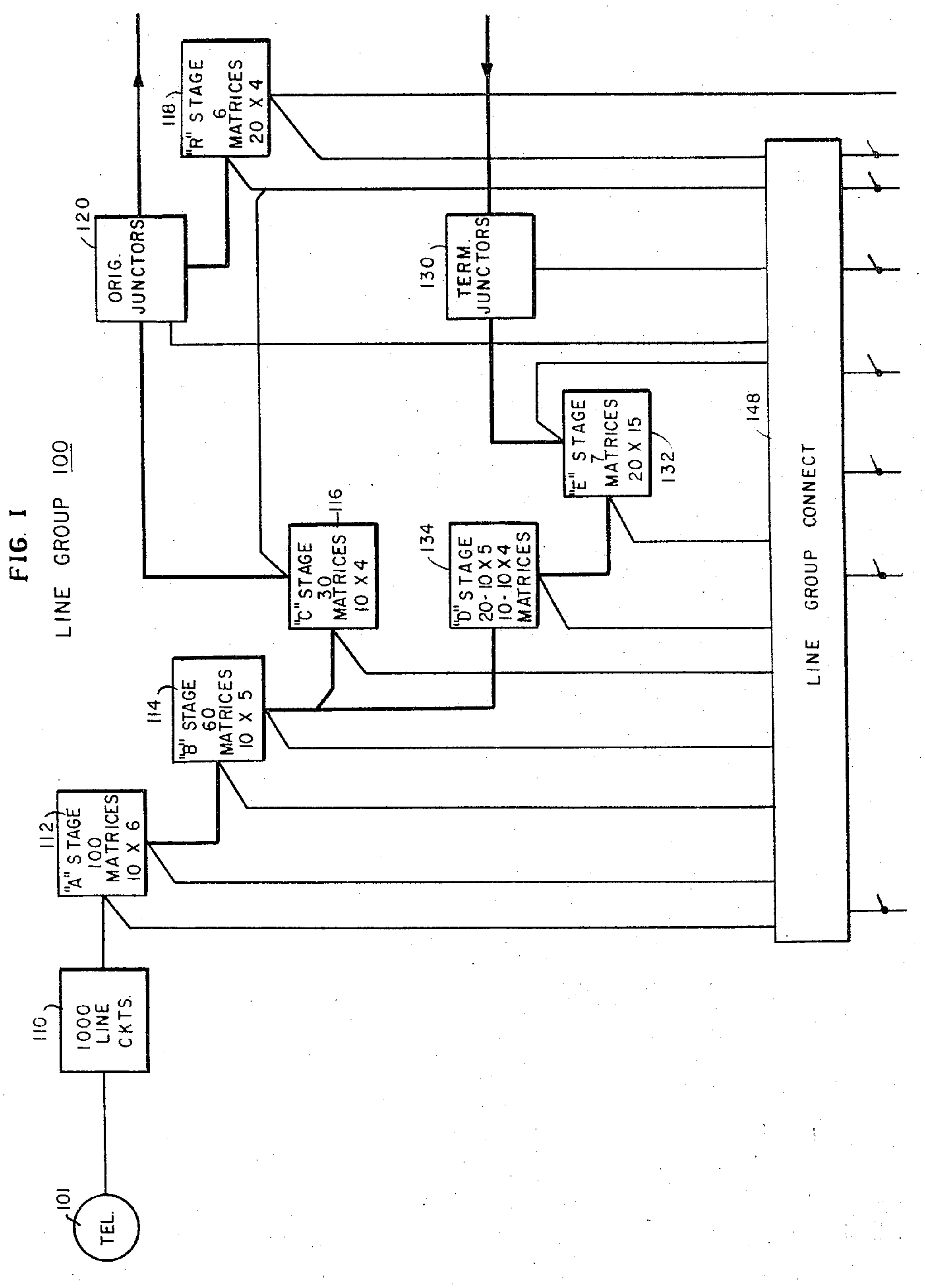
FIG. I LINE GROUP 100

Dec. 20, 1966 W. R. WEDMORE 3,293,368
MARKER FOR A COMMUNICATION SWITCHING NETWORK
Filed Aug. 27, 1963 55 Sheets-Sheet 2
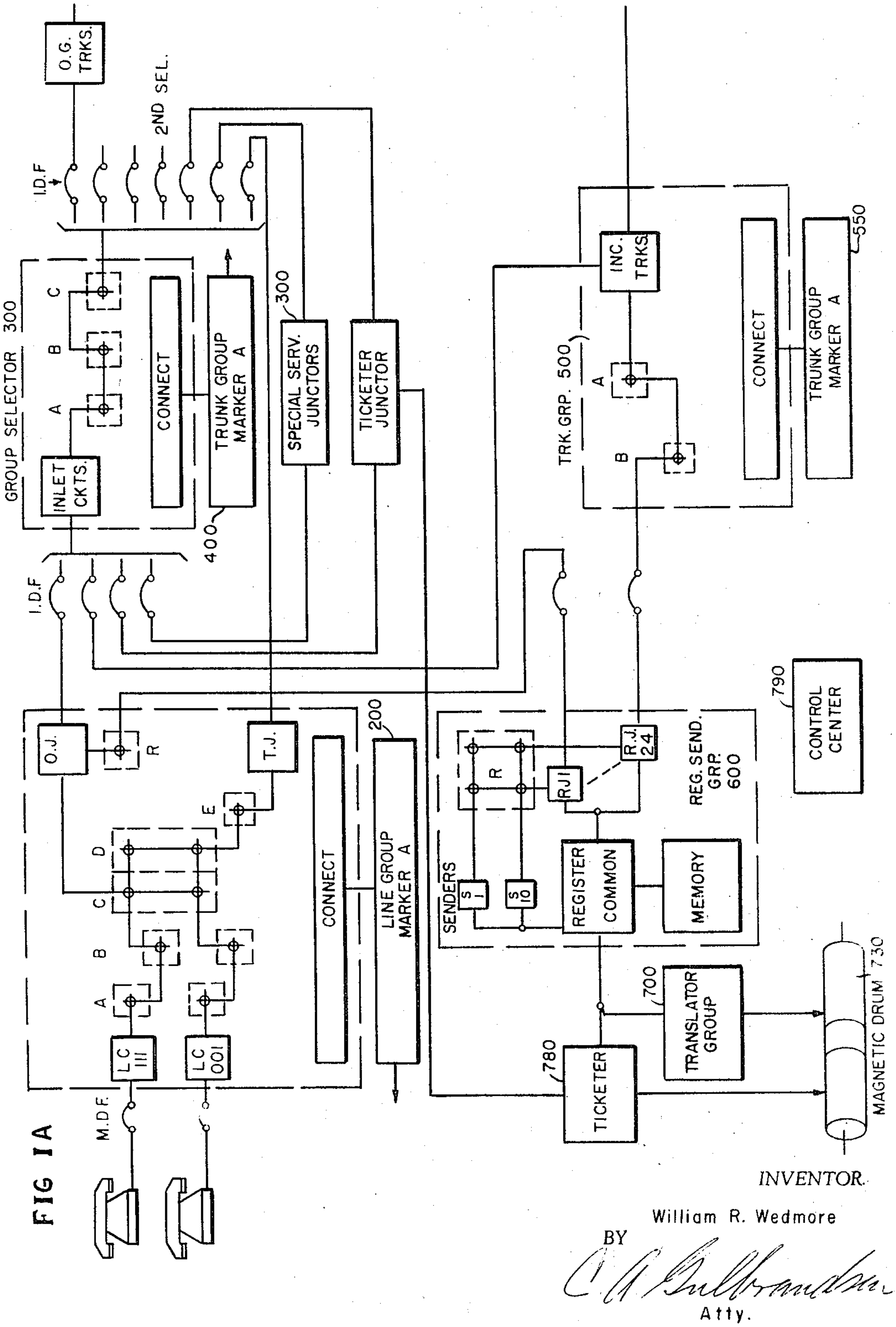
FIG IA
INVENTOR.
William R. Wedmore
BY
C. A. Gulbrandsen
Atty.

Dec. 20, 1966 W. R. WEDMORE 3,293,368

MARKER FOR A COMMUNICATION SWITCHING NETWORK

Filed Aug. 27, 1963 55 Sheets-Sheet 3

LINE GROUP MARKER A 200

GROUP SELECTOR 300

Dec. 20, 1966 W. R. WEDMORE 3,293,368

MARKER FOR A COMMUNICATION SWITCHING NETWORK

Filed Aug. 27, 1963 55 Sheets-Sheet 6

Dec. 20, 1966 W. R. WEDMORE 3,293,368

MARKER FOR A COMMUNICATION SWITCHING NETWORK

Filed Aug. 27, 1963 55 Sheets-Sheet 7

Dec. 20, 1966 W. R. WEDMORE 3,293,368

MARKER FOR A COMMUNICATION SWITCHING NETWORK

Filed Aug. 27, 1963 55 Sheets-Sheet 10

Dec. 20, 1966 W. R. WEDMORE 3,293,368

MARKER FOR A COMMUNICATION SWITCHING NETWORK

Filed Aug. 27, 1963 55 Sheets-Sheet 12

Dec. 20, 1966 W. R. WEDMORE 3,293,368

MARKER FOR A COMMUNICATION SWITCHING NETWORK

Filed Aug. 27, 1963

55 Sheets-Sheet 13

Dec. 20, 1966 W. R. WEDMORE 3,293,368

MARKER FOR A COMMUNICATION SWITCHING NETWORK

Filed Aug. 27, 1963 55 Sheets-Sheet 16

Dec. 20, 1966 W. R. WEDMORE 3,293,368

MARKER FOR A COMMUNICATION SWITCHING NETWORK

Filed Aug. 27, 1963 55 Sheets-Sheet 17

Dec. 20, 1966 W. R. WEDMORE 3,293,368

MARKER FOR A COMMUNICATION SWITCHING NETWORK

Filed Aug. 27, 1963 55 Sheets-Sheet 19

Dec. 20, 1966 W. R. WEDMORE 3,293,368

MARKER FOR A COMMUNICATION SWITCHING NETWORK

Filed Aug. 27, 1963 55 Sheets-Sheet 20

Dec. 20, 1966 W. R. WEDMORE 3,293,368

MARKER FOR A COMMUNICATION SWITCHING NETWORK

Filed Aug. 27, 1963 55 Sheets-Sheet 22

Dec. 20, 1966 W. R. WEDMORE 3,293,368

MARKER FOR A COMMUNICATION SWITCHING NETWORK

Filed Aug. 27, 1963 55 Sheets-Sheet 27

Dec. 20, 1966 W. R. WEDMORE 3,293,368

MARKER FOR A COMMUNICATION SWITCHING NETWORK

Filed Aug. 27, 1963 55 Sheets-Sheet 30

Dec. 20, 1966 W. R. WEDMORE 3,293,368

MARKER FOR A COMMUNICATION SWITCHING NETWORK

Filed Aug. 27, 1963 55 Sheets-Sheet 34

Dec. 20, 1966 W. R. WEDMORE 3,293,368

MARKER FOR A COMMUNICATION SWITCHING NETWORK

Filed Aug. 27, 1963 55 Sheets-Sheet 36

Dec. 20, 1966 W. R. WEDMORE 3,293,368

MARKER FOR A COMMUNICATION SWITCHING NETWORK

Filed Aug. 27, 1963 55 Sheets-Sheet 39

Dec. 20, 1966 W. R. WEDMORE 3,293,368

MARKER FOR A COMMUNICATION SWITCHING NETWORK

Filed Aug. 27, 1963 55 Sheets-Sheet 45

Dec. 20, 1966 W. R. WEDMORE 3,293,368

MARKER FOR A COMMUNICATION SWITCHING NETWORK

Filed Aug. 27, 1963 55 Sheets-Sheet 47

REGISTER SELECTOR

TERMINATING SELECTOR

Dec. 20, 1966 W. R. WEDMORE 3,293,368

MARKER FOR A COMMUNICATION SWITCHING NETWORK

Filed Aug. 27, 1963 55 Sheets-Sheet 51

Dec. 20, 1966 W. R. WEDMORE 3,293,368

MARKER FOR A COMMUNICATION SWITCHING NETWORK

Filed Aug. 27, 1963

55 Sheets-Sheet 53

Dec. 20, 1966 W. R. WEDMORE 3,293,368

MARKER FOR A COMMUNICATION SWITCHING NETWORK

Filed Aug. 27, 1963 55 Sheets-Sheet 54

MARKER FOR A COMMUNICATION SWITCHING NETWORK

United States Patent Office 3,293,368

Patented Dec. 20, 1966

3,293,368

MARKER FOR A COMMUNICATION SWITCHING NETWORK

William R. Wedmore, Glen Ellyn, Ill., assignor to Automatic Electric Laboratories, Inc., Northlake, Ill., a corporation of Delaware Filed Aug. 27, 1963, Ser. No. 304,892
14 Claims. (Cl. 179—18)

This invention relates to a marker for a communication switching network, and more particularly to a marker pathfinding arrangement for a crosspoint switching network.

The principal object of this invention is to provide a pathfinding arrangement which takes advantage of the inherent high speed of electronic components so that each marker may serve a relatively large number of lines on a one-call-at-a-time basis, with an arrangement that is simple and reliable, and which is not critical as to voltage levels and other parameters.

In markers which have generally been provided for networks such as those of the crossbar type, the pathfinding arrangement usually comprises an arrangement using a large number of relays with chain circuits and lockout circuits. The speed of such an arrangement is limited by the use of relays for selection, and hence a single marker can serve only a relatively small number of lines.

There are also known pathfinding arrangements for crosspoint switching networks using breakdown devices in the network in a self seeking arrangement to find available paths. In such arrangements the pathfinding may proceed from end terminals toward center points such as junctors in the network, and then one of the junctors may be selected either by a lockout arrangement or by scanning the junctors for coincidence of a successful path test from each side of the network and the junctor being idle. A scanner in this arrangement requires a connection and a counting step for each junctor in the network. The breakdown devices for path testing are critical as to voltage levels and other circuit parameters.

According to the invention, the marker includes a connect circuit which connects selected groups of links which may be used in a given connection at the points of the possible connections between different tandem stages and connects them through relay contacts to detectors which determine whether the individual links are busy or idle, and from the detector there are connections to coincidence gates of a route selector scanning arrangement. The scanner includes counters driven by a continuous pulse train. Each coincidence gate has an input via a detecting circuit for different points in the tandem network for a single path, and an input from the counter. Thus the counters enable the coincidence gates in turn until coincidence is found, which produces a signal to stop the counters, thereby indicating the identity of the path found.

At a stage in a crosspoint network, each link on one side of the stage may be common to the possible paths via a number of links on the other side of the stage. According to another feature of the invention the group of links on each side of such a stage which appear in possible paths for a given connection are connected through respective relay trees to link test conductors, and an arrangement is provided which responds to a link testing busy on the more concentrated side of this stage to cause a connection to be made from a source of potential through individual resistors to the test conductors on the other side of the stage corresponding to links connectible to the busy link to make these links appear busy.

In a specific embodiment of the invention the path finding arrangement is used in conjunction with a crosspoint switching network of the type disclosed in a copending U.S. patent application by M. H. Esperseth et al. for a Communication Switching System, Serial No. 240,497, filed November 28, 1962, now Patent No. 3,275,752. The network comprises a plurality of coordinate matrices with a relay at each crosspoint, each relay having an operate winding in series with a diode and a hold winding in series with a normally open set of its own contacts. The network is arranged so that through three stages in tandem there is a unique path between a line terminal on one side and an intermediate network terminal on the other side. Through these three stages the operate windings in series with their diodes are connected in series, so that with marking potentials applied at the two ends one and only one path is established through the three stages. The path is then held via the hold windings in series with the normally open contacts in series through the three stages. The holding current flowing via the hold windings thus establishes a particular potential on the hold conductors of the links. According to a feature of the invention the hold conductors of the links are connected via a relay tree to the test conductors of the marker, and the detectors distinguish between the links having this holding current potential and idle links.

For originating calls a fourth stage comprising a number of coordinate matrices provides access to registers. According to another feature of the invention a register selector having a scanner with counters and coincidence gates is used to preselect an idle register while a line identifier is identifying the calling line. This selection of the calling line and a register determines a number of possible paths via particular groups of interstage links. These groups of interstage links are connected via the relay trees to the detectors and thence to the route selector, which is then actuated to find an idle one of these paths. According to the invention, if the route selector does not find coincidence after completely scanning this group of paths, the register selector is then again actuated to select a register access via a different matrix of the fourth stage, and then the route selector is again actuated to scan the different paths. Each time the route selector fails to find available paths, the register selector is again actuated to select a register access via a different matrix. A special counter is provided to count each time the register selector is thus actuated, and if the count shows that scans have been made for registers to all of the fourth-stage matrices a signal is produced for use in generating an all-routes-busy indication and to release the marker apparatus.

For terminating calls the network includes a fourth stage between terminating junctors and the intermediate network terminals. The path finding arrangement of the marker includes a terminating call selector having a scanner with counters and coincidence gates to identify a terminating junctor having a terminating-call service request. A feature of the invention provides an arrangement to use the same counters and coincidence gates of the scanner twice, the first scan being to identify the particular matrix of the fourth stage on which the terminating junctor appears, and the second scan being to identify the particular terminating junctor on that matrix.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 to 55 wherein;

FIG. 1A is a block diagram of a telephone switching exchange;

FIGS. 1 to 7 comprise a more detailed block diagram of the exchange;

FIGS. 8–11 show the arrangement and interconnection of the switching matrices in a line group;

FIGS. 12–39 comprise a schematic and block diagram of a line group and line group marker;

FIGS. 40–43 comprise a symbolic block diagram of the marker send-receive circuit;

Figure 52:
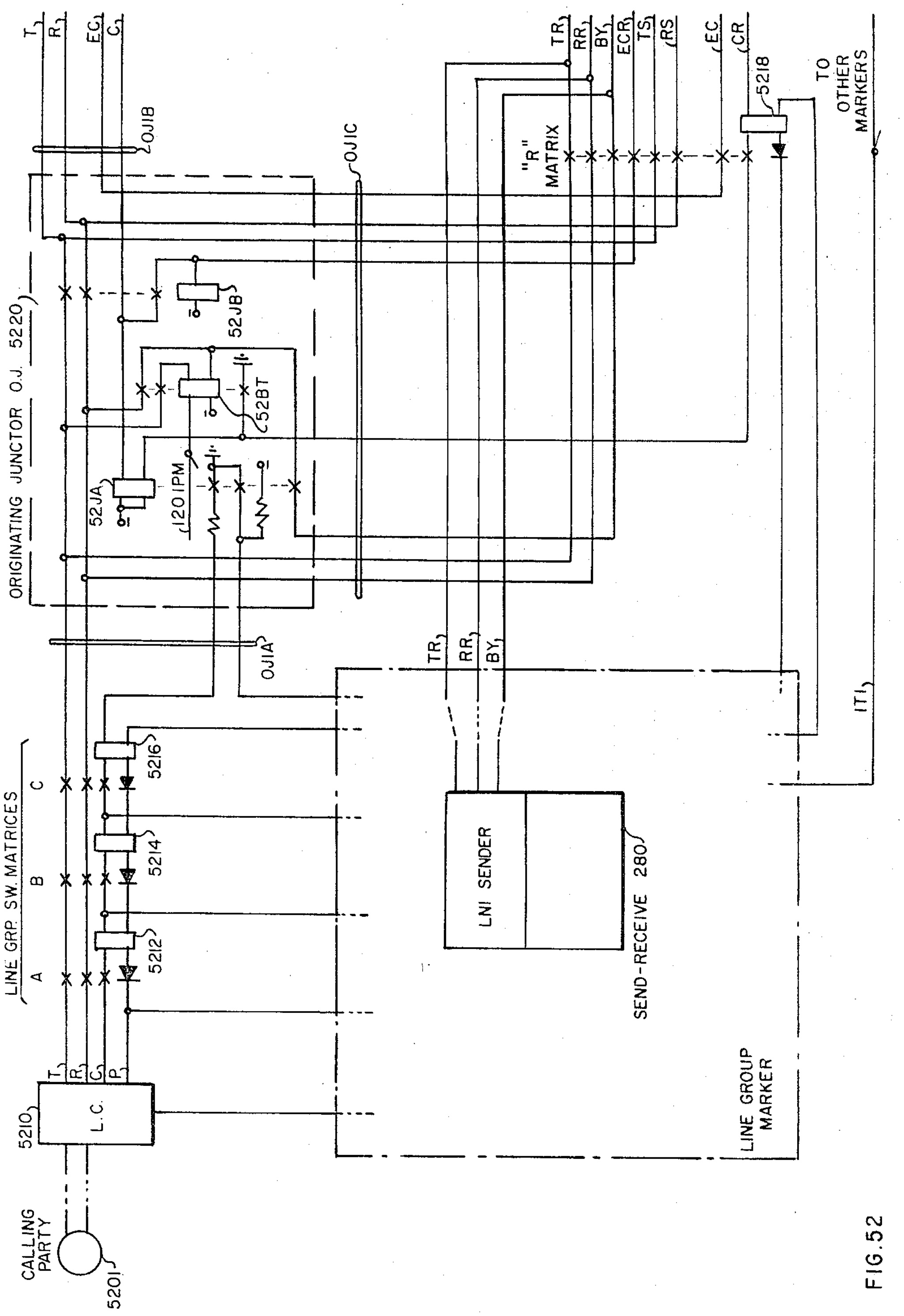
Figure 53:
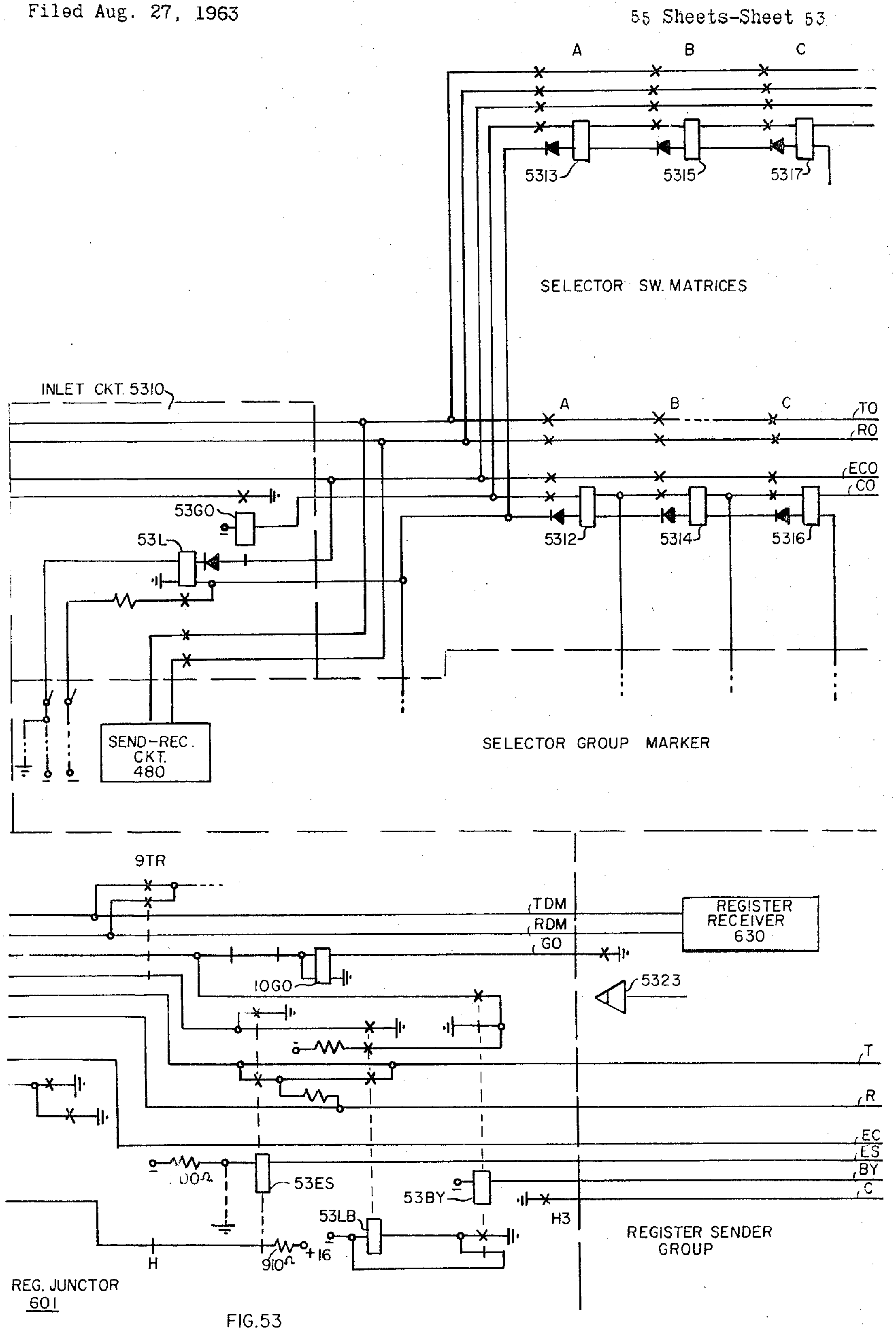
Figure 54:
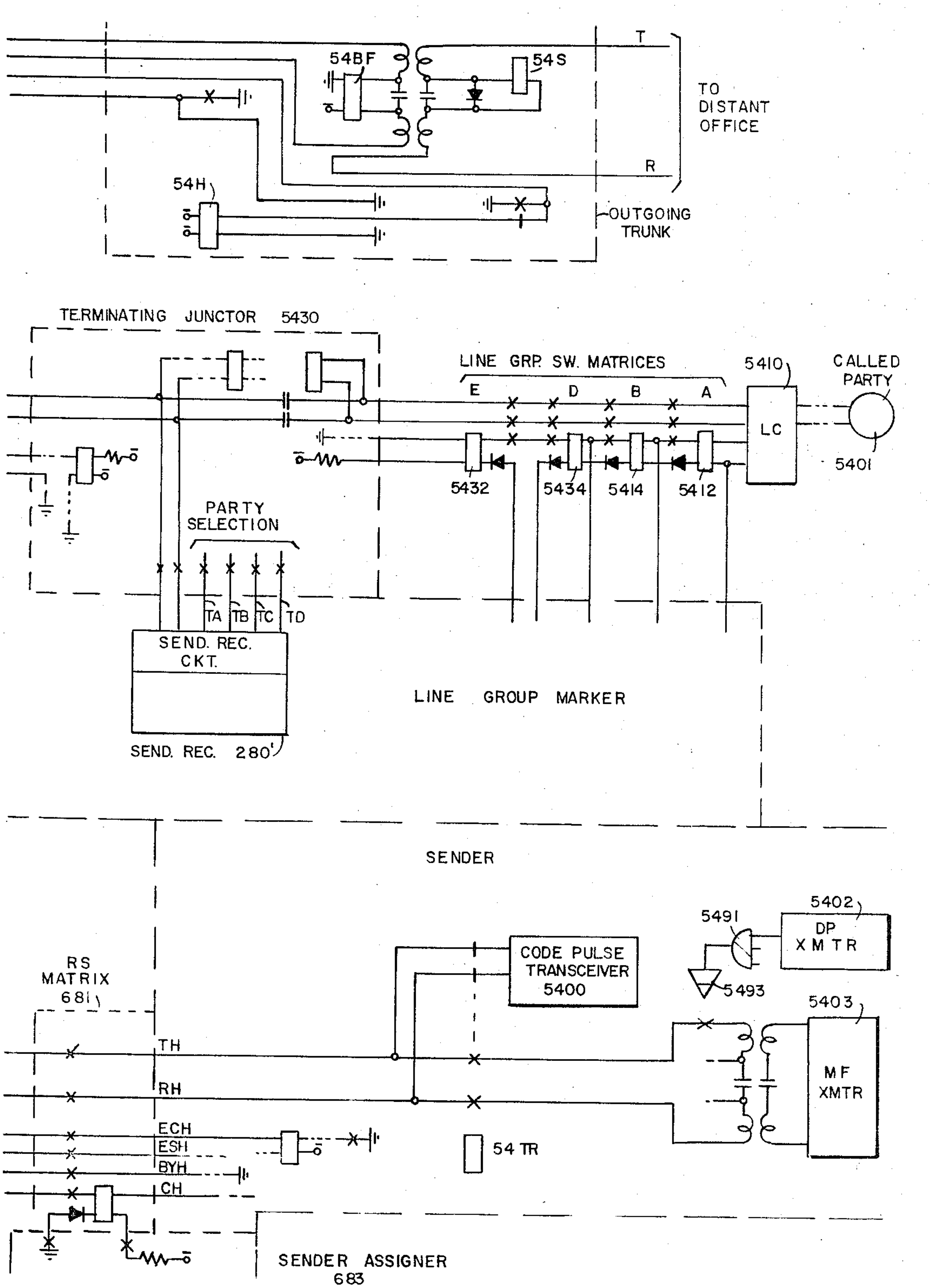
Figure 55:
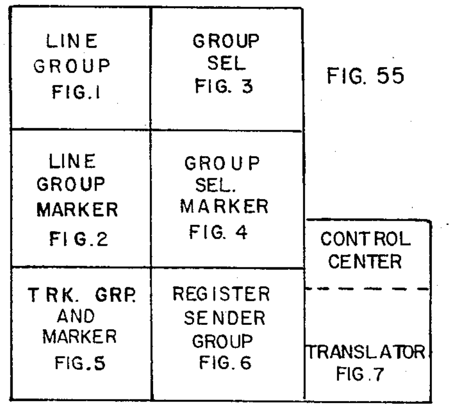
Figure 56:
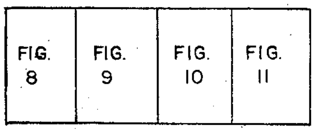
Figure 57:
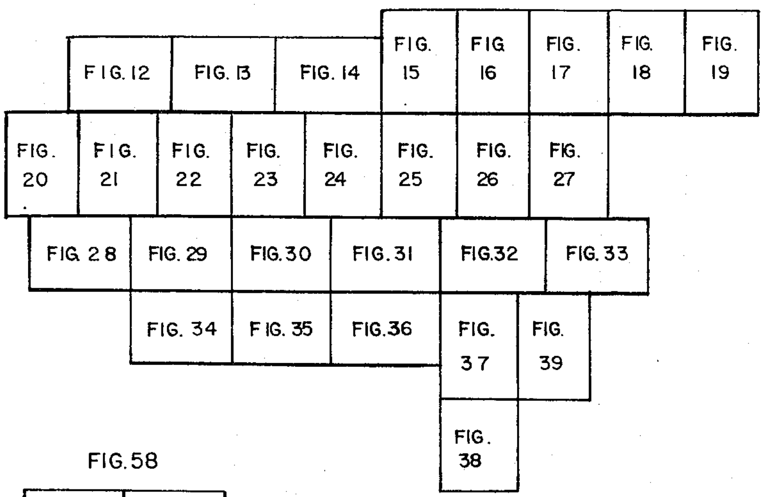
Figure 58:
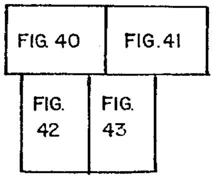

FIGS. 52–54 comprise a call-through diagram of the system;

FIG. 55 shows how FIGS. 1–7 are to be arranged;

FIG. 56 shows how FIGS. 8–11 are to be arranged;

FIG. 57 shows how FIGS. 12–39 are to be arranged;

FIG. 58 shows how FIGS. 40–43 are to be arranged; and

Figure 59:
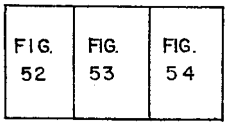

FIG. 59 shows how FIGS. 52–54 are to be arranged.

SYSTEM ORGANIZATION

A system incorporating the invention is described in the following copending applications:

K. K. Spellnes, Communication Switching System, Serial No. 230,887 filed October 16, 1962, now Patent No. 3,170,041;

M. H. Esperseth et al., Communication Switching System, Serial No. 240,497 filed November 28, 1962, now Patent No. 3,275,752;

K. E. Prescher et al., Communication Switching System Common Control, Serial No. 231,625 filed October 19, 1962, now Patent No. 3,173,994;

Lucas Bruglemans, Line Identifier Arrangement for a Communication Switching System, Serial No. 231,425 filed October 18, 1962, now Patent No. 3,211,837;

Boris Sherstiuk, Sender for Communication Switching System, Serial No. 280,053, filed May 13, 1963.

A parallel test arrangement used herein to preselect a register is covered by a copending application of W. B. Klees et al. for a Communication Switching System and Outlet Testing Circuit Arrangement Therefor, Serial No. 254,750 filed January 29, 1963, now Patent No. 3,210,478.

Referring to FIG. 1A, and FIGS. 1–7, the system consists of the line group 100, group selector 300, register-sender group 600, and the translator 700. There is also a trunk group 500 which provides access from incoming trunks to the registers, and a control center 790 which contains a special computer for operation analysis and recording, and program upgrading equipment.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. The markers are designed on an electronic basis and semi-conductor circuitry is employed throughout the system. A ferrite core memory 660 is used for temporary storage whereas the magnetic drum 730 is used for semi-permanent storage.

The space division switching elements of the system consists of reed relay matrix assemblies in configurations of 10 x 6, 10 x 5 and 10 x 4. The crosspoints are made up of reed capsules and have normally two windings. They are mounted on a two layer printed card and the entire assembly constitutes a switching matrix. In some cases the cards are wired together to form a single larger matrix. The system contains no conventional telephone relays, but, similar functions are performed by reed relays. A reed relay assembly is essentially a cluster of magnetic reed elements controlled by coil windings and with or without a permanent magnet. For further description of the reed relay assemblies and crosspoint matrix assemblies the following pending United States patent applications may be referred to:

E. J. Glenner and K. K. Spellnes, Crosspoint Switching Arrays, Serial No. 127,237, filed July 27, 1961, now Patent No. 3,188,423.

G. S. Lychyk and A. Taliste, Dry Reed Relays, Serial No. 127,648, filed July 28, 1961, now Patent No. 3,128,356.

P. K. Gerlach, G. J. David and R. O. Stoehr, Printed Matrix Board Assembly, Serial No. 132,897, filed August 21, 1961, now Patent No. 3,193,731.

The electronic logic circuitry employs eight standard circuits as building blocks. These standard circuits include NOR gates, inverters, flip-flops, clocks, gated pulse amplifiers, parallel test circuit, parity circuit, and reed relay driver. All of these circuits are implemented on double or single-sided printed cards, 6 inches by 5½ inches.

The two switching stages, the line group and group selector may not necessarily be installed in the same building. The line group may be remotely located and will then operate as a satellite office. No register-senders will be needed in the satellite, but a transceiver will provide for sending and receiving of switching information between the markers of the satellite and the register-senders in the main office.

The signaling between the system groups is accomplished by a technique called di-phase. This method employs a phase shift technique for serial sending and receiving of pulses.

The group selector may, in connection with the register-sender group and the translator, operate as a trunk tandem office and for this purpose the line group is not necessary. By using matrices with six reed capsules per crosspoint, this group selector marker may accommodate 4-wire switching.

The reason for this flexible operation of the system lies in the fact that the register-sender group, in connection with the storage in the translator, has sufficiently built-in features for the above described operation.

TRACING OF A LOCAL CALL

As an introduction to the system operation, a brief description of a typical local call as processed through the system is now presented. The block diagram may be followed for tracing the call. A more detailed explanation of the system operation will be found under discussions of the separate system sections that will follow.

When a subscriber lifts the handset, the line group marker 200 goes into action first by detecting the originating call mark, identifying the calling line, and selecting an idle register junctor within the register-sender. A path is then temporarily established from the calling telephone to the register junctor via the A, B, C, and R matrices, and the subscriber receives dial tone. The dialed digits are stored temporarily, coded, and processing is continued as these digits are passed to the translator 700, analyzed for type of incoming call, and instructions are selected from the drum memory 730 and returned to the register-sender 600 to guide further handling of the call. Upon receipt of the remaining digits, the translator 700 returns switching instructions corresponding to the called number as stored in the drum memory 730. The instructions are transmitted from the register-sender 600 via one of the senders 671–680 and the originating junctor 120 of the originating line group to the group selector 300. In the group selector 300, the instructions are analyzed by the marker 400, an idle terminating junctor 130 in the terminating line group is located, and a path established to that line group via A, B, and C matrices of the group selector. The remaining instructions are followed by the line group marker to locate the called line terminals, select and seize a path from the terminating junctor through the E, D, B and A matrices to the called line. The terminating junctor establishes ringing, answer supervision, and talking battery for both parties when the call is answered.

Since the system is a common control operation, the markers of the line group and group selector function only to serve the assigned portion of the call processing then release to serve other calls. The register-sender 600 and the translator 700 are functioning on a time division basis and therefore are processing several calls simultaneously. The temporary signaling and control paths are released for further service while only the talking paths are held through the switching matrices and junctors.

THE LINE GROUP

*Line group matrix*

This section of the system may be thought of as a large switching unit capable of connecting any one of 1000 lines originating calls to any one of 120 circuits called originating junctors 120. Likewise, this unit is capable of connecting any one of 120 circuits called terminating junctors 130 and representing incoming calls to any one of the 1000 lines served by this line group. Crosspoint matrices constitute the switching network and provide concentration going outward for originating calls, and expansion going inward for terminating calls. For practical and economic reasons, three stages, A, B, and C, make up the outgoing switching stages. Four stages, E, D, B and A, make up the incoming switching stages. The 1000 subscriber lines divided into ten groups of 100 each, are located on the main distributing frame and from there are jumpered directly to the A stage 112. No intermediate distributing frame is required. The A stage has 600 outlets or links (60 for each of the ten "hundreds" group) appearing as inlets to the B stage 114. The B stage, in turn, has 300 links (30 for each "hundreds" group) appearing as inlets to the C stage 116. The C stage has 120 links to originating junctors 120. The originating junctors provide by-paths via the "R" stage to twenty-four registers and also provide access to the inlet circuits 310 of the group selector 300. With this switching configuration, a fully equipped line group is capable of handling a maximum traffic of three unit calls per line in each direction at a grade of service better than .01.

The switching stage matrices are made up cross-point reed relays, 15,000 for a fully equipped 1000 line group or 15 per line (12 per line for two unit calls per line). The reed relay coil has two windings, an operate (or pull) winding and a hold winding, and has three contacts. Two of the contacts switch the transmission loop. A third locks the hold winding to the sleeve or "C" lead.

The subscriber's line equipment is similar to a conventional line and cut-off circuit except that reed relays are used and fewer contacts are required. Reed relays were chosen over a static line circuit for simplicity and reliability of operation and for electrical isolation of electronic apparatus from outside plant disturbances.

A maximum of thirty subscribers in a given hundreds group may be engaged in different conversations at one time. One originating and one terminating junctor, two each of A and B crosspoint reed relays, and one each of D, C, and E crosspoint reed relays are held in the line group per conversation. Registers are held only during dialing.

The originating and terminating junctors mentioned earlier are reed relay circuits performing several functions. The originating junctor provides loop splitting facilities for an originating call. Initially, a transmission path is provided from the calling line to register and an additional path is provided from register to group selector for early outpulsing. When the called line is reached, the originating junctor switches the calling line through to the terminating junctor via the group selector. The circuit also provides a busy tone bridge in the event of no link availability.

The terminating junctor performs functions necessary to extend the call to a called subscriber. It provides a path into the line group marker for signaling between the code receiver in the marker and the sender circuit. The circuit provides regular or party line ringing controls, ring back tone, and ring cut-off controls. When line busy is encountered, busy tone is provided at this point. It provides transmission battery feed for both called and calling parties. On test calls and busy verification calls, the junctor removes the battery feeds and switches the calling line metallically through to the called line. For official calls, answer supervision is disabled within the junctor to prevent charging of the calling end. Thus, it is seen that special service calls are also handled by the terminating junctor via the regular switching network eliminating the need for a special switch train.

*Line group marker*

Two markers 200 are always provided and the 1000 line groups are divided between the two up to a maximum of five line groups per marker. Each marker serves its associated line group matrices on an allotted basis, but, is also capable of assuming the load of its companion marker.

In its idle state, a marker continuously scans for requests for service from the line groups with which it is associated. Upon recognizing a call, either originating or terminating, in a particular line group, it locks out all other groups via its allotter and allows the connect circuitry of the selected group to switch in the matrix leads into the marker for processing. Approximately 400 leads are so controlled. All calls in the allotted line group are processed before the marker returns to its idle state to serve other groups.

When connected to a line group, the marker has two primary functions, connect a line originating a call through the matrices and originating junctor to a register and to connect a terminating junctor (representing an incoming call) through the matrices to the called line. Both reed relays and electronic circuitry are used to perform these jobs. The electronic circuitry provides all logic and scanning operations requiring high speed. Reed relays are used merely for connecting purposes, to switch in the necessary groups of leads into the electronic circuitry for analysis. With this combination of components, the processing of a request for service by the line group marker is accomplished in approximately 100 milliseconds.

For each function, the marker performs several tasks. In general, for originating traffic, it must provide line number identification, pathfinding and route selection, sending of line number identification, class of service (225), and line group identity. For terminating traffic, it must provide terminating junctor identification, transceiver for communicating with the sender circuit, access to called line for busy test, PBX selection, and pathfinding and route selection.

The tasks performed by the marker in processing a call are controlled by a sequence and supervisory circuit 290. This control may be compared to a programmed computer in that the marker follows a fixed plan of operation. All marker operations are governed by this control.

Included is the clock circuit which provides pulses to synchronize operations within the marker and the timing circuitry which is used to generate various time-out periods such as that provided between a reed relay operation and a succeeding electronic scanning operation. Once the supervisory control recognizes a request for service, either terminating or originating, it will process this call from beginning to end, locking out all other calls.

*Operational description*

The line identifier provides a unique identification of one calling line from the group of 1000 lines. In the event of a simultaneous request for service by two or more lines, all lines but one are excluded from the processing. By means of a contact on the line reed relay, the identifier recognizes a request for service and is able to provide a three digit line identification—hundreds, tens and units. Thus, it is possible to uniquely mark one of the one thousand "pull" leads at the inputs to the "A" stage matrices. Reed relays are used for a "tree" configuration to reach the desired "pull" lead after the identity has been made.

Pathfinding consists of establishing an idle route through the A, B, C and R matrices from the identified calling line to a register. The marker, after the line identity, preselects any idle register located on the outlets of the R matrix. The term "preselect" is used in that the selection is conditional upon whether an idle route exists back to the calling line. Having preselected a register, the marker now has sufficient information to gate all originating junctors and BC links that can be reached from these two end points. The BC links will be marked busy or idle depending on whether they themselves are busy or idle. It now becomes a simple matter to scan these possibilities for an idle route. If no idle path can be found, another register is preselected which then presents other route possibilities. Having found an idle route, all information for completing the connection is available.

When acknowledgment is received from the register after marker information has been outpulsed, a "pull" potential is applied at the C matrix outlet to pull up in series the A, B, C crosspoints to the potential applied by the identifier at the input to the A matrix. Another "pull" potential is applied to the "R" matrix outlet to pull up the "R" crosspoint. This A to C and R pull connection will be held until the cut-off reed relay operates.

At a signal from the register-sender circuitry the line number and line group identity is electronically pulsed out to the register-sender via the link connecting the "R" matrix and the register. Serial sending of information using high speed pulsing is employed.

The register acknowledges receipt of information and returns a command to the originating junctor to ground the C lead. The C lead holds the matrix connections and operates the cut-off reed relay that, in turn, grounds the pull lead. This signal is recognized by the marker, and the supervisory control removes the pull potentials. Rather than clearing out immediately, the marker waits a few milliseconds to see whether the connection is actually good, which means being held via the "C" lead. If all checks out, the marker enters a "clear out" interval where all functioning circuits are permitted to restore to normal before attempting to process other awaiting calls.

A terminating junctor scanner detects terminating calls awaiting service. This scan is the first to be made after a marker cycle has been completed in order to give preference to terminating calls. With identification of one of the 120 terminating junctors requesting service, the transceiver of the marker is switched to the junctor to receive from the sender the called line number identity and ringing frequency.

The address of the called line is gated into that portion of the identifier which has access to the "pull" leads. If the called line is busy, its cut-off reed relay has been operated and the identifier will find the busy ground on the pull lead. If the line is idle, the identifier is positioned at the called line pull lead and ready to apply the pull potential subject to the command of the supervisory control.

This function operates in principle the same as that described for processing originating traffic. Knowing the called line identity and the terminating junctor identity, the marker can analyze all possible routes through the A, B, D and E matrices between these two end points and select one route that is idle. Application of pull potential awaiting cut-off operation and verification of holding follows as before.

A two-way communication path exists between the marker processing a terminating call and the sender circuit. In addition to receiving the called line number and any special instructions regarding the line, the marker may signal back to the sender any conditions peculiar to the line such as line busy, line idle, link congestion, recycle and send again, and be referred back to the sender for appropriate action.

If on a terminating call, the marker transceiver received a PBX call indication, a PBX selector circuit marks all lines in the PBX group and enables the line identifier to make a sequential test to select the first idle line. A maximum of 200 lines may be allocated within a 1000 line group for PBX service. Assignment of lines to a PBX group does not require consecutive numbering allocation.

THE GROUP SELECTOR

*Group selector matrix*

The intermediate switching functions of the system are performed by a group selector 300. Three stages of crosspoint switches are provided. The first switching stage 312, the A stage, contains 60 cards of 50 crosspoints, each arranged in a 5 x 10 matrix. This switching matrix is associated with the inlet circuit 310 line and cut-off reed relays to the group selector. The second switching stage 314, the B stage, contains 60 cards of 60 crosspoints each in a 10 x 6 matrix. The third stage 316, the C stage, uses a basic arrangement of 60 crosspoints in a 6 x 10 matrix to provide 600 outlets. In addition, a second group 317 of 60 switches may be added to expand the outlet capability of 1200 in case of a very large central office. The group selector has 300 inlets 310 serving the originating junctors in the line groups and incoming trunks.

The outlets of the group selector are arranged as 120 levels of 10 trunks each. These levels may be combined to accommodate trunk groups of any size.

*Group selector marker*

The operation of the group selector is controlled by an electronic marker. The marker has control of all crosspoints in the group selector and sets up calls on a one-at-a-time basis. The marker operates in response to selection digits received electronically in its transceiver from the register-sender group. The holding time of the marker is approximately 100 milliseconds.

Because of the common control nature of the marker, and its high speed, it is possible to provide switching features that would otherwise require a large investment in the form of additional switching stages.

Alternate route selection is performed by the group selector marker. In selecting an alternate route, the marker will identify this trunk group as one that requires a change in the digits to be outpulsed or a change in the type of outpulsing, multi-frequency or dial pulse. In this case, the marker will send back instruction regarding digit changes or a command for the sender to change the type of pulsing. If no change is required, the marker can switch the call through to an alternate trunk without changing the sender's instructions.

Special service junctors 330, shown on the system block diagram at the outlet of the group selector, are used for add-on conference calls, coin-box completing, PPCS, annoyance calls, etc. These junctors may be inserted into connections on command from the program written on the magnetic drum.

The group selector marker is equipped to identify ticketing trunks and relay this identity to the register-sender group. This permits ticketer storage functions to be placed on the magnetic drum eliminating the need for storage facilities in the ticketing trunk.

*Operational description*

As in the line group, two group selector markers are always provided. Each may be associated with a maximum of five group selector units and is also capable of assuming the load of its companion marker. The principle of call recognition, matrix allotting, matrix connecting, matrix transfer are the same as described for the line group.

In its idle state, the group selector marker is continuously scanning the group selector matrices for new calls. The register-sender group, via an originating junctor or incoming trunk, initiates a demand on a group selector by pulling the inlet line reed relay. When associated with a matrix, the marker finding the inlet demanding service stops its scanning at that point and connects a transceiver to the demanding inlet. The routing digits are sent in high speed code from the sender into the marker transceiver. During this same time, the marker operates connect reed relays to determine the link availability from the demanding inlet in the A stage toward the outlets through the B and C stages. Two routing digits are received by the transceiver in the marker and extended to the trunk selection portion of the marker where connect reed relays gate idle test leads of the selected trunk group into the trunk scanning portion. Within this scanner the link availability is combined with the trunk idle leads such that an idle trunk can appear idle to the scanner only if an appropriate idle link to the inlet exists.

If the trunk scanner finds an idle trunk, it pulls the proper group selector crosspoints, checks to make sure that the selected trunk becomes busy indicating seizure through the group selector crosspoints, and clears its circuits.

If an idle trunk is not found, the marker checks its alternate routing equipment for an alternate. An alternate route causes new connect reed relays to operate in the trunk selector portion and a new trunk scanning operation takes place for the alternate.

THE TRUNK GROUP

*Trunk group matrix*

The trunk group 500 provides access for incoming trunks from outside of the office or for special intra-office trunks such as operator or wire chief. A trunk group matrix is capable of connecting any one of 75 incoming trunks to any one of sixteen registers on a single output level basis. All trunks in the same group of 75 are either dial pulse (DP) or multi-frequency (MF). Trunk group matrices are added as required to handle large numbers of incoming trunks. Each matrix is independently controlled but outlets are graded to provide sharing of registers.

The trunk group matrix is comparable to the R stage of the line group matrix. The incoming trunk is equipped with loop splitting facilities, and access is provided from a trunk to a register and an additional path is provided from the register-sender to an inlet circuit of the group selector. When the call has reached its destination, the incoming trunk switches through to the established path and the crosspoints of the trunk group matrix associated with this call are released by the register-sender.

The matrix consists of a two stage network of crosspoint switches. The incoming trunks, divided into five groups of fifteen trunks each, appear as inlets to the first stage, the A stage. The A stage has twenty outlets or links (four for each of the five groups) appearing as inlets to the B stage. The B stage has sixteen links to registers. Both stages use a basic arrangement of twenty crosspoint switches in a 4 x 5 matrix unit. Three units are wired together to give the 4 x 15 matrix unit used in the A stage, while four single units make up the B stage.

*Trunk group marker*

The operation of the trunk group matrix is controlled by an electronic marker 550 which has control of all reed relays and sets up connections on a one-at-a-time basis. The marker operates in response to a call for service from a trunk group and sets up a path based on information concerning the condition of a register junctor (busy or idle) and the condition of any link (busy or idle). The holding time of the marker is approximately 50 milliseconds which is well within the interdigital switching time of any direct controlled system.

*Operation description*

As in the line group, two trunk group markers is continually monitoring the matrices for new calls. After the call is identified, the register junctors are scanned. Link availability information is combined with the scanner output such that an idle register junctor can be selected only if an idle link exists to that junctor.

Before operating the matrix crosspoints, the class-of-service of the trunk is detected. An incoming trunk may be assigned any one of 225 classes-of-service by a simple strapping operation. The class-of-service, trunk group and trunk identity are electronically pulsed out to the register-sender via the link connecting the matrix and the register. High speed serial sending of information is employed.

When the register acknowledges receipt of information, the connection is established through the matrix and held by the register junctor. If all operations are successful, the marker enters a "clear out" interval when all functioning circuits are permitted to restore to normal before attempting to process other awaiting calls. If no registers are available, the "clear out" period is entered immediately.

THE REGISTER-SENDER

The register-sender group 600 is a time shared, common control unit with the ability to register and process twenty-four simultaneous calls. The fully equipped unit consists of twenty-four registers and ten senders.

The registers operate in a time division mode. There is one register junctor for every register in the group. Real time to time division entry is provided by this circuit. A common control unit comprises time divided circuits which are shared by all twenty-four registers. These circuits are used by each register in turn and are organized to provide the needed registration and process control for the registers. A temporary storage facility is provided for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multi-frequency, or code pulse manner.

Communication with the system translators, line group markers, trunk markers, and group selector markers is accomplished by high speed serial transfer of digital information using di-phase.

*Circuit description*

In order to facilitate understanding the following brief description of each of the circuits within the register-sender group is given.

The primary function of the register junctors 601–624 is to provide a buffer between the electronic equipment and the outside plant facilities. As such, the circuit employs reed relays for all switching functions, performing all those functions that require direct connection to the calling line or trunk. These include dial pulse repeating, dial tone control, battery feed for the calling line or trunk, calling station identification on party lines, test for coin deposit, coin refund, and test for coin refund. The circuit also controls the switch train and provides for peg count and traffic metering. Both multi-frequency and dial pulse junctors are used.

The sender circuits 671–680 provide means for transferring information (dialed digits or switching instruction) over the voice transmission path from the register-sender to the office markers or to distant offices. The sender is a universal sender inasmuch as it provides all modes of sending required by the system. Di-phase sending is employed for transmission of switching instructions to the office markers. The di-phase part of the circuit is actually a transceiver since it provides a means of recieving instructions from the markers as well as sending to the markers.

For outgoing calls, the sender provides for both dial pulse and multi-frequency signaling. The circuit operates in conjunction with the sender controller 670 which is common to all senders in the register-sender group. The sender controller supplies the sender with the digits to be sent out and indicates the mode of sending to be employed.

The sender circuit is mainly an electronic circuit except for outgoing loop supervisory equipment where reed relays are used.

The register receiver 630 is seized by the register controller 664 and assigned to serve the register junctor on a hold-til-finished basis. The circuit receives either the line number identification generated by the line markers or the trunk number identification generated by the trunk markers. On seizure of the circuit, a di-phase link is established to the marker being served. When all the digits have arrived in the register receiver, the information is presented to the register controller for storage in the area of the ferrite core array 660 associated with the register being served. Upon completion of this storage process, the register receiver 630 is released for use by the next register requiring service.

The time division generator 691 generates the time slot pulses, sub-time slot pulses, and control pulses that allow the common equipment to operate in a time division mode.

The time slot pulses create a unique time slot for each of the registers in the group. In association with a group of cores in the core array 660, they allow a true time division multiplex mode of operation.

The sub-time slot pulses allow the use of a folded word type memory; wherein each sub-time slot accesses a section of the information stored in those cores accessed by a particular time slot.

The control pulses allow the controlled generation of decisions while in a particular sub-time slot.

The register controller 664, operating on a time division multiplex basis, controls the progress of each call being processed. Within a particular time slot, this circuit updates the information in storage in the section of the core array associated with the time slot register. This updating takes place on a sub-time slot basis and is the result of changes in the information presented since the time slot was served last.

All information entering the register-sender group is available to the register controller for proper storage and interpretation.

The memory read and write control 661 generates the proper current pulses needed to read and write the cores of the ferrite core array.

The ferrite core array 660 is a sequential access, time slot oriented, temporary storage facility. Each register is assigned a group of cores, which only the time slot with which it is associated can access. This group of core is accessed in sections by the sub-time slots. Each section of the cores stores part of the total available information. The first section contains registration and translation control information. The second contains sender control information. The third and fourth provide for storage of as many as thirteen dialed digits. The fifth contains the line or trunk identity unless a line number translation has been performed. If a line number translation is performed, the calling party's directory number is stored in these cores. The sixth section contains the translated switching digits.

Since each section contains forty cores and each time slot accesses six sections, the total number of cores per register is two hundred and forty. The total ferrite core memory size per register-sender group is 6,600 cores, wherein one complete register storage is reserved for routining and trouble analysis.

The read-shift buffer 662 provides a buffer storage for the memory readout. The read-shift buffer is also utilized to shift information, in a particular sub-time slot, from one core position to another. The read-shift buffer, by temporarily holding the contents of a section of the memory word, provides a means for this information to be transferred to other circuits within the register-sender group.

The carry buffer 663 provides a place where information read from the memory during different sub-time slots can be accumulated until a time is reached, within the time slot, when a decision can be generated on the basis of this information. As a result, by accessing the cores containing the registration and translation control before the time slot is over, an up-dating process is accomplished based on the decisions made during the time slot.

The register transceiver 690 operates as the communication device for information transfer between the register-sender group and the system translators. It, like the register receiver, operates on a hold-until-finished basis. This circuit provides two-way di-phase serial communication between the translators and the register-sender group. The organization of this circuit is such that the transfer of information from the read-shift buffer to the register controller is in a parallel manner. Seizure is dependent on the condition of the control information available in the carry buffer.

The register transceiver 690 is also used to send information to the ticketer 780.

The sender controller 670 utilizing information available to it in the read-shift buffer, controls the flow of information to be sent by the sender in use. It forwards control signals to the proper senders such as mode of send signals, end of send signals, and release signals. It presents to the senders the appropriate switching, and if necessary, dialed digits for proper routing of the subscriber's call. These digits are obtained from the read-shift buffer under the control of the register controller. The sender controller circuit operates in a time division mode and thus serves all registers during each system cycle.

The sender assigner 683, on request of the register controller, will connect an idle sender to the register junctor requiring service. The connection established by the assigner is the beginning of the terminating switch train, which will be extended by the system switching stages on information received from the sender. The sender assigner operates on a hold-until-finished basis.

*Operation description*

The register-sender group is a combined local and incoming unit and will handle and process calls of the types of which this local call is one of many possibilities.

Upon removal of the hand set by the calling subscriber, the line marker 200 identifies the line and searches for an idle register junctor. After finding an idle register junctor, the line marker determines if a path can be established from the calling line to that register junctor. If so, the line marker extends a call signal through the register junctor and into the register. This signal is recognized by the register controller during the time slot permanently associated with the register junctor requesting service.

This request for service command causes the register receiver to be attached to the register junctor as soon as it is available. Once the register receiver is seized, a "GO" command is extended to the line marker awaiting service. The line marker then forwards the line identity to the register receiver for storage in the register's core storage area.

As soon as the line identity information is successfully stored, the register receiver is released and a hold signal is sent to the register junctor. This signal causes a release of the line marker and the extension of dial tone to the calling subscriber.

The subscriber dialed digits are repeated by the register junctor on to the time division multiplex "pulse highway." As each pulse is recognized by the register controller, it causes the dialed digit storage information, associated with the register, to be up-dated. As the digits accumulate, they are stored and shifted to their proper location within the register's storage area.

As soon as the first three dialed digits have arrived, a request for the register transceiver 690 is generated and the process digits are coded. The series of digits, called the processing digits, that are contained in the registration and translation control storage area, are given the binary coded decimal values that initiates the translation operation.

This preliminary coding of the process digits will be used by the system translators to select the proper mode of translation. It should be noted that from this point on, in the processing of the call, the register controller will never generate any further coding of the process digits. Each time the system translators return information to the register-sender group, the process digits will also be returned. The register controller, on the basis of changes made in the binary coding of the process digits by the translators, will proceed to the next step in the handling of the call. The register controller is organized in a manner that allows it to obey any of the possible instructions and sequence commands inherent in the process digits.

Since a request for the register transceiver has been written, this unit will be seized as soon as it is available. The three dialed digits, the class of service digits, the process digits, will all be loaded in a parallel manner into the register transceiver, from the read-shift buffer. The register transceiver requests the service of an idle system translator and as soon as one is attached transmits this information, via a di-phase link, to the translator. For the local call being made the translator will upgrade the process digits and return them to the register transceiver. They are then forwarded to the register controller for storage and the register transceiver is released. In this particular instance they will cause the register controller to wait. They will contain the address of the system translator that must be accessed in order to locate the directory number of the particular local subscriber being called. Since both number group and code translations are located on the same drum, the process digits will indicate that a number group translation is to be performed. The register transceiver as soon as it is seized will receive the seven digits of the called directory number, the class of service of the originating line, and the process digits. The system translator, upon receiving this information, will in this instance, locate the proper switching digits and sender instruction digits. This information in addition to an upgraded set of process digits will be returned to the register transceiver. The information in the register transceiver is forwarded to the register controller for storage. As soon as storage is accomplished, the register transceiver is released for use by any other register requiring service.

The register controller, re-acting to the new coding of the processing digits will, in this instance, cause a request for the sender assigner. As soon as the sender assigner is seized, it will assign an idle sender to the register junctor requiring service. With the sender attached, the sender instruction digits that have been stored with the switching digits now come into play. The sender sequence state control, accessed by the second sub-time slot of the register being served, now forwards the sender control instructions to the sender controller. The sender controller, utilizing the sender control information, forwards the switching digits to the sender. The sender transmits this translated switching information to the proper markers. Two-way communication exists between the system markers and the senders, therefore, the action of the sender will be dependent upon the instructions returned from the markers. The instructions which the markers are arranged to send to the sender include line idle, line busy, trunk busy, resend and trunk identity for ticketing. If line idle is encountered, the signal is repeated to the register junctor which signals the originating junctor to switch through the signals and releases the sender.

The recognition of a sender release signal, by the register controller causes the register controller to extend a disconnect signal to the register junctor and returns the register's storage area to the idle condition.

If a line busy or trunk busy is encountered by the system markers, the disconnect sequence is the same as for the line idle, but in addition, the busy signal is extended to the originating end.

If the resend signal is returned to the sender, the sender will release the terminating switch train and the register controller will cause the initial send state to be introduced. A second attempt to establish the call will then be made. Only one resend signal will be obeyed. If a second resend signal is received, trunk busy will be returned to the calling subscriber.

THE TRANSLATOR

The translators 700 of the system provide semipermanent storage used by the system to direct the extension of telephone calls in accordance with the subscriber dialed digits.

A pair of translators are provided for each 10,000 directory numbers served by the office. Each translator of the pair shares the traffic load. One of the pair may be taken out of operation for maintenance and all traffic switched to the other without degrading the grade of service. Expansion capability up to 60,000 directory numbers is provided for the office.

Each translator can be accessed from twenty register-sender groups and a supervisory console on a one-at-a-time basis. Four basic types of translations are processed.

(1) Directory Number Translations (DNT).—The directory number of the called party is translated into switching instructions to enable the register-sender to direct the routing of the call to its destination. The switching instructions contain the equipment location of the called telephone line and the party ringing instructions.

(2) Line Number Translation (LNT).—The calling party's line identification is translated into the calling party's directory number. The line number translations provide automatic number identification (ANI) for all one and two party lines.

(3) Code Translations.—The called area, office, or special service code is translated into switching instructions. The translation capabilities required of control switching point (CSP) in the direct distance dialing (DDD) network are provided.

(4) Special Features.—Special switching instructions are generated to provide such features as home extension intercom, repertory dialing, automatic call transfer, and other special features.

Information storage is provided by magnetic drums on the basis of one drum per translator. Memory words are recorded on the drum surface from a supervisory console, by simply typing the memory word and appropriate memory address at the console typewriter. This directory number and/or code translation can be added or existing translations altered with a minimum of maintenance effort.

Each drum provides 600,000 bits of information storage. Information is represented in digital form using a four bit binary coding. The magnetic drum is 10 inches in diameter and provided with 150 tracks. Each track stores 4000 bits with a packing density of approximately 130 bits per inch. The drum rotates at 1800 r.p.m. and provides an average access time of approximately 16 milliseconds. The basic time interval of 8.1 microsecond for the system logic is derived from recorded clock tracks. The recording technique employed is return-to-zero (RZ). Reading and writing functions are performed by one fixed read and write head per track. Adjustable register heads are provided for the clock tracks.

Memory words are recorded in parallel along the axis of the drum. Each memory word consists of 40 bits, thus occupying one bit in each of 40 tracks. Three segments along the drum axis with each segment made up of 40 tracks provides storage for 12,000 memory words. The memory words are addressed consecutively around the drum circumference with the first 4,000 addresses located in segment one, the second 4,000 addresses in segment two, and the third 4,000 addresses in segment three.

The drum access circuitry, consisting of read and write amplifiers, all transistorized, are mounted on printed circuit cards in close proximity to the magnetic heads. All logic operations are accomplished through the use of transistorized standard circuits, with a small number of special circuits for pulse generation, shaping, distribution, and buffering.

*Circuit description*

Memory address and pulse generator provide a sequential count of the units, tens, hundreds, and thousands digit of the calling and called subscriber along with the various timing pulses, strobe pulses, and write pulses to be used in the system.

The memory readout circuit provides drum segment selection for the read operation and gates information into a buffer circuit for distribution to other circuits.

Memory record circuit provides drum segment selection for the write operation obtaining the information to be placed on the drum directly from the access register.

A means for identifying and connecting a register-sender group or the control console to an idle translator is provided for by the register identifier circuit.

The readout processor provides the control needed for proper transfer of the translated information read from the permanent memory, and the means for processing this information prior to its return to the register-sender group.

The transceiver circuit provides a means of communication between the translator and the register-sender, or the console. Also, it provides a temporary storage for the incoming and outgoing information during the process of translation.

Based on incoming information, the process controller circuit selects a given translation (directory numbers, line numbers, code) and generates logic commands to control the sequential process of all circuits involved in the given translation.

The address comparator circuit provides indication of coincidence between the incoming information and the address of the permanent memory. Upon acknowledgment of the coincidence, respective information is read out from the permanent storage.

*Operational description*

The translators, by means of the register identifier circuit, continuously scan over the call signal leads from the register-sender groups hunting for a call sign. When a call signal from a register sender is encountered, the register identifier stops on this point in the scan and signals this register-sender that the translator is ready to receive.

Because of the large number of digits involved, high speed di-phase serial transfer of information between the register-sender and translator is employed. Within the translator itself, however, parallel transfer of information is employed.

The information subsequently sent from this register-sender is stored in the transceiver circuit. In order to perform a translation, a coincidence is sought between the address portion of the information stored in the transceiver and memory addresses sequentially appearing in the address comparator circuit as a result of memory address readout. Upon coincidence, the readout of the information located at this address (processing digits and switching instruction, line number or directory number) is loaded into the readout processor. Here this information is analyzed and if necessary modified before it is transferred to the transceiver for return to the register-sender. Upon return of the translation information to this register-sender, the translator again begins scanning the call signal leads for other register-sender group call signals.

The information received from a register-sender for translation includes a memory address and information concerning the format of the address.

The translator determines from the information received the type of translation required whether the memory address readout should be a memory address count or a memory address word. If the memory address readout should be a memory address count, each sequential count of the drum address counter is loaded into the address comparator for coincidence check. If the memory address readout should be a memory word, each memory word as they appear sequentially in the memory readout circuit is loaded into the address comparator for a coincidence check.

Since all memory words are not memory addresses and since a minimum of restrictions in the digital composition of an address is desired, an appropriate digit (E) is added to each memory word during the programming of the memory. This digit uniquely identifies the memory address words and further indicates the type of translation to which this address is assigned.

To guard against false coincidence during memory scanning, the same unique values of the digit "E" for the various type of translations are generated by the process controller. On a given translation, coincidence can be found only among those memory words containing a corresponding value of digit "E." Additional use is made of the readout of digit "E" to indicate the proper loading pattern to be used in loading, from the memory readout into the readout processor, the translated information associated with a memory address.

Memory words are assigned a maximum length of 40 bits. However, the number of bits in a memory address is an independent variable based on the numbering plan. Fifteen variations in memory address format are provided. The appropriate format against which coincidence is sought in the address comparator is determined by the process controller from an analysis of the information stored in the transceiver.

The translator performs the following translations, code translations, directory number translations and line number translations.

*Code translations*

The code translations are divided into two operations, initial translation, and final translation.

Initial translation consists primarily of three digit area, office, or service code translations. The first phase of such a translation is the determination if the three subscriber dialed digits stored in the translator access register constitute an unassigned code and therefore should be intercepted.

To accomplish this the values of the count from 0000 to 0999 of the drum address counter are considered. The various combinations of hundreds (H), tens (T) and units (U) digits of this count represent all possible three digit codes. In the memory word addressed by this count, if the HTU of the count corresponds to an unassigned code, the digit "W" having the value eight or larger would have been written during the memory programming. On the first phase of the initial translation, coincidence is sought between the drum address count (HTU only) stored in the address comparator and the memory address stored in the transceiver. If the coincidence is found during the first (TH) thousand count and the decoded value of the "W" in the readout is equal to eight or larger the call is intercepted. If an intercept translation is not obtained in phase 1, the translation proceeds to phase 2.

The second phase is the determination if a given code is a foreign area code or home office code that should be routed via the final route to the home office. As in phase 1, coincidence between the drum address counter of the memory address circuit and the transceiver is sought. However, now the coincidence in the second thousand count occurs and the decoded value of "W" is eight or larger, the final route flip-flop is set. The switching instructions pertaining to the final route are readout when the final route flip-flop is set and the correct value of "E" is decoded. This switching instruction is transferred to the transceiver through the readout processor and is sent to the register-sender. If a final route translation is not indicated, the translation proceeds to phase 3.

The third phase of the initial translation, the three digits are checked for coincidence against the address comparator which now displays memory address words transferred from the memory readout (the drum address counter is not used in this phase). This part of the translation will determine if the received code is a local office code, a home area office code, or an adjacent office area code. In the first case a given drum address and a request for directory number translation will be readout and forwarded to the register-sender. In the second case, switching instructions will be readout. In the third case, the three digits received are not sufficient to determine a given route; therefore, a request for an additional three digits to form a six digit translation is forwarded to the register-sender.

In all the cases the translated information is loaded into the readout processor from the memory readout only after coincidence is found and the proper value of "E" is decoded. The switching information is transferred to the transceiver for the readout processor and is sent to the register-sender.

Final translation consists of adjacent area and office code translation (six digit translation), repertory dialing where two digits code and the calling party line numbers are written on the drum, and other codes for which initial translation is not required.

In this translation, the memory readout is read in the address comparator and the coincidence between the transceiver and the address comparator is sought. Upon coincidence the parity flip-flop is set. The switching instruction pertaining to this translation are readout upon the first appearance of the proper decoded value of "E" following the setting of the parity flip-flop. Readout instruction with certain value of "E" after coincidence has been found permits us to write many codes in sequential groups followed by a single switching instruction pertaining to that group. This accumulative method used in initial as well as in final translation avoids repetitive writing of switching instructions.

*Directory number translation*

When the register-sender requests a directory number translation, the drum address counter is read in the address comparator. The coincidence between the directory number stored in the transceiver and the comparator is sought. Upon coincidence, the line number from the appropriate drum segment selected by decoding of the thousand digit of the dialed directory number is transferred to the transceiver via the readout processor. This information is then sent to the register-sender. To every memory word which corresponds to a given directory number the value $E=0$ has been assigned. If for any reason that number must be intercepted, the value of "E" is changed to be equal to eight or larger. When the value of "E" equals eight is decoded and a directory number translation was requested, the call is intercepted.

*Line number translation*

When the register-sender requests line number translation, the line number portion of each memory word (CDHTUPO) and "E" digits are read into the comparator. The class of service digits (KY) of this memory word and the memory address appearing in drum address counter are transferred to the readout processor. Upon coincidence, the directory number and class of service digits stored in the processor at that time are selected for transfer to the transceiver for subsequent sending to the register-sender.

LINE GROUP AND MARKER-DETAILED DESCRIPTION

FIGS. 12–39 when arranged as shown in FIG. 57 comprise a schematic and block diagram of a line group and line group marker. The line circuits, switching matrices, and junctors are shown in FIGS. 12–19; with the line circuits and A matrices on FIG. 12, the B matrices on FIG. 13, the C and D matrices on FIG. 14, the originating junctor, and the E matrix on FIG. 15, the R matrix on FIG. 16, and the terminating junctor on the FIGS. 17–19. The line group connect circuit 148 is shown in FIGS. 20–27. The marker 200 is shown in FIG. 28, with the line control 260 shown in FIGS. 28–29, the path control 270 in FIGS. 30–33, sequence and supervisory circuit 290 in FIGS. 34–39. The send receive circuit 280 is shown on the right hand side of FIG. 33; and in more detail in FIGS. 40–43, arranged as shown in FIG. 58.

Figure 44:
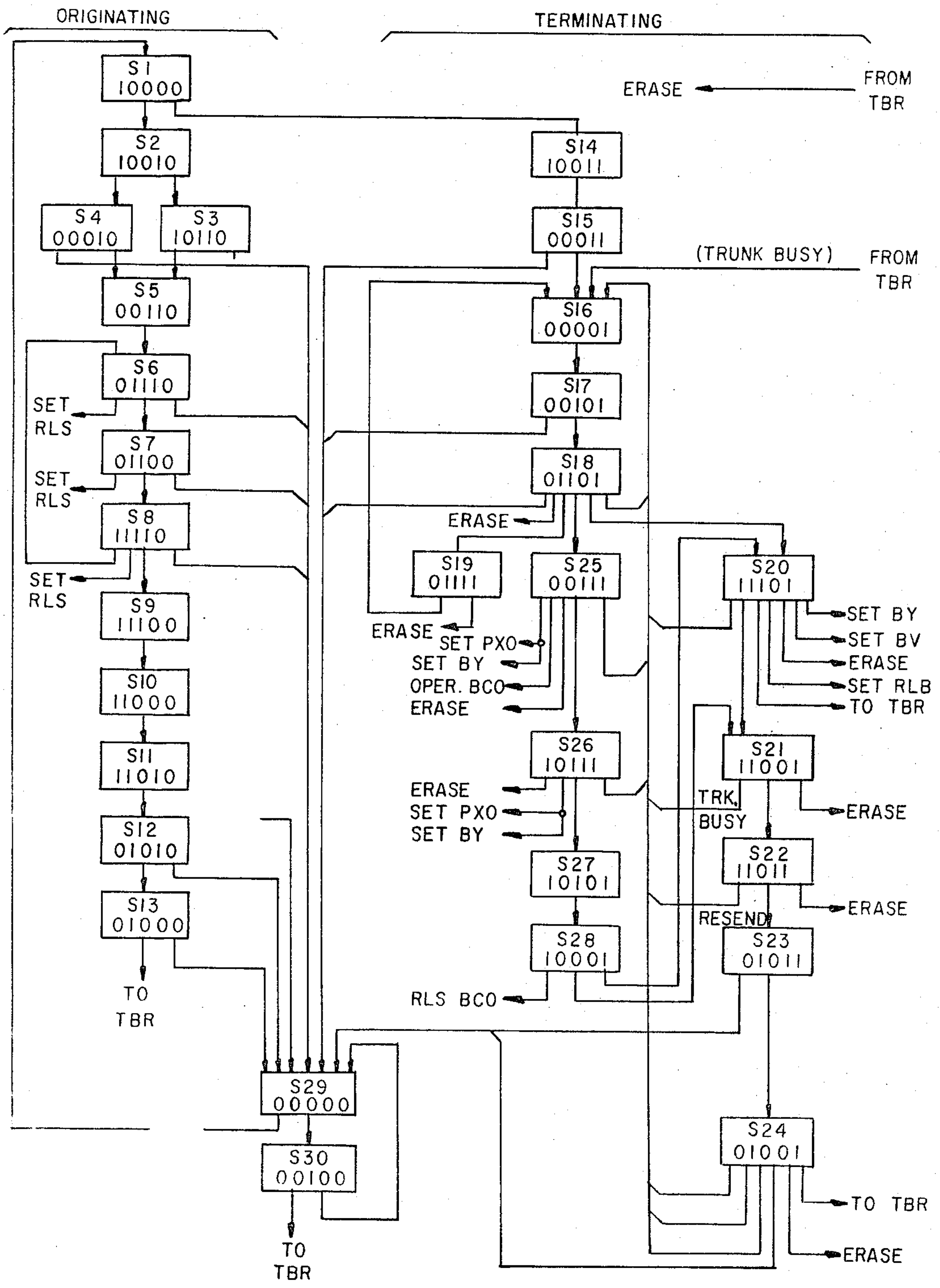
FIG. 44 is a sequence flow chart.

FIGS. 8–11 when arranged as shown in FIG. 44 show the arrangement and interconnection of the switching matrices and junctors in a line group.

The subscriber lines are connected on the horizontal inputs of the A matrices, such that ten lines are connected at each A matrix. Therefore ten A matrices are provided for a group of 100 lines. Also for each hundreds group, six B matrices are provided, each B matrix having one input connected to each A matrix. Common to the ten hundreds groups or one thousand lines of a line group, there are thirty C matrices, and thirty corresponding D matrices. The connections are such that each C matrix and its corresponding D matrix has its ten inputs connected to the ten different hundreds groups, in such a way that in each hundreds group they go to the same input of the same D matrix. Thus since there are six B matrices per hundreds group, the matrices C7 and D7 are connected to the same B matrices as matrices C1 and D1. The verticals of the C matrices are connected to respective originating junctors, with originating junctors OJ1–OJ30 connected to the respective first verticals of the C matrices, originating junctors OJ31–OJ60 connected to the second verticals of the respective C matrices, originating junctors OJ61–OJ90 connected to the third verticals of the respective C matrices, and originating junctors OJ91–

OJ120 connected respectively to the fourth verticals of the C matrices.

The originating junctors each have one output connection to the IDF for connection to the inlets of the group selectors, and another connection to the R matrices. Originating junctors 1–20 are connected to the respective horizontals of matrix R1, originating junctors OJ21–OJ40 are connected to the horizontals of the matrix R2, continuing up to matrix R6 which has its horizontals connected to originating junctors OJ101–OJ120. There are four vertical links from each R matrix, or a total of twenty-four, which are connected to the IDF for connection to the register junctors in the register sender group 600. The register junctors in each register sender group are connected to the R matrix verticals of several different line groups.

The E matrices each have twenty horizontal links connected respectively to twenty different D matrices, with matrix E1 connected to first verticals of matrices D1–D20, matrix E3 having its first ten horizontals connected to first verticals of matrices D21–D30 and its second ten horizontals connected to second verticals of matrices D1–D10. Matrix E3 has its twenty horizontals connected to second verticals of matrices D11–D30. Matrices E4 to E8 are similarly connected to other links of the D matrices. The verticals of the E matrices, fifteen from each matrix, are connected to the terminating junctors.

All of the matrices are designated by reference characters in which an initial letter designates the switching stage. In the A and B stages the letter is followed by two numbers. The first number indicating the hundreds group and the second letter indicating the matrix within the hundred groups. Thus in hundreds group one there are ten A matrices A11–A10 and six B matrices B11–B16. These A and B stages are interconnected by links designated by the letters AB followed by three numbers, in which the first number indicates the hundreds group; the second number indicates the A matrix in the hundreds group and the third number indicates the B matrix in the hundreds group to which the link is connected. Thus link AB111 of the first hundreds group connects card A11 to card B11. The lines from the line circuits to the inputs of the A stage are designated by the letter L followed by three digits, with the first number indicating the hundreds group, the second number indicating the A matrix within the hundreds group and the third number indicating the input of the A matrix. Thus lines L111–L110 are connected to the ten inputs of matrix card A11. In the C stage the matrix cards are designated C1–C30, and in the D stage the corresponding D matrices are designated D1–D30. The links interconnecting the B stages to the C and D stages are designated by the letters BC followed by three numbers. The first number indicates the hundreds group of the B matrix and the last two numbers indicate the C and D matrix, with a zero inserted as the center number for connections to cards C1–C9 and D1–D9.

The links interconnecting the D and E stages are designated by the letters DE followed by three numbers. The first number indicating the D matrix with a zero preceding the matrix number for the matrices D1–D9, and the last number indicating the D matrix.

The schematic diagrams of FIGS. 12–16 show part of a matrix card for each of these stages and also a line circuit and an originating junctor. An additional line circuit and an additional matrix for the A and B stages is shown in block form. Each matrix comprises a plurality of horizontal links and a plurality of vertical links interconnected by crosspoint switches. Each link comprises four conductors, tip T, ring R, control C, and pull P. The tip and ring conductors provide an extension of the subscriber's loop for a talking path, the pull conductor is used to operate the crosspoints, and the control conductor is used to hold the crosspoints in a selected path. Between each horizontal link and each vertical link of a matrix card there is a crosspoint switch comprising three make contacts in three capsules, two windings, and a diode. For example in matrix card A11 the crosspoint switch between horizontal link L111 and vertical link AB111 comprises the contacts 1205 and 1206 in the tip and ring conductors respectively, contacts 1207 in series with hold winding 1203 in the control conductor, and the pull winding 1202 in series with a diode 1201 in the pull conductor. To establish an originating path after the marker has selected the route, an operate circuit is established on the pull conductor through the three stages in series, through one crosspoint switch in each stage, to operate the crosspoints, then a hold path is established on the C conductor through the three crosspoints to hold the connection. For example if a path is to be established from line circuit LC111 to originating junctor OJ1 negative potential is applied to the lead L111P and ground is applied to a relay tree in the marker to conductor OJ1AP of the vertical link V1 of matrix C1. This causes current to flow in the path through diode 1201 and winding 1202 of matrix A11, to diode 1301 and the winding 1302 of matrix B11 and through diode 1401 and winding 1402 of matrix C1, causing the three crosspoint switches to operate in series. The diodes block current flow through undesired paths through other pull windings of each card. To hold the path ground is applied from other circuits to the C conductor of the vertical link V1 which extends through the hold windings and their series contacts of the three crosspoint switches and cutoff relay 12CO of line circuit LC111 to negative battery potential.

The line circuit LC111 comprises a line relay 12L having two windings and a single make contact, and a cutoff relay 12CO having a winding, two break contacts 1 and 2 and a make contact 3. The tip and ring conductors L111P and L111R of line L111, which are connected to the subscriber's loop, are also connected to the break contacts 1 and 2 of the cutoff relay 12CO through the windings of the line relay 12L to ground and negative battery respectively. The conductor L111C is connected through the winding of the cutoff relay 12CO to negative battery. The conductor L111P is connected through the make contact of relay 12L and a resistor 1211 to conductor LR1 to the marker; and also through the make contacts 3 of the cutoff relay 12CO and a diode 1212 to conductor BCO to the marker. The conductors LR1 and BCO are multiplied to all of the one thousand line circuits of the group. There is also a connection from the cutoff relay by an individual conductor WC111 to the marker, for wire chief use.

The originating junctor (FIG. 15) provides connections from the originating path from the C matrices by a line OJ1A through the junctor and line OJ1B and the R matrix to a register junctor, and line OJ1C to the IDF for access to an inlet circuit of the group selector. The transmission path (conductors T and R) from the C matrix to the group selector is split in the originating junctor. The incoming path is connected to the register by leads TR and RR; and the outgoing path by conductors TS and RS to the sender. The contacts of relay 15JB provide the split. Switching through of the connection from line OJ1A to line OJ1C is accomplished by operating relay 15JB under control of the register via lead ECR, which in turn causes the operation of relay 15JA.

Holding of the preceding switch train by ground on the lead C of line OJ1A is under control of the register junctor via lead CR to relay 15JA before cut through; and under control of the group selector via lead C in line OJ1C to relay 15JA after cut thruogh. The R matrix is released after cut-through.

If a link busy condition is encountered, relay 15BT is operated by the register junctor via lead BY to return link busy tone (120 IPM). Relay 15BT remains operated under control of the calling group. No cut through occurs under this condition.

Figure 17:
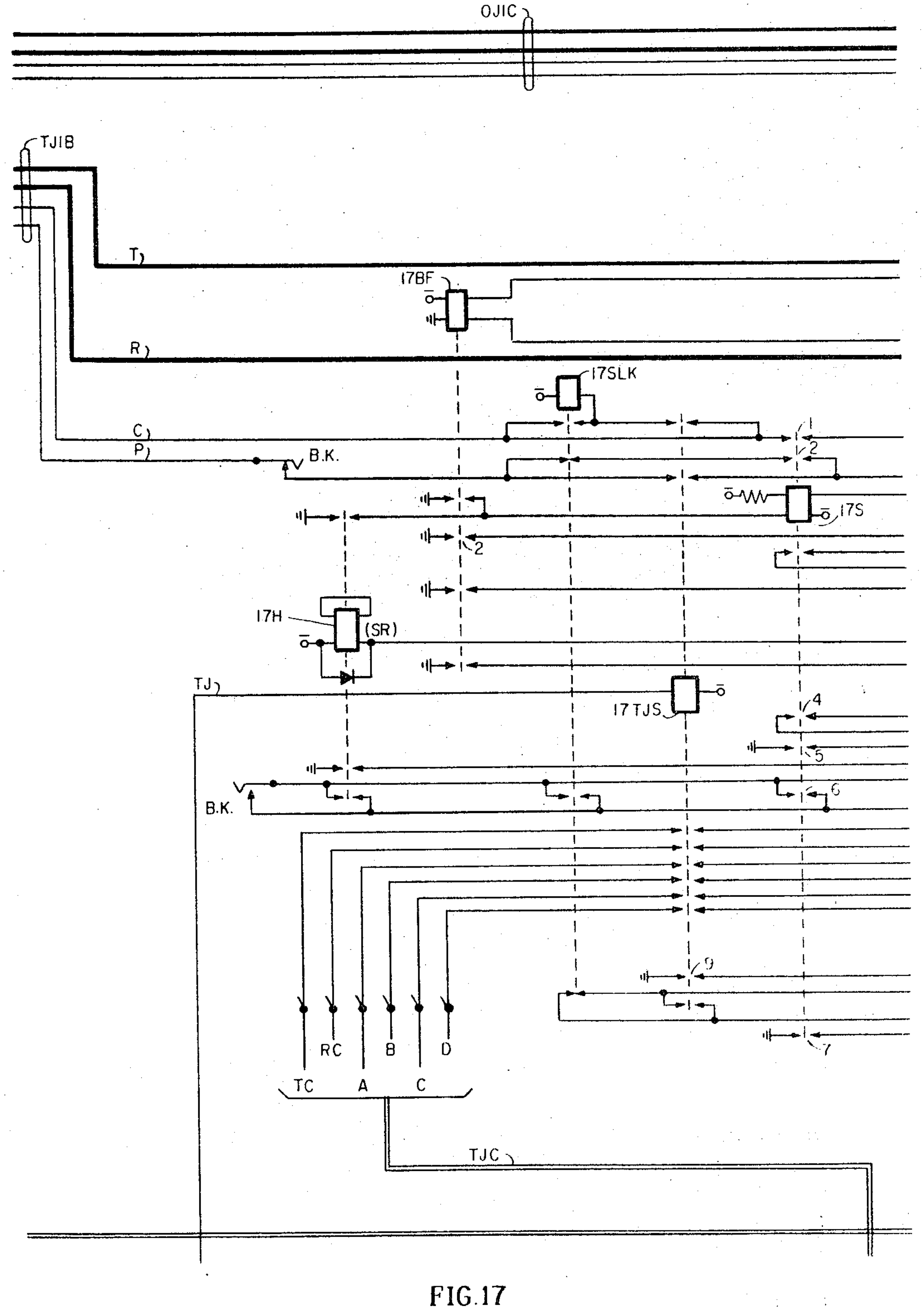
Figure 18:
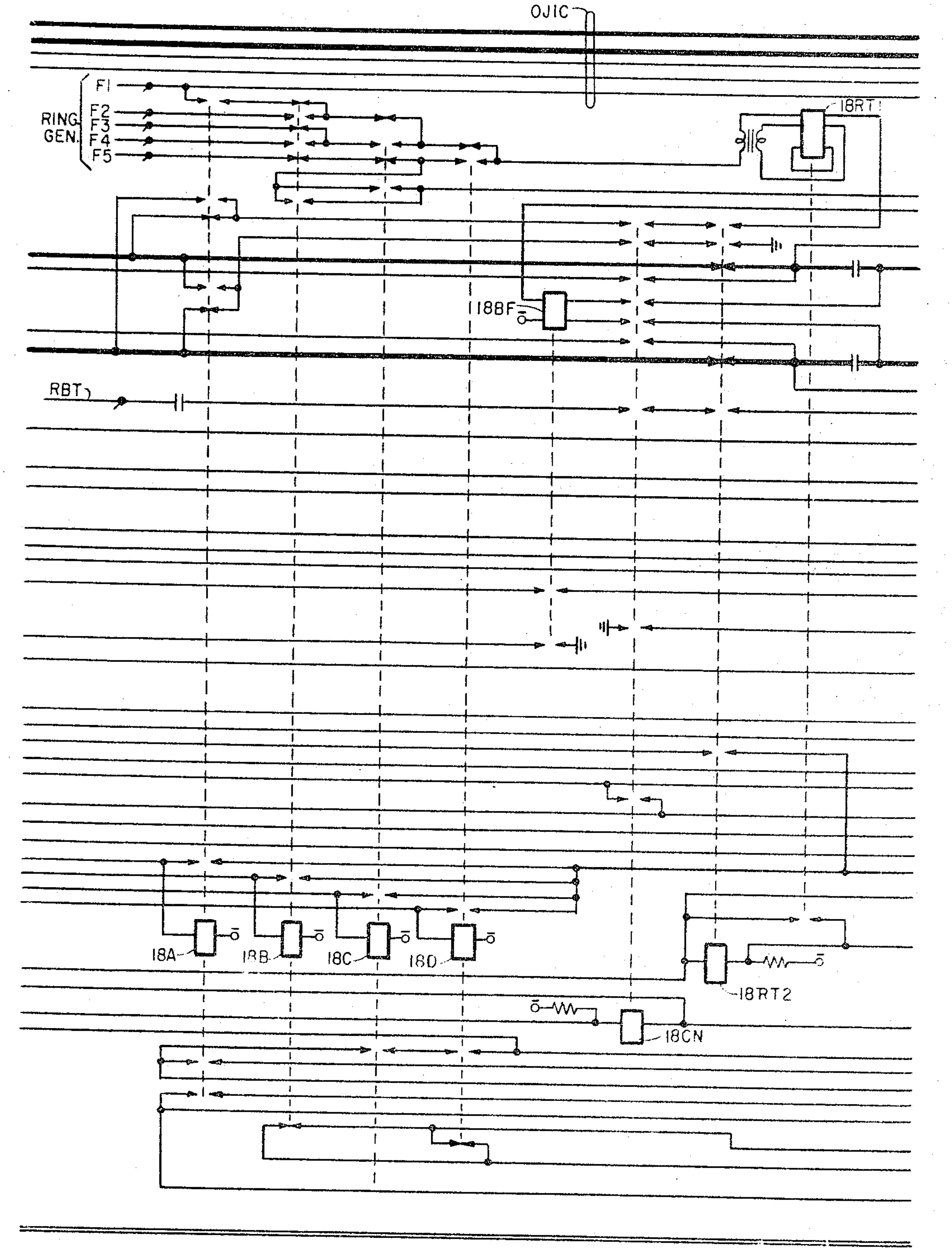
Figure 19:
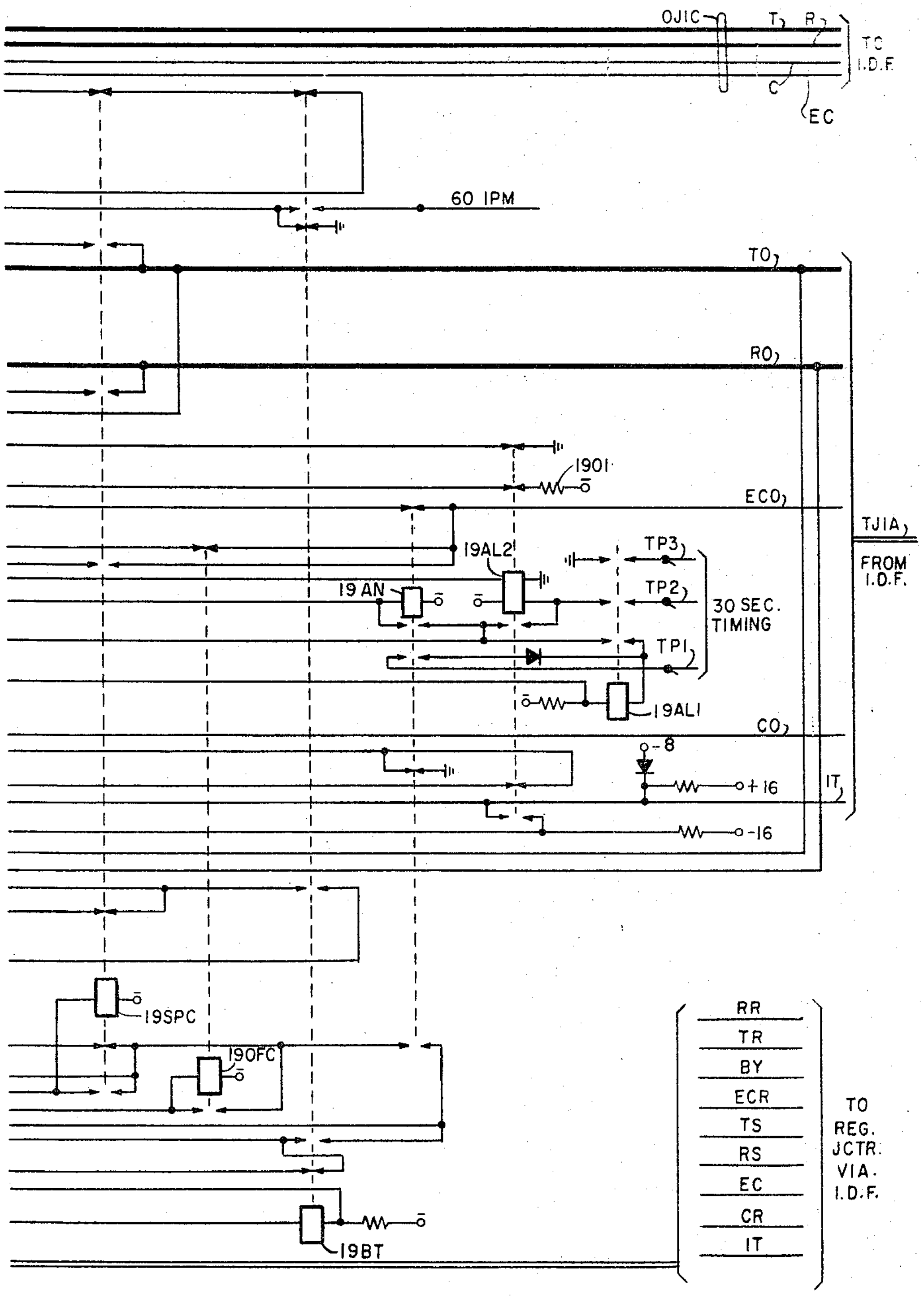

The terminating junctor TJ1 is shown by a schematic diagram in FIGS. 17, 18 and 19. It provides access from a group selector outlet, via the IDF and line TJ1A through the junctor to line TJ1B and thence through matrices E, D, B and A to a called line.

Battery feed is provided to the calling line by relay 18BF, and to the called line by relay 17BF.

Busy-idle indication is provided on lead IT of line TJ1A for use by a parallel test circuit in the group selector marker.

Relay 17TJS when operated provides a path from the TO and RO conductors of line TJ1A to conductors TC and RC of line TJC, which completes a path from the sender over the transmission path to the send-receive circuit in the marker. This relay is operated under the control of the marker by a signal on lead TJ. Relay 17TJS also completes a path for the ringing code signals from the send-receive circuit on conductors A, B, C and D of line TJC to the ringing control relays 18A, 18B, 18C, and 18D.

The junctor is seized by ground forwarded via lead ECO of line TJ1A to operate relay 17S. This relay through its contacts 4 completes a path to ground to hold the preceding switch train, and through its contacts 1 completes a path to ground to hold the succeeding switch train.

Operation of one or more of the relays 18A, 18B, 18C and 18D, applies one of five different ringing frequencies to either lead T or lead R to provide fully selective five-party bridged or ten-party divided ringing, in accordance with the binary code received on leads A, B, C and D as shown in the following table.

| A | B | C | D | Gen. Connection | Ringing Frequency |
|---|---|---|---|---|---|
| 0 | 1 | 0 | 1 | T | F1 |
| 1 | 0 | 0 | 0 | R | F1 |
| 0 | 1 | 0 | 0 | T | F2 |
| 1 | 1 | 0 | 0 | R | F2 |
| 0 | 0 | 1 | 0 | T | F3 |
| 1 | 0 | 1 | 0 | R | F3 |
| 0 | 1 | 1 | 0 | T | F4 |
| 1 | 1 | 1 | 0 | R | F4 |
| 0 | 0 | 0 | 1 | T | F5 |
| 1 | 0 | 0 | 1 | R | F5 |
| 0 | X | 1 | 1 | T | F1 |
| SPECIAL FUNCTIONS | | | | | |
| 1 | 1 | 0 | 1 | Return line busy (60 IPM). | |
| 0 | X | 1 | 1 | No ans. supy. (19OFC operates). | |
| 1 | X | 1 | 1 | No ans. supy. or ringing (19OFC) and metallic cut-thru (19SPC operates). | |

Ringback tone from the source on lead RBT is supplied to the calling party during ringing. Busy tone from the 60 IPM source is supplied to the calling party when the proper binary code as shown in the table is received from the marker to operate relay 19BT.

In response to answer supervision ring trip relay 18RT1 operates and at its single make contacts shorts the winding of relay 18RT2, which connects the called party to the voice transmission path. Relay 17BF then operates, and at its contacts 2 applies ground which extends through break contacts of relay 19OFC to lead ECO of line TJ1A to repeat answer supervision to the preceding switch train.

In response to one of the codes as shown in the table, relays 19SPC and 19OFC operate to provide a metallic path (T and R) free of attachments and inhibits ringing and answer supervision for verification, wire chief, and routiner calls. In response to another code, relay 19OFC operates to inhibit answer supervision on calls to official numbers, such as the telephone company business office.

Release of the succeeding switch train may be controlled by a routiner. Opening lead EC releases the succeeding switch train but holds the terminating junctor seized. The terminating junctor is released when negative battery potential is applied to lead EC.

Release of the preceding switch train is delayed approximately 135 milliseconds after the calling party releases to protect against unintentional interruption of the calling loop.

Timed disconnect of the preceding switch train and the terminating junctor 30 seconds after the called party disconnects is provided.

An arrangement is provided to permit the called party to hold the succeeding switch train and the terminating junctor.

The line group connect circuit 148 is shown by schematic drawings in FIGS. 20–27. The line group marker 200 is shown by a schematic and block diagram in FIGS. 28–33. For convenience in the drawings, relays are shown having a large number of contacts although in the physical embodiment of this system the reed relay assemblies have been limited to ten contacts, and additional contacts are obtained by using parallel and slave connected reed relays. A relay driver device shown symbolically in the drawings by a triangle with a line across it and associated make contact, comprises a single transistor amplifier with a winding in its collector circuit and the single contact which is a reed capsule operated by the winding.

Figure 30:
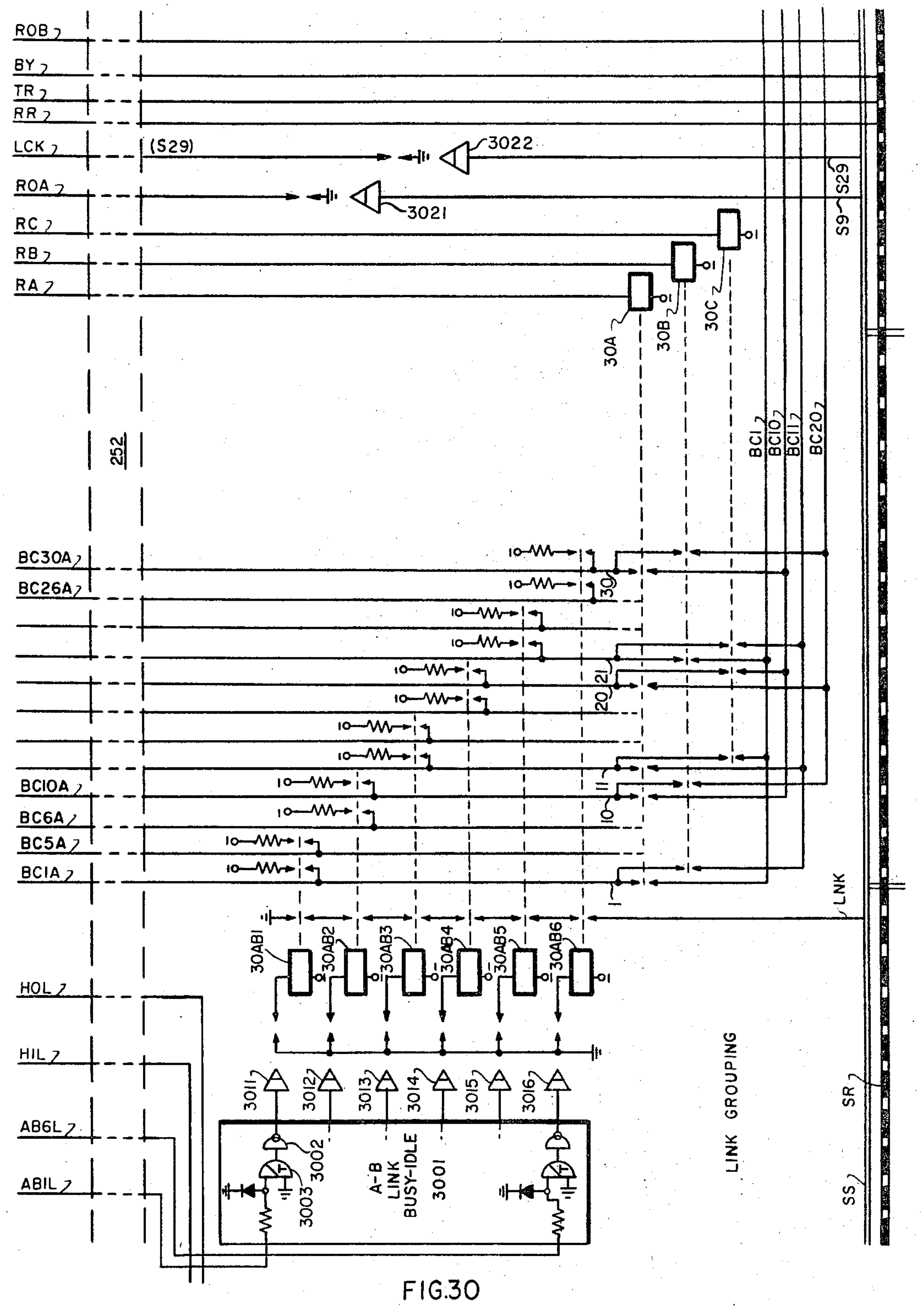
Figure 31:
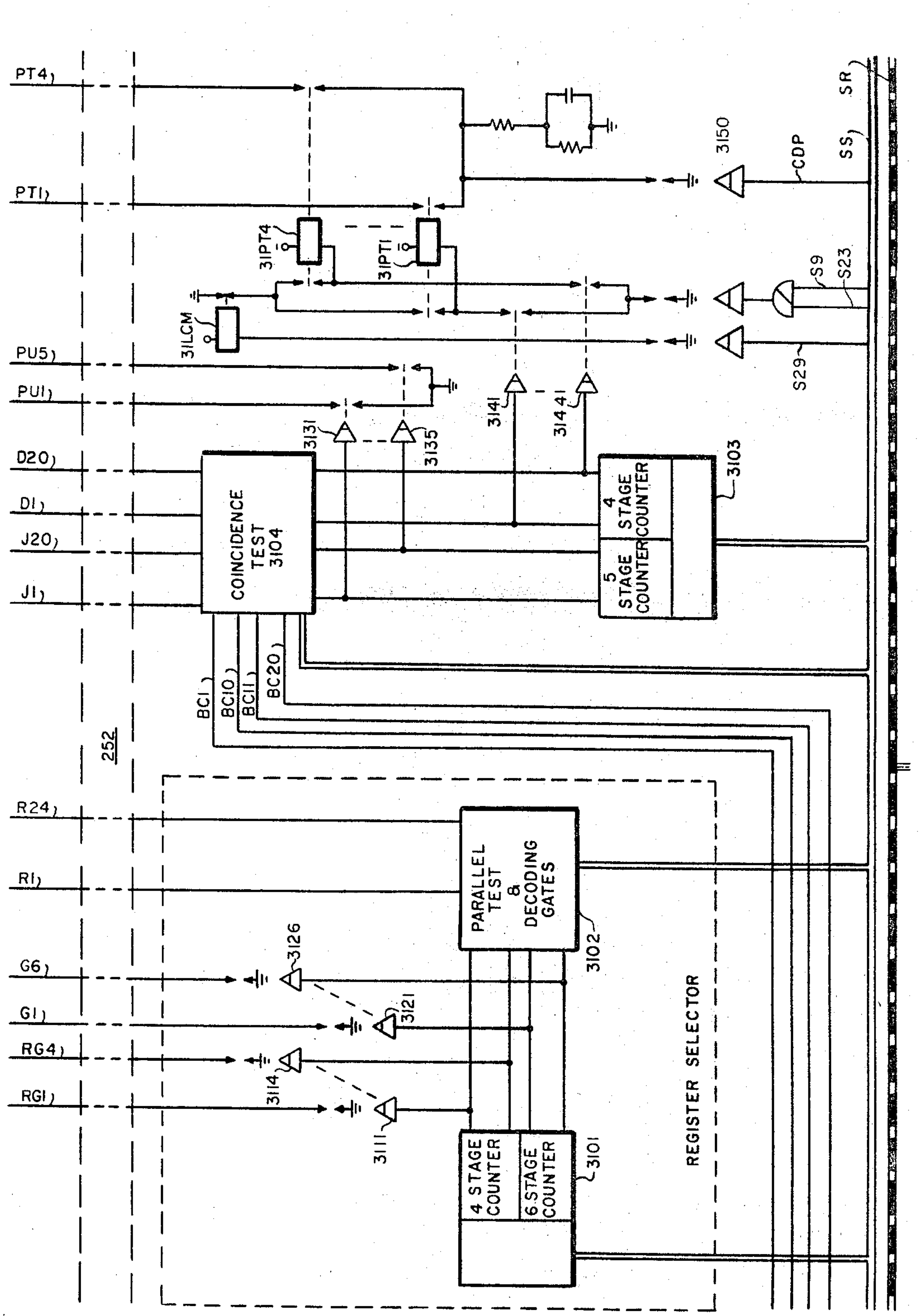
Figure 32:
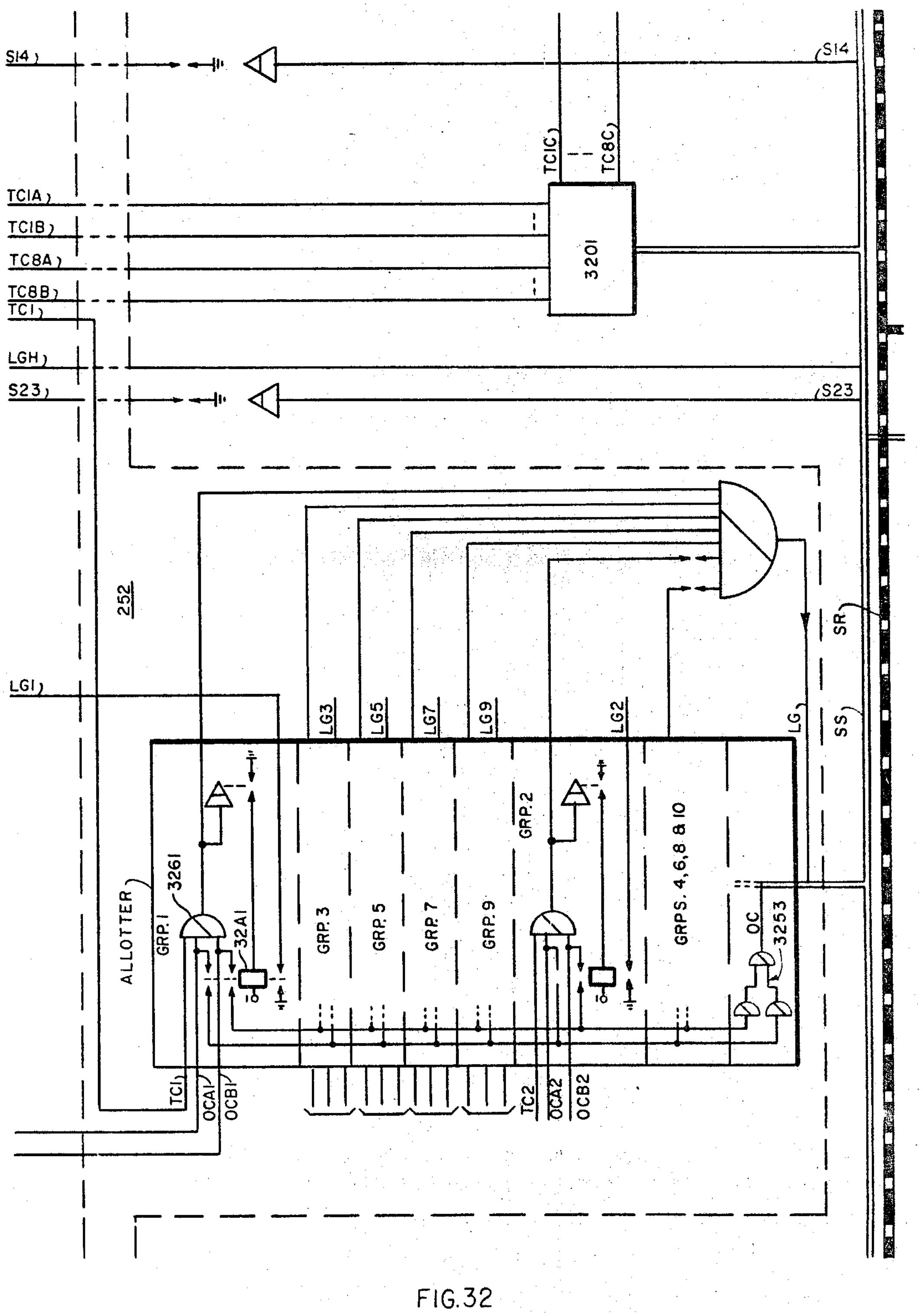

The allotter and transfer circuit 252 is represented by a dashed box across the top of all of FIGS. 28–33, with a portion of the allotter part shown in FIG. 32.

The principal units of the line identifier are a hundreds scanner 2903, a tens scanner 2902, and a units scanner 2901. These units may be scanners or parallel test and lockout circuits which perform the following functions: (1) a signal at any one of the inputs causes a device corresponding with this input to be set, (2) with one of these devices in set condition signals at other inputs are inhibited from setting their corresponding device, and (3) the device in said position operates a corresponding relay. Many circuits exist which meet these requirements. In one chosen embodiment scanners operated under the control of pulse sources and sequence state circuits in the sequence and supervisory unit 290 have been used. The output devices comprise relay drivers 2931–2940 from hundreds scanner 2903, relay drivers 2921–2930 from tens scanner 2902, and relay drivers 2811–2820 from units scanner 2901. The relays which are operated under the control of the relay drivers are relays 29H1–29H0 associated with the hundreds scanner 2903, relays 29T1–29T0 associated with the tens scanner 2902, and relays 28U1–28U0 associated with the units scanner 2901.

Referring again to FIGS. 12–14, looking at the P leads of the horizontal inputs of a single one of the matrices such as matrix C1, a negative potential applied to the P lead in any one of the line circuits can be detected through the diodes and pull windings of the A and B matrix cards, since the diodes are forward biased. Thus a negative potential applied to the P lead at any line circuit of hundreds group 1 such as to conductor L111P, can be detected at the first horizontal input of matrix C1, on conductor BC101P. Likewise a call in any of the other hundreds group of the 1000-line group will appear at a corresponding one of the P leads of the horizontal inputs of matrix C1. These leads are taken to FIG. 22, through contacts of relay 22HE, to FIG. 29 and amplifiers 2941 to 2950, respectively, and make contacts of relay 29TL to the ten inputs of hundreds scanner 2903. Likewise in each hundreds group the P leads of the horizontal inputs of any one of the matrices can detect a potential at any one of the ten lines of the A matrix card connected to that input. Thus in hundreds group 1 a call at any one of the lines L111 to L110 at the inputs of card A11 will appear at the conductor AB111P at the input of card B11. The ten leads AB111P to AB101P from card B11 are taken through respective make contacts of relays 22HEP1 and relay 22HE to the ten inputs of the tens scanner 2902. Likewise from each of the other hundreds groups the ten P leads from the horizontal inputs of one of the B cards, namely card B21 of hundreds group 2, card B31 of hundreds group 3 and so on to card B01 of hundreds group 10, are taken in FIG. 22 through contacts of corresponding one of the relays 22HEP2 (not shown) to 22HEP0. At the horizontal input terminals of the A cards, all of the 1000 P leads, ten from each card of the 100 A matrix cards, for example, leads L111P to L110P of card A11, pass through contacts of a corresponding one of the one hundred relays 22LS11 to 22LS00, and then common together and are taken through contacts of relay 22LG and contacts 1–10 of relay 29UP to the units scanner 2901. The inputs to each of the scanners are multiplied to the other line groups as shown by the multiple symbols at the bottom of FIG. 22.

The ten P leads from the horizontal P leads of matrix C10 namely conductors BC110P to BC010P are also taken through another set of ten contacts of relay 22HE and amplifiers 2951 to 2960 through make contacts of relay TL to the hundreds scanner 2903. These leads are also from the first B matrix of each hundreds group but from the second vertical. Thus in case of failure of diodes in the B matrix this second group of P leads may be switched in. This is provided by taking the outputs of the amplifiers 2941 to 2950 and 2951 to 2960 to a parity check circuit 2961. This circuit is arranged to detect failures and in response thereto to operate the relay TL to open its break contacts and close its make contacts so that the inputs BC110P to BC010P are switched into the hundreds scanner instead of the inputs from matrix C1.

*Sequence and supervisory circuits 290*

Figure 34:
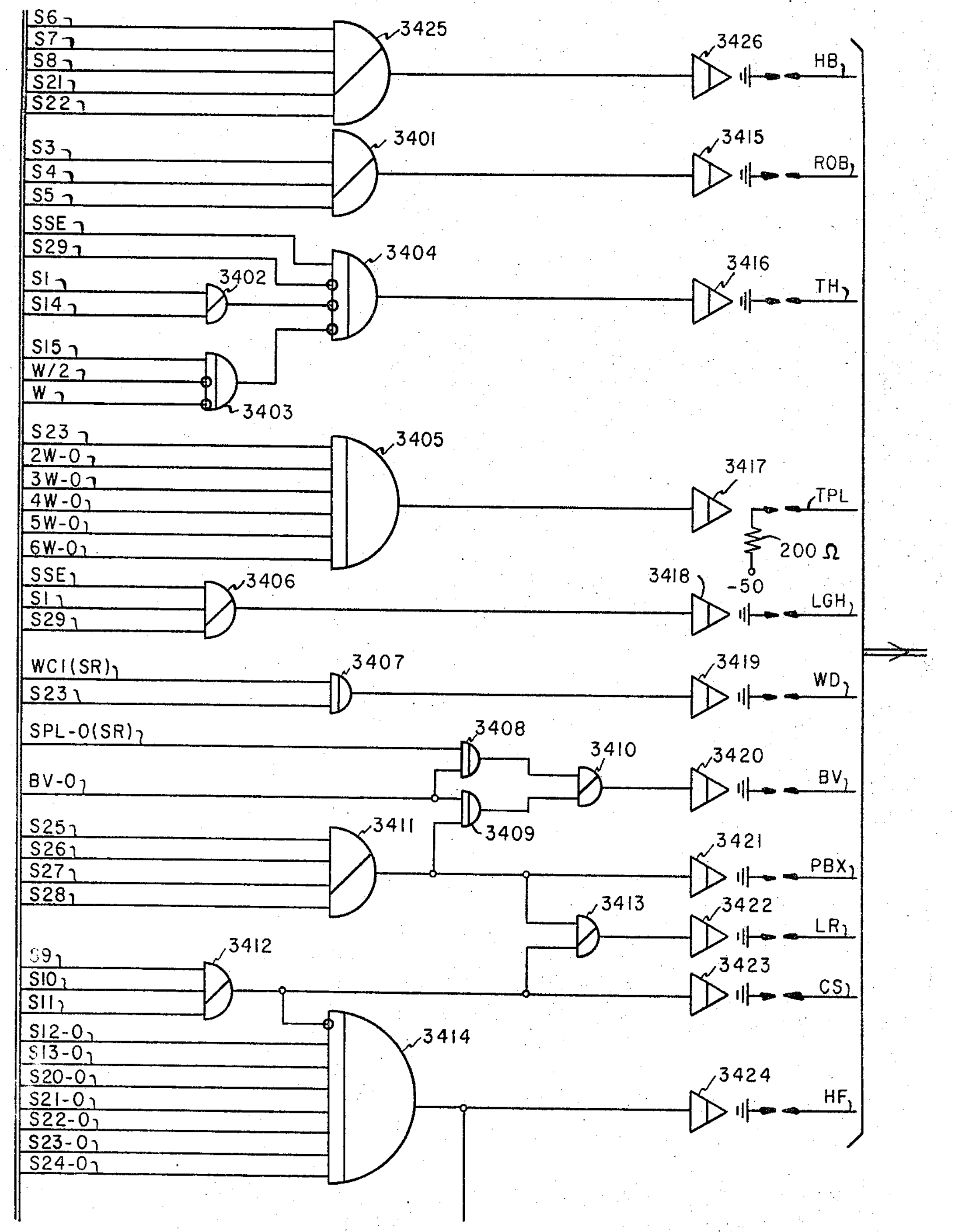
Figure 35:
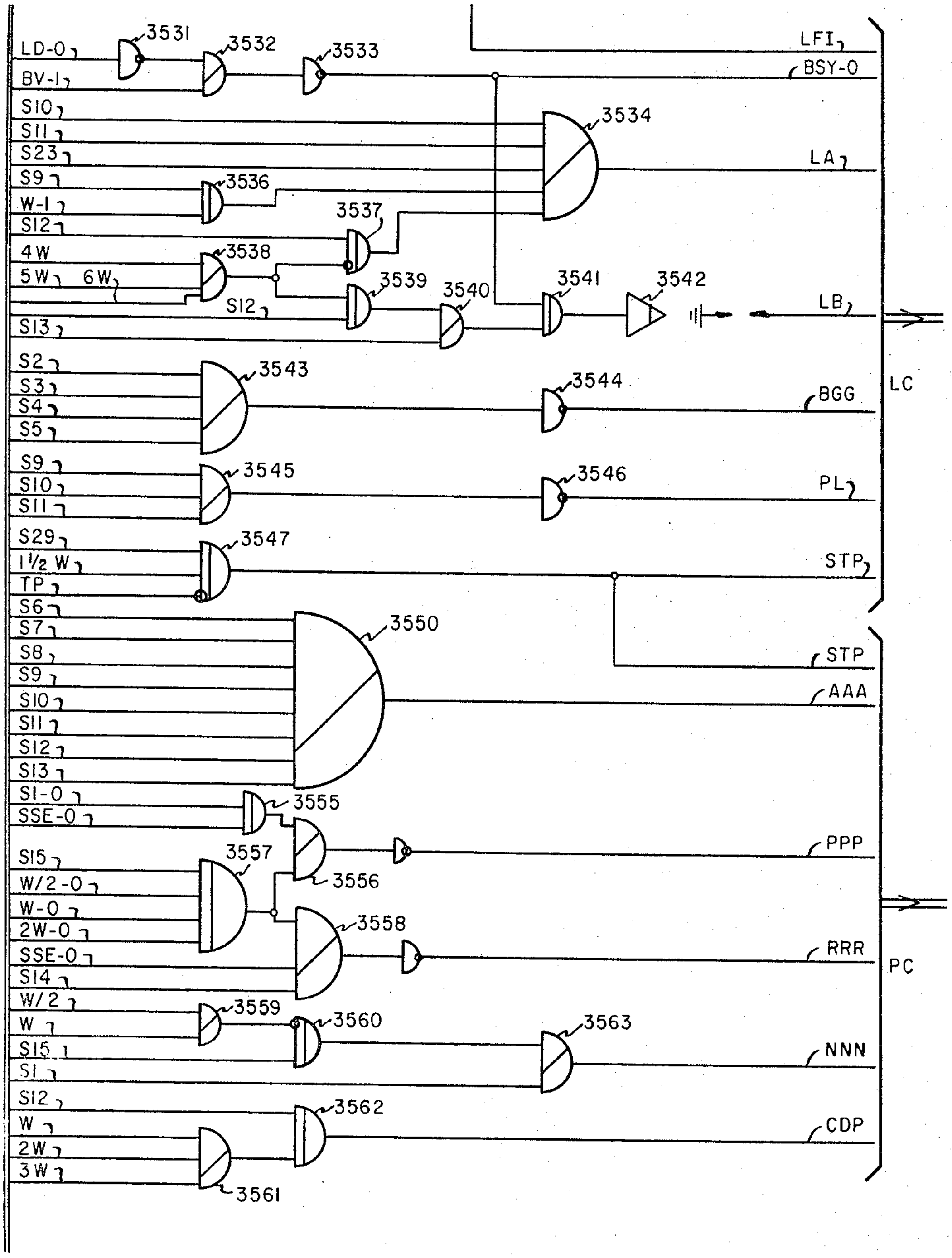
Figure 36:
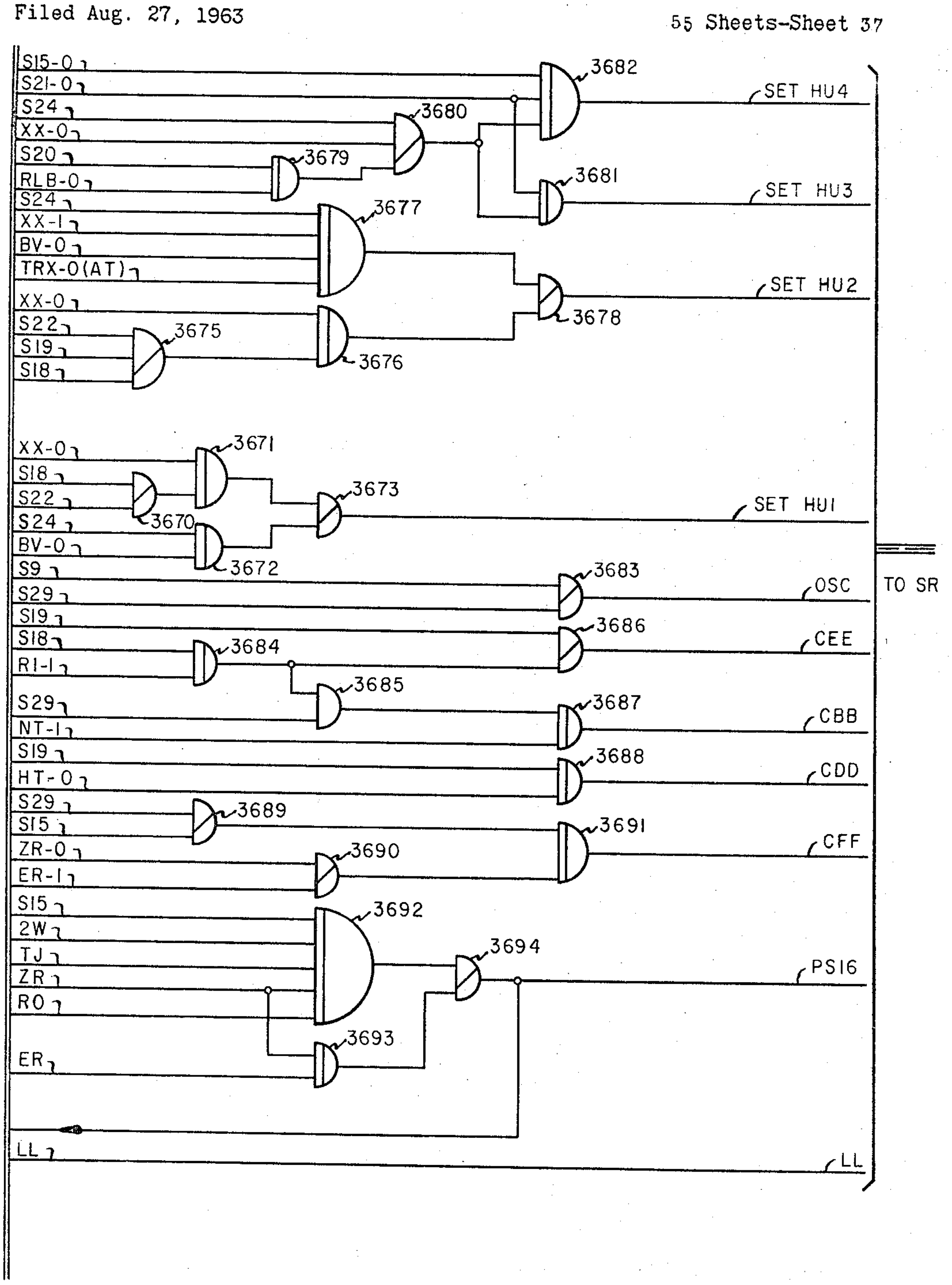
Figure 37:
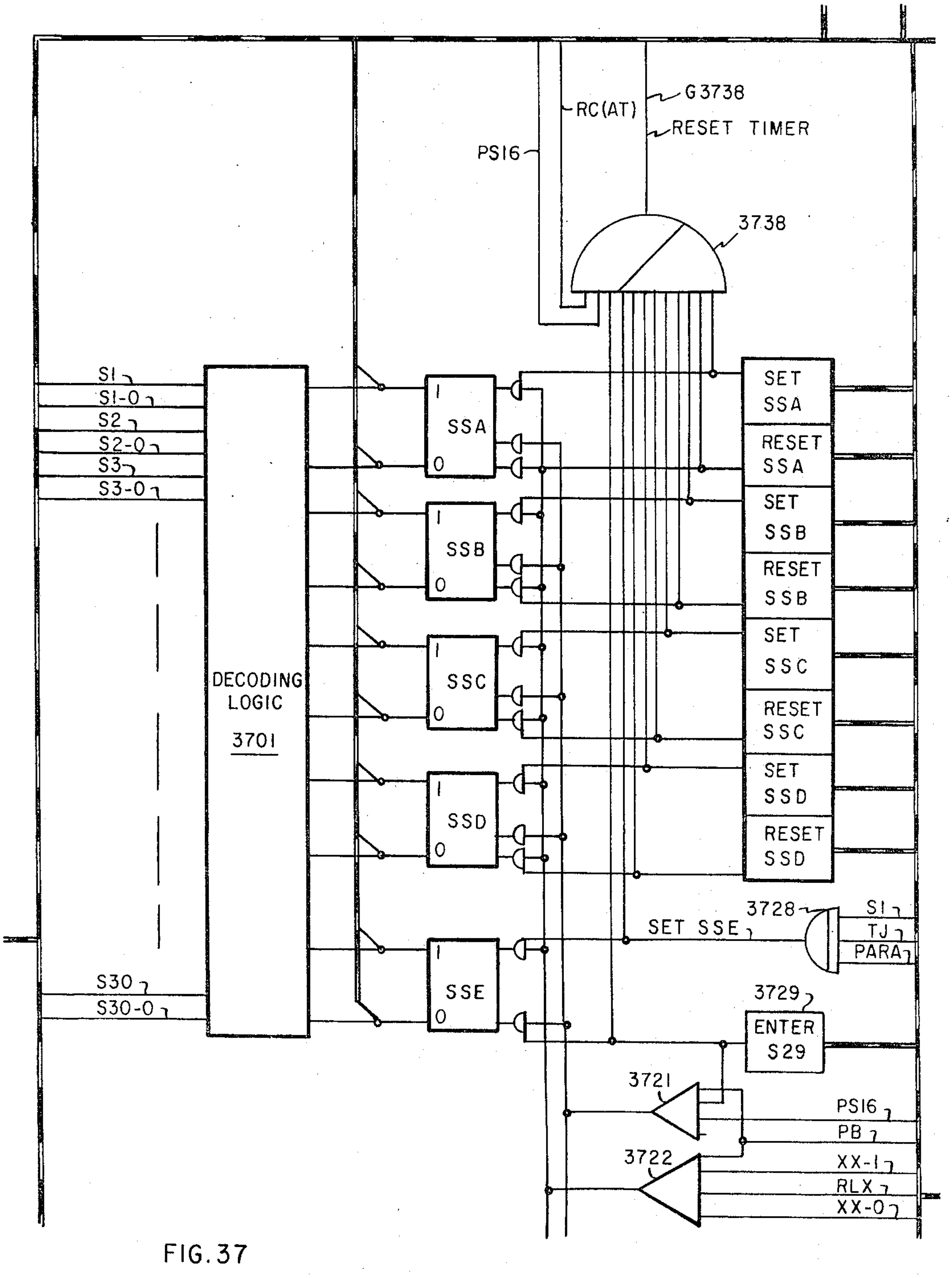
Figure 38:
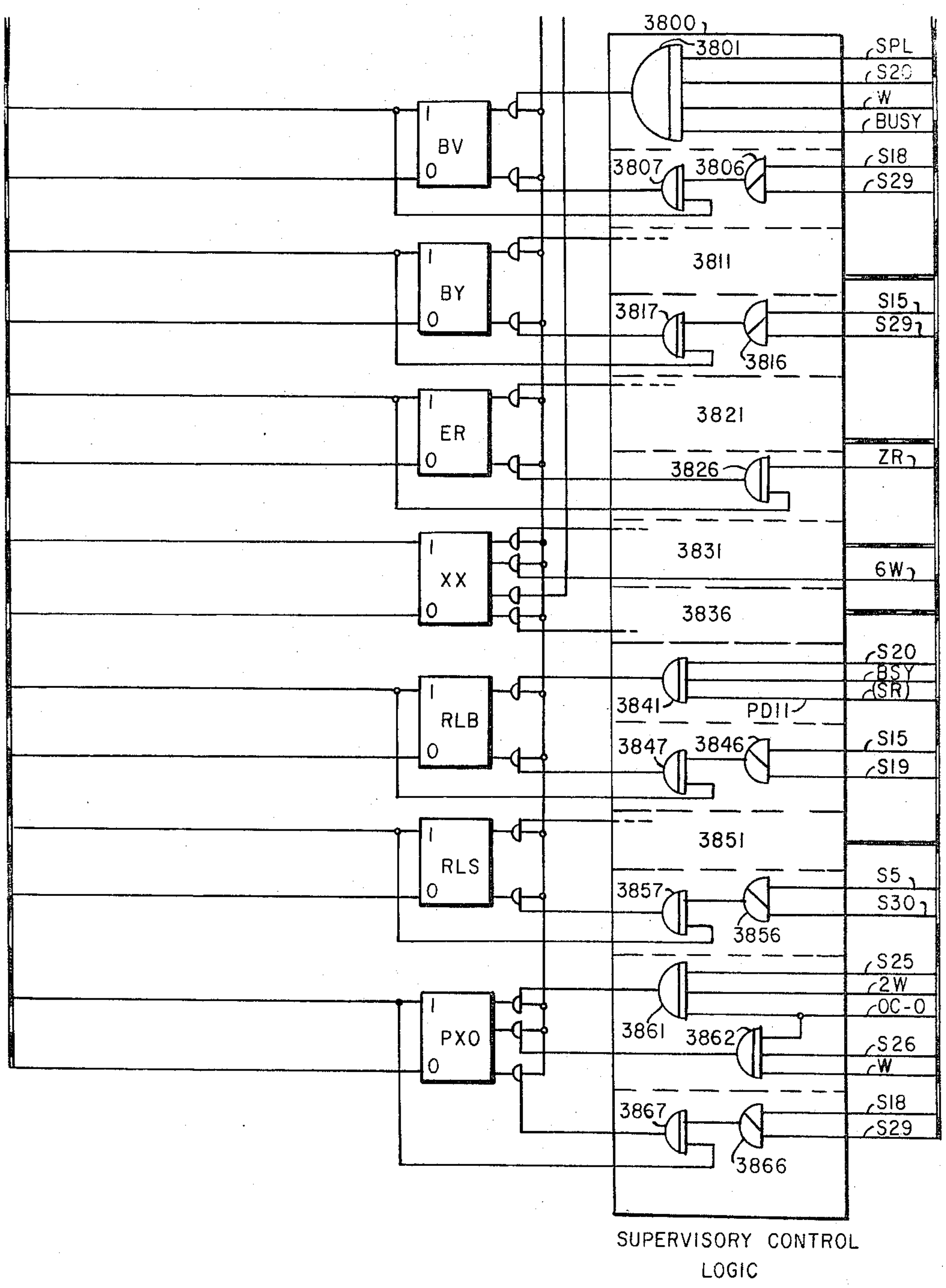
Figure 39:
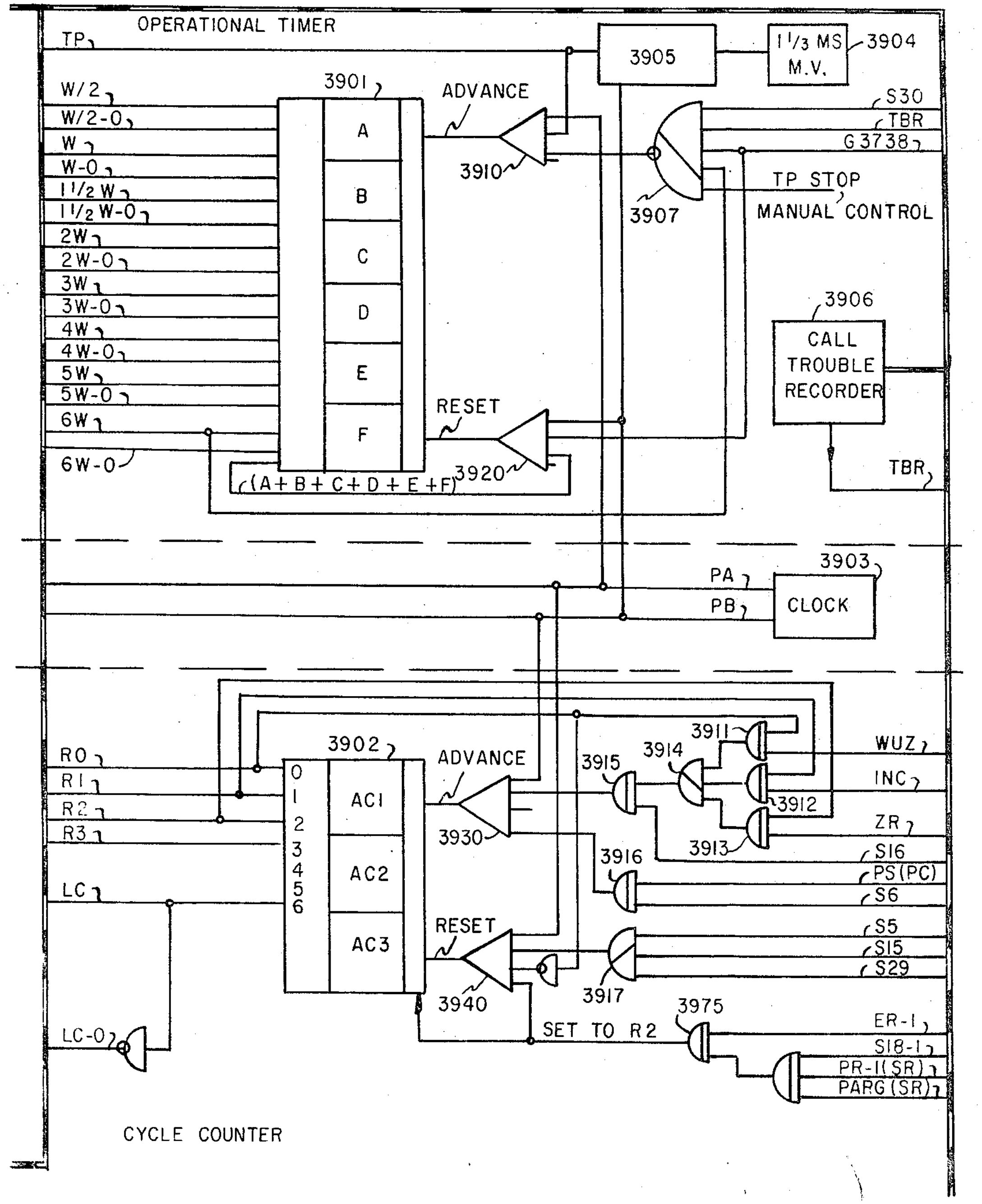

The sequence and supervisory circuits 290 are shown in FIGS. 34–39. FIGS. 34, 35 and 36 show logic circuits which supply signals used by the other units in the marker. These circuits will be referred to in the section describing the operation of the marker. The sequence state register is shown in FIG. 37, miscellaneous flip-flops are shown in FIG. 38, and the operational timer and the cycle counter are shown in FIG. 39.

The electronic logic circuitry used in this system is direct-coupled (DC), that is, signals are represented by steady-state voltages. Two levels are employed. The first level is a negative potential, and represents the binary one, true, on, or active condition. The second level is ground potential and represents the binary zero, false, off, or inactive condition. Flip-flops are used as registers with double-rail output signals to drive the logic circuits. A double-rail output is one in which both the logical one and zero conditions are represented by active signals on separate leads. Only one of the two leads, however, has an active signal at any time. Logic circuits are included in each unit for controlling the setting of the flip-flops, which may be set 1 or set 0. "Set" when used alone means "set 1," and "reset" is synonomous with "set 0."

Each of the flip-flops of the system includes two transistors in a bistable circuit configuration. Each flip-flop has two output terminals, 1 and 0; and has set and reset inputs, with one or two pulse gates at the set input and one or two pulse gates at the reset input. Each of these flip-flop input gates has an A.C. pulse input which is shown in line with its output, and a D.C. control input which is shown connected at the side of the gate. To set a flip-flop to state 1 requires coincidence of a control signal on the D.C. input and a trigger pulse on the A.C. input of one of the set input gates; and in like manner to reset it to state 0 requires coincidence of a D.C. input and an A.C. input on one of the reset gates.

Gated pulse amplifiers are represented by triangles with up to four input leads on the base of the triangle and one output lead from the apex of the triangle. In each case the upper input lead is a pulse input which is gated and amplified through the gated pulse amplifier in response to coincidence of D.C. signals at the center two inputs, or in response to a single D.C. input at the lower input lead.

The logical circuits use NOR gates, each of which is a one-transistor logical element whose output is true if all of the inputs are false, and whose output is false if any one of the inputs is true. The inputs are coupled through individual resistors to the base electrode, and the output is taken from the collector electrode.

A relay driver is a circuit represented by a triangle having a line across it parallel to the base, with a single input to the base, and a contact adjacent to the apex. Each relay driver comprises a single transistor with the input connection to its base electrode, and a winding in the collector circuit which operates the single contact.

An inverter amplifier is a circuit similar to a NOR gate, except that it has only a single input.

For convenience in the drawings, most of the logic gate circuits have been represented by AND gates and OR gates. In actual implementation an AND gate is achieved by using a NOR gate with each of the inputs inverted, and an OR gate is obtained by using a NOR gate followed by an inverter amplifier. It may be readily seen that in situations in which AND functions and OR functions appear alternately in tandem that NOR gates may be used with no inverters between them.

Figure 51:
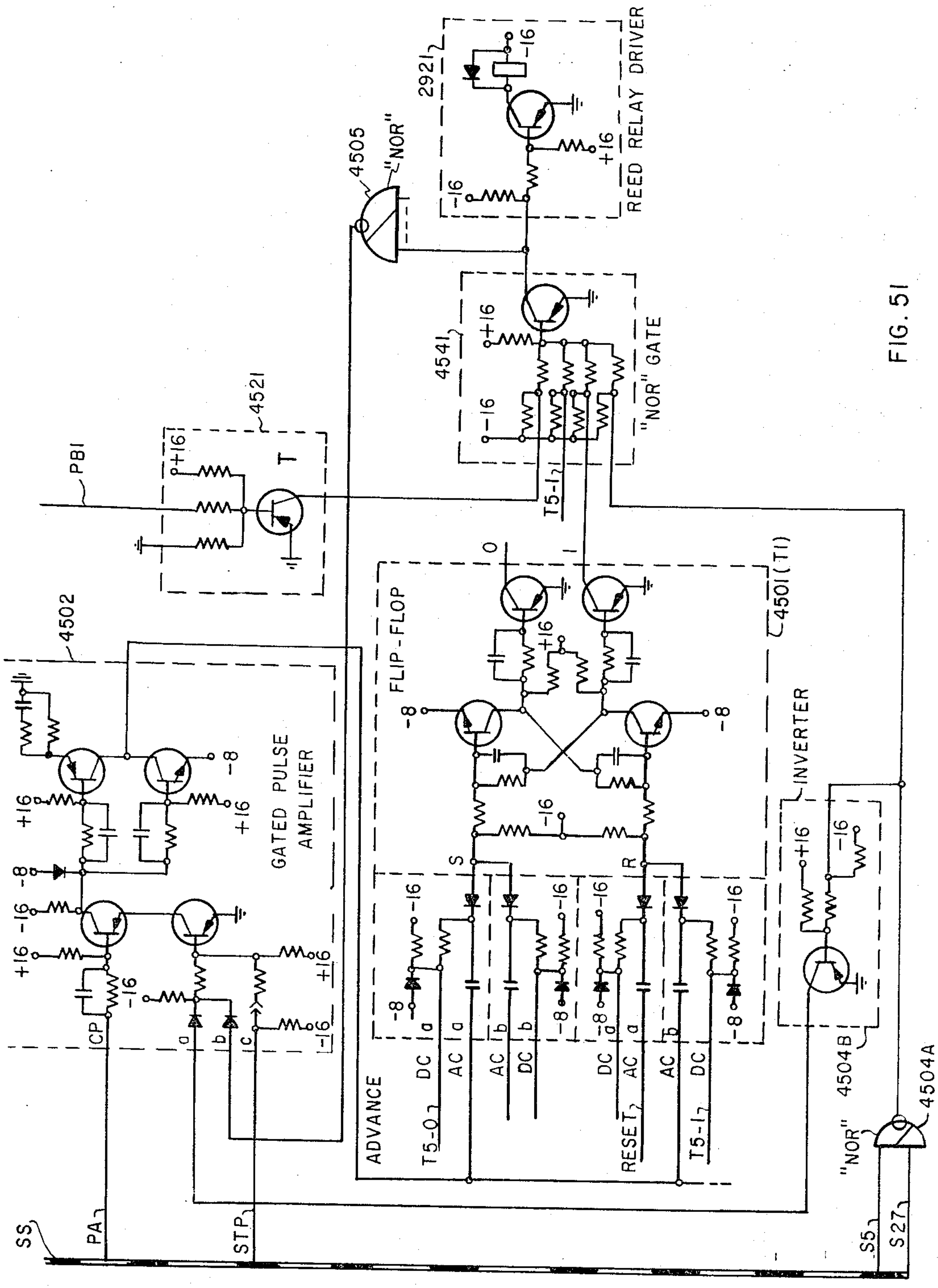
FIG. 51 is a schematic diagram of part of a typical circuit showing the components used in the marker.

A typical interconnection of these electronic circuit elements in schematic form is illustrated in FIG. 51.

In describing the logical operations performed by the gate circuits, Boolean algebra equations are used. In this notation the addition symbol signifies OR, the multiplication symbol, expressed or implied, signifies AND, and overlining signifies the inverted condition.

Referring now to FIG. 37, the sequence state register comprises five flip-flops SSA–SSE along with input circuits. The outputs of the flip-flops are decoded by logic 3701 to provide sequence states S1 to S30, along with the inverted signals for each of these.

The sequence state flow chart is shown in FIG. 44 and in Table I. On the flow chart each of the boxes includes the decoded designation of the sequence state at the top and below it appears the binary code of the flip-flops SSA–SSE representing that sequence state. The significance of each of the sequence states is explained in the section on operation of the line group marker. Briefly, states S2–S13 are for originating calls, states S14–S28 for terminating calls and states S29 and S30 are idle states. At the end of each call sequence state S29 is entered, and if there is another call in the same line group state S1 is entered. If there is no call in the same line group the sequence changes from S29 to S30, and if the allotter shows a call in another line group the sequence goes from S30 to S29 to S1. If there is a terminating call it is given preference and state S14 is entered. If there is an originating call and no terminating call state S2 is entered. The logic equation commands for entering each sequence state are given in Table I. The last column of this table shows the flop-flop change effected by each command. The D.C. input signals for the flip-flops represented in FIG. 37 by the boxes set SSA to reset SSD along with gate 3728 and logic box 3729 may be derived from these commands. In some cases a pre-state signal is received from the send-receive circuits 280. A.C. commands for the sequence state flip-flops are in general received from gated pulse amplifier 3722. Normally the signal XX–0 is true so that the pulses PB are gated and amplified by this pulse amplifier. To enter state S16 the four flip-flops SSA–SSD are reset in response to the signal PB gated by gated pulse amplifier 3721 when the D.C. signal PS16 is true. State S29 is entered by resetting all five of the flip-flops SSA–SSE via pulse PB from gated pulse amplifier 3721 when the output of logic box 3729 is true. This box 3729 represents the "enter S29" logic shown in Table I. There is a special state S30T not shown in FIG. 34, which is a transfer state generated by the allotter and transfer circuit 252.

TABLE I

| Enter State | Command | Flip-Flop Change |
|---|---|---|
| S1 | S29 (OC+TC) LG 2W PARE $\overline{S30T}$ $\overline{RLS}$ | Set SSA. |
| S2 | S1 $\overline{TC}$ PARA | Set SSD. |
| S3 | S2 OCX $\overline{OC1}$ PARB | Set SSC. |
| S4 | S2 OC1 PARB | Reset SSA. |
| S5 | S3 HX W OCX | Reset SSA. |
| | +S4 HX W OC1 | Set SSC. |
| S6 | S5 TX W | Set SSB. |
| | +S8 $\overline{OTR}$ LL $\overline{LC}$ | Reset SSA. |
| S7 | S6 PS | Reset SSD. |
| S8 | S7 UX 2W LNK | Set SSA. |
| S9 | S8 OTR | Reset SSD. |
| | PS10=S9 ZS 2W | |
| S10 | PS10 | Reset SSC. |
| | PS11=S10 GO PARC | |
| S11 | PS11 | Set SSD. |
| | PS12=S11 PARD 6W | |
| S12 | PS12 | Reset SSA. |
| S13 | S12 BSY | Reset SSD. |
| S14 | S1 TJ PARA | Set SSD and SSE. |
| S15 | S14 2W | Reset SSA |
| | PS16=S15 R0 2W TJ ZR+ER ZR | |
| S16 | PS16 | Reset SSA, SSB, SSC, SSD. |
| S17 | S16[R0 WUZ R1 INC+R2 $\overline{ZR}$(5W+$\overline{PXO}$)] | Set SSC. |
| S18 | S17(R1+R2)ZR | Set SSB. |
| S19 | S18 R1 $\overline{HT}$ PARG PR | Set SSD. |
| S20 | S18 R2 PARG UP PR $\overline{PBX}$ | Set SSA. |
| | +S28 UX W SPL | Set SSB, SSC. |
| S21 | S20 HX TX UX (BV+W $\overline{BSY}$) | Reset SSC. |
| | +28 UX W $\overline{SPL}$ | Set SSB. |
| S22 | S21 2W LNK | Set SSD. |
| S23 | S22 OTR | Reset SSA. |
| S24 | S23 2W BSY | Reset SSD. |
| S25 | S18 R2 PARG UP PR PXB | Reset SSB, set SSD. |
| S26 | S25 2W OC | Set SSA. |
| S27 | S26 HX W OC | Reset SSD. |
| S28 | S27 2W TX | Reset SSC. |
| S30 | S29 2W[PARE($\overline{OC+TC}$)+RLS+$\overline{LG}$+S30T] | Set SSC. |

S30T is a transfer state generated by the allotter and transfer circuit

| | | |
|---|---|---|
| S29 | S3 W $\overline{OCX}$ | |
| | +S4 W $\overline{OC1}$ | |
| | +RLS[S6 $\overline{PS}$ LR | |
| | +S7 2W $\overline{LNK}$ | |
| | +S8 LC LL $\overline{OTR}$] | |
| | +S12 5W(BCU+HJ) | |
| | +S13 W $\overline{TRX}$(BSY+HJ) | |
| | +S15 2W $\overline{TJ}$ | |
| | +S17 R3 ZR(5W PXO+W $\overline{PXO}$) | |
| | +S18 3W $\overline{TJ}$ PR | |
| | +S23 3W $\overline{TJ}$ | |
| | +S24 2W $\overline{TJ}$ | |
| | +S30 PARE $\overline{S30T}$ LG | |
| | +XX RLX($\overline{SSE}$+S14+S15+S16+S17+S18+S19) | |
| | +RCS ("reset scanners and counters" signal from allotter) | |

Some miscellaneous flip-flops are shown in FIG. 38, which have functions as follows:

Flip-flop BV is for busy verification in sequence state S20, and is set for special calls to enable a connection to be completed even though the called line might be busy.

Flip-flop BY is the busy indicating flip-flop set from state S20.

Flip-flop ER is an erase flip-flop used on terminating calls to prepare the send-receive circuit 280 for transmission to the register sender group 600, to one of the senders 671–680 which is being used in the call.

Flip-flop XX is used in conjunction with the test and routiner access circuit 254.

Flip-flop RLB is used to indicate via the test and routiner access circuit 254 that a record line busy condition is present for traffic monitoring purposes.

Flip-flop RLS is a release flip-flop used to clear the marker if conditions such as no idle register or link blockage are present.

Flip-flop PXO is used in conjunction with PBX overflow traffic recording, and permits time for the traffic recording operation.

The A.C. input signals for the miscellaneous flip-flops are taken from gated pulse amplifier 3722, except that flip-flop XX may also be reset via its upper reset gate from gated pulse amplifier 3721, so that it will be reset whenever state S16 is entered. The D.C. input signals for these flip-flops are shown in block 3800 and in Table II. The flow chart FIG. 34 shows in which states the flip-flops may be set. In block 3800 the D.C. command to set BV is gate 3801, to reset BV is gates 3806 and 3807, to set BY is logic 3811, to reset BY is gates 3816 and 3817, to set ER is logic 3821, to reset ER is gate 3826, to set XX is logic 3831, to reset XX (lower reset input) is logic 3836, to set RLB is gate 3841, to reset RLB is gates 3846 and 3847, to set RLS is logic 3851, to reset RLS is gates 3856 and 3857, to set PXO is gates 3861 and 3862, and to reset PXO is gates 3866 and 3867.

TABLE II

Figure 49:
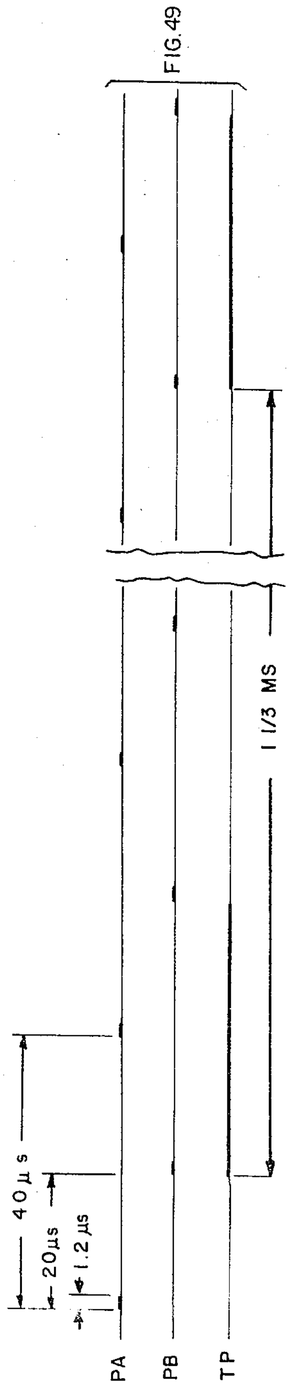
FIGS. 49 and 50 are pulse timing graphs of the clock and operational timer respectively.

Set BV=S20 SPL W BSY
Reset BV=(S18+S29) BV
Set BY=S20 SPL W BSY
+S25 2W $\overline{\text{OC}}$
+S26 W $\overline{\text{OC}}$
Reset BY=(S15+S29) BY
Set ER=S18 PR $\overline{\text{PARG}}$
+S19 R1 HT
+S20 W BSY $\overline{\text{SPL}}$ $\overline{\text{RLB}}$
+S21 2W $\overline{\text{LNK}}$
+S22 $\overline{\text{OTR}}$ LL
+S24 W BSY $\overline{\text{TRX}}$
+S25 5W PXO
+S26 5W PXO
+XX RLX ($\overline{\text{SSE}}$+S14+S15+S16+S17+S18+S19)
Reset ER=ER ZR
Set XX=S13 W BSY TRX
+S20 W BSY RLB
+S24 W BSY TRX
+6W
Reset XX=XX RLX (ER+$\overline{\text{SSE}}$+S14+S15+S16+S17+S18+S19) also note reset at PS16
Set RLB=S20 BSY PD11
Reset RLB=(S15+S29) RLB
Set RLS=$\overline{\text{RLS}}$ (S6 LR $\overline{\text{PS}}$)
+S7 2W $\overline{\text{LNK}}$
+S8 LC LL $\overline{\text{OTR}}$
Reset RLS=(S5+S30) RLS
Set PXO=S25 2W $\overline{\text{OC}}$
+S26 W $\overline{\text{OC}}$
Reset PXO=(S18+S29) PXO Referring to FIG. 39, the clock 3903, which is the basic pulse source for the marker, comprises an oscillator and pulse shaping circuits to produce two pulse trains designated PA and PB. As shown in the graph of FIG. 49, each of these pulse trains comprises pulses of approximately 1.2 microseconds duration occurring every 40 microseconds. The PB pulses are displaced from the PA pulses by 20 microseconds.

Figure 50:
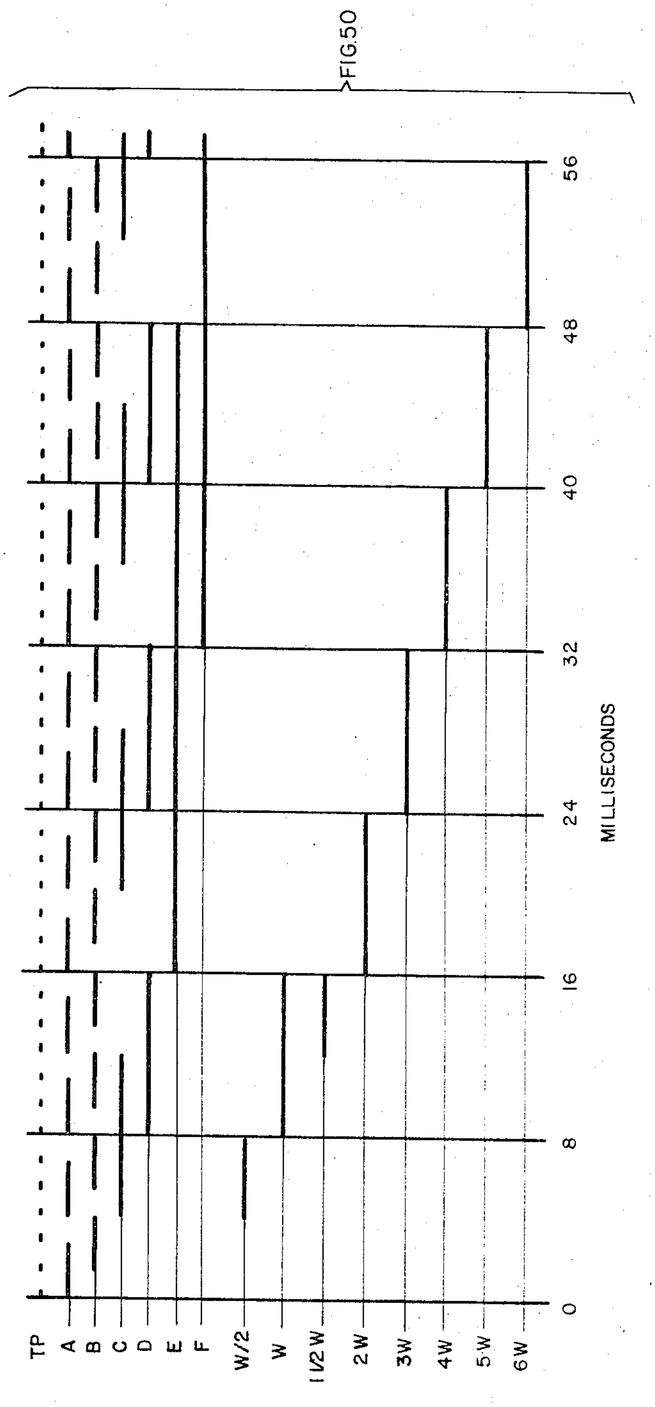

The operational timer shown at the top of FIG. 39 is used to supply signals used in the sequence logic to ensure that there is sufficient time in each sequence state for cetrain operations, such as those involving relays, to be completed. The basic timing for the operational timer is derived from a 1⅓ millisecond multivibrator 3904, and a pulse shaping circuit 3905 controlled by the pulses PB, to produce a pulse train on lead TP comprising pulses of 40 microsecond duration starting at the beginning of a PB pulse, and occuring every 1⅓ milliseconds, as shown in FIG. 49. A counter 3901 comprises six flip-flops A–F along with input logic to the right and output decoding logic to the left. During each occurrence of a TP pulse, a PA pulse is gated through pulse amplifier 3910 to advance the counter 3901, provided that at the same time all of the inputs to NOR gate 3907 are false so that its output is true. This counter is arranged so that the flip-flops A–F are set and reset as shown by the graph in FIG. 50, with each change of state occurring when a TP pulse causes an advance signal to be supplied to the counter. The output signals from the flip-flops are then combined to provide the decoded output signals as shown by the graph in FIG. 50. A reset timer signal is generated by OR gate 3738 each time one of the D.C. input signals to the sequence state flip-flops becomes true, or when the signal PS16 or RC becomes true. This signal via lead G3738 inhibits the advance of counter 3901 and via gate 3920 resets all of the flip-flops A–F, if one or more of them is in the set condition. Therefore the counter 3901 is reset to the zero time of graph FIG. 50 at the beginning of each sequence state.

The cycle counter shown at the bottom of FIG. 39 is used on originating calls to count each time the sequence cycles from state S8 back to state S6 to preselect another register so that after six such attempts a last cycle signal LC is generated to cause release of the marker; and this cycle counter is also used on terminating calls in state S16 to count each time a transmission is made to the sender. It includes a counter 3902 comprising three flip-flops AC1, AC2 and AC3 along with input logic to the right and output decoding logic to the left. The counter is advanced by PB pulses gated through gated pulse amplifier 3930 when the output of gate 3915 is true on terminating calls, or the output of gate 3916 is true on originating calls. The counter is reset by pulses PA gated through gated pulses amplifier 3940 during states S5 or S15 or S29 via gate 3917 if the counter is not already in state R0. Gate 3975 provides a special signal which when true enables gated pulse amplifier 3940 and also supplies D.C. control signals to the inputs of the flip-flops to set the counter to state R2.

In FIG. 39 there is also shown a "call trouble recorder" logic unit 3906 to generate a signal TBR. This signal is generated in states S13 or S24 in response to the condition (W TRX BSY), in state S20 in response to the signal condition (W BSY RLB), or in state S30 in response to the parity signal PARF being false. The signal TRX is a signal to go to the trouble recorder for traffic analysis.

*Communication between marker and register sender group*

FIGS. 52, 53 and 54 when arranged as shown in FIG. 59 comprise a call thru diagram which shows switching connections through the system and signalling paths between the register sender group and the markers and outgoing trunk.

FIG. 52 shows an originating connection through a line group. The calling path extends from a calling party station 5201 through his line circuit 5210 and crosspoints 5212, 5214 and 5216 of the line group switching matrices A, B and C respectively to an originating junctor 5220. From the originating junctor the connection extends via line 0J1B to the group selector, and also via line 0J1C and crosspoint 2418 of the R matrix to the register sender group. In the line group marker, only the send-receive circuit 280 is shown, with the connection from the LNI sender via the relay tree circuit of the line group (not shown in FIG. 52), and thence via the R matrix to the register sender group. In the originating junctor 5220 relay 52JB provides contacts for splitting tip and ring conductors between the calling party and the group selector while there is connection to the register sender group for this call. Relay 52JA provides for holding the receiving switch train and supplying the busy indicating potential. Relay 52BT is provided to supply trunk busy tone to the calling party and to hold the connection until the calling party hangs up.

In FIG. 53 in the upper half there is shown typical paths through the group selector for either a local call or an outgoing call. The inlet circuit 5310 comprises a line relay 53L and a cutoff relay 53CO. The contacts of the line relay provide a connection into the marker, of which only the connection to the send-receive circuit 480 is shown. A local call may be extended via crosspoints 5312, 5314 and 5316 of the A, B and C switching matrices; and an outgoing call may be extended via crosspoints 5313, 5315 and 5317 of other A, B and C matrices of the selector.

In FIG. 54 at the top there is shown a typical outgoing trunk circuit, the one shown being arranged for loop pulsing and reverse battery supervision. It includes a battery feed relay 54BF on the local side of the repeat coil, a supervisory relay 54S which is shunted by a diode for polarization on the outgoing side of the repeat coil, and a slow release hold relay 54H.

In the center of FIG. 54 there is shown a typical terminating connection through a line group marker. The connection extends through a terminating junctor 5430, and crosspoints 5432, 5434, 2614 and 2612 of switching matrices E, D, B and A respectively; thence through a line circuit 5410 to the called party 5401. In the line group marker only the send-receive circuit 285 is shown and particularly the connections thereto used in a terminating call, with connection via contacts of relay TJS in the terminating junctor. Two of these conductors are used for connection to the line loop for receiving the code pulse signals from the sender, and the other four supply party ringing information to the terminating junctor.

Figure 26:
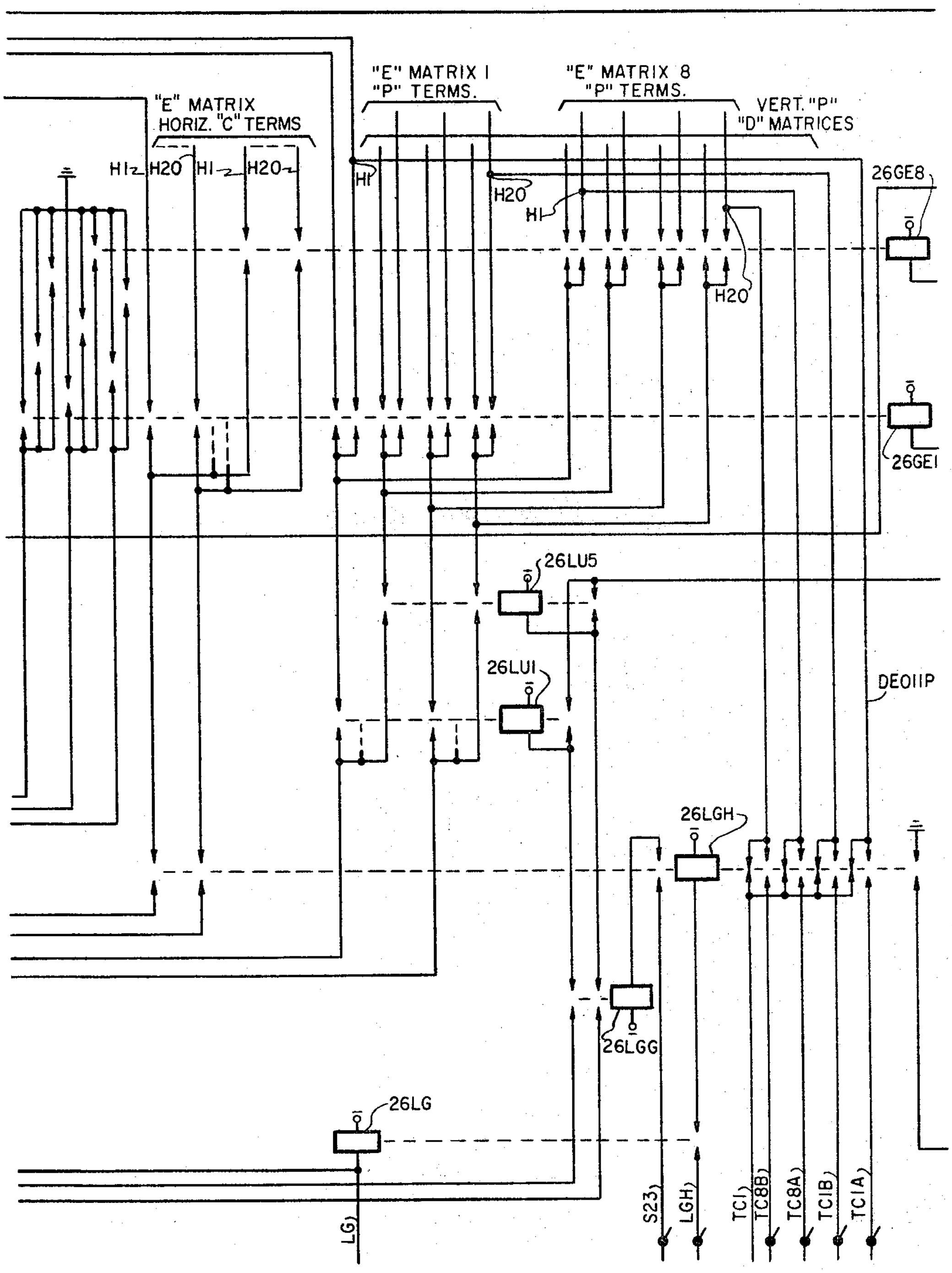

The lower parts of FIGS. 53 and 54 show a partion of the register sender group. In FIG. 53 there is shown part of the register junctor 601, and the register receiver 630. In FIG. 26 there is shown part of one of these senders. The connection to the sender extends from the register junctor 601 via a crosspoint of the RS matrix 681. The relay 54TR shows how normally the di-phase transceiver 5400 is connected to the line loop, and when this relay is operated the di-phase transceiver 5400 is disconnected, and the line loop is extended through contacts of the relay driver 5493 for dial pulse sending and to a repeat coil to an MF transmitter 5403. After completion of seizure for an outgoing call the relay driver 5493 is normally operated via gate 5491, and for outgoing dial pulse signalling this relay driver is interrupted under control of the dial pulse transmitter 5402. For multi-frequency outgoing signalling the relay driver 5493 remains operated and the signals are transmitted from the MF transmitter 5403 via the repeat coil.

Figure 40:
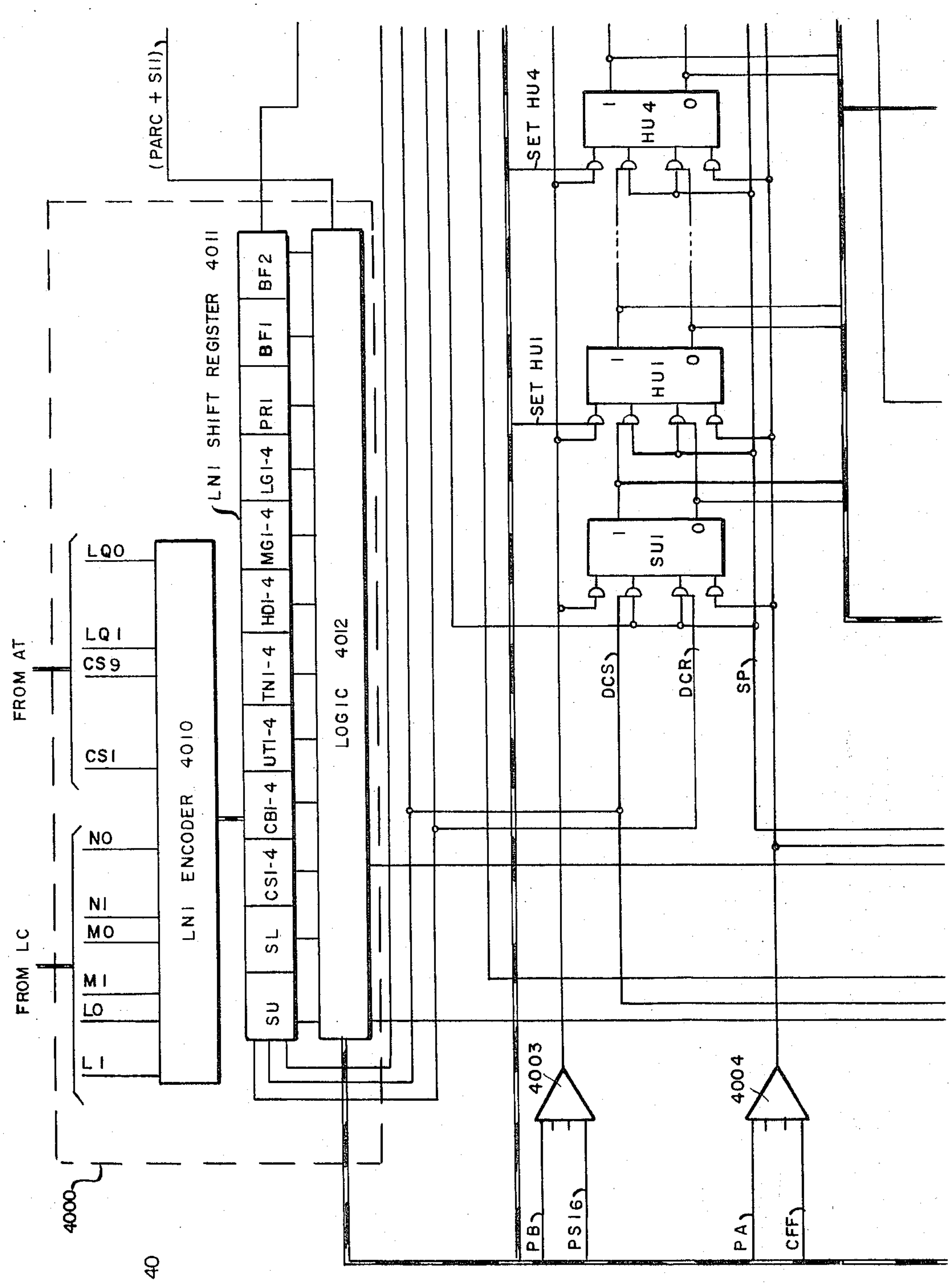
Figure 41:
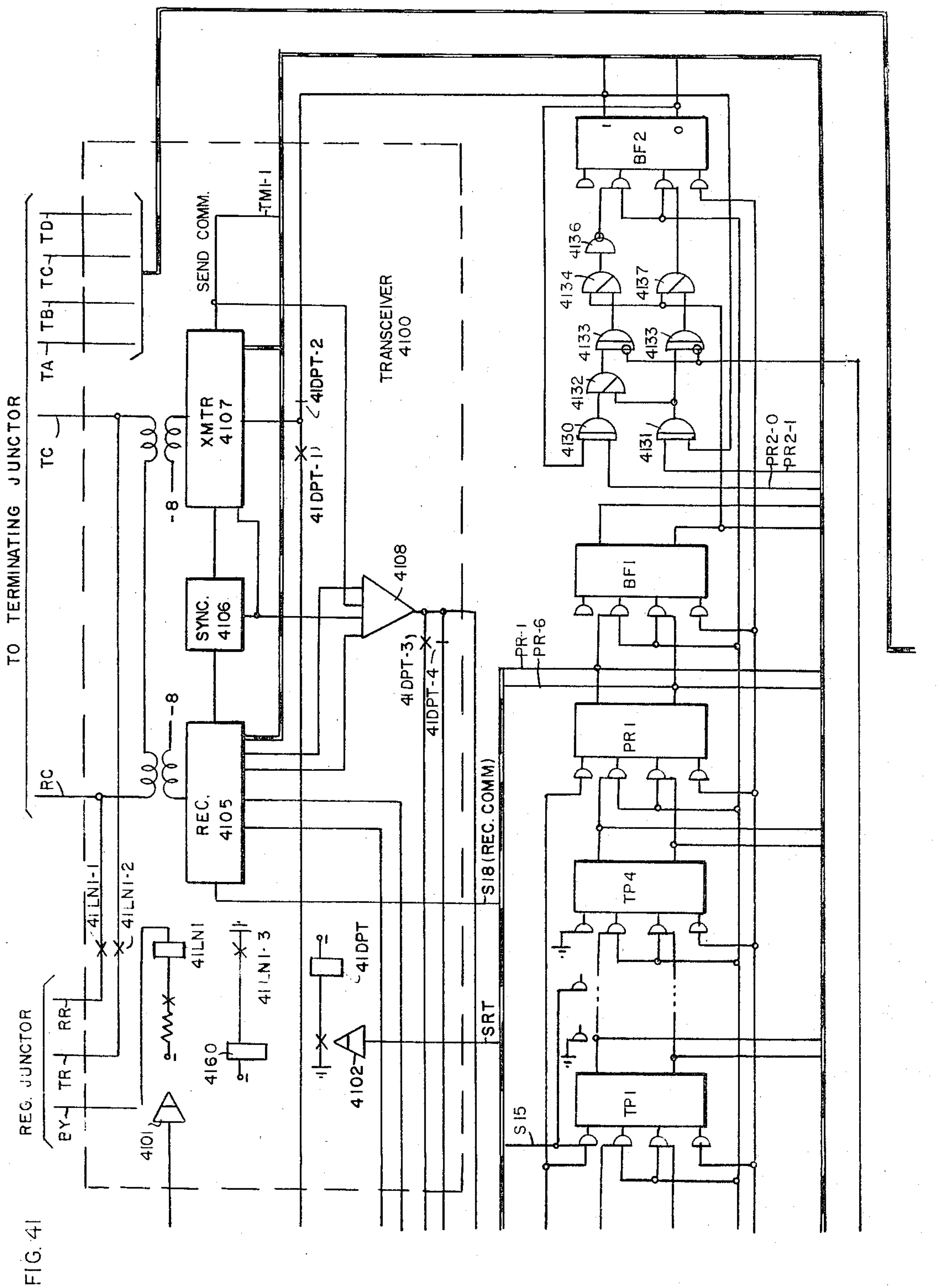

Referring now to FIGS. 40–43, the line group marker send-receive circuit 280 provides a means to communicate with other sections of the system via high speed serial transmission. The send-receive circuit comprises an LNI sender for originating calls, a terminating call portion, and a common transceiver. The LNI sender 4000 is shown in FIG. 40 as comprising an LNI shift register 4011, an LNI encoder 4010 for parallel loading of the shift register, and logic circuit 4012. The terminating call portion comprises a shift register shown by functional blocks extending across the bottom of FIGS. 40 and 41, along with logic circuits in FIGS. 42 and 43. The common transceiver 4100 is shown in FIG. 41, and comprises a receiver 4105, synchronizing circuits 4106, a transmitter 4107, and control circuits.

The LNI portion of the send-receive circuit is provided to transmit the hundreds, tens, units, class of service, and line group matrix identity of the originating line information to the register sender group. This information is parallel loaded via the LNI encoder 4010 into the LNI shift register 4011. The relay driver 4101 closes its contact between resistance battery and the winding of relay 41LNI to thereby transmit a signal over lead BY, and as shown in FIGS. 52 and 53, through the R matrix to the register junctor 601. This signal is repeated via circuits not shown in FIG. 53 to the register, which provides an acknowledgment by operation of relay driver 5323 to put an additional ground via relay 10GO on lead BY, which causes relay 41LNI to operate. The information from the shift register 4011 is then transmitted serially using transmitter 4107, through contacts 41LNI–1 and 41LNI–2 to conductors TR and RR and transmitted through the register junctor 601 into register receiver 630.

*Logic 4012 equations*

Figure 42:
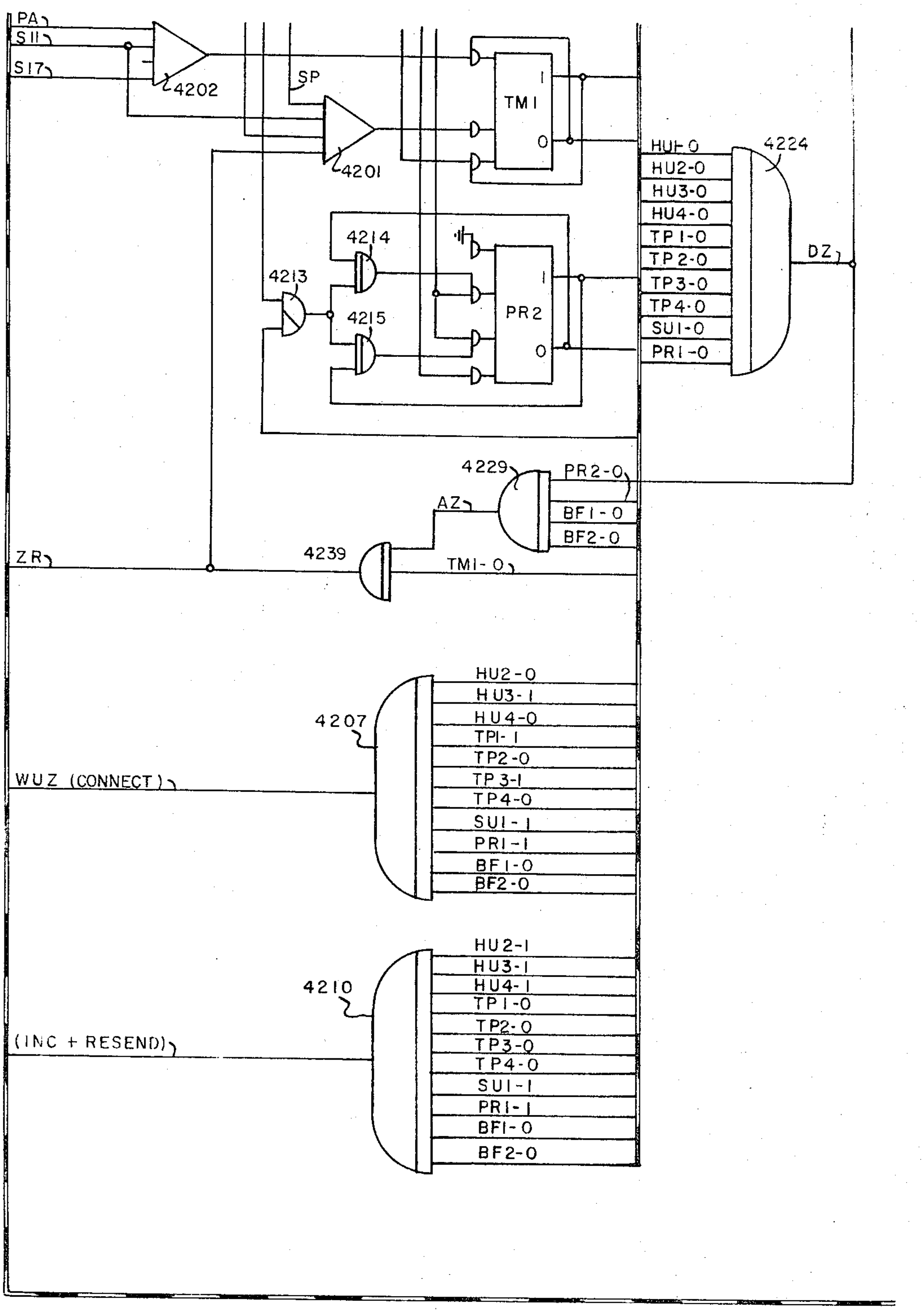
Figure 43:
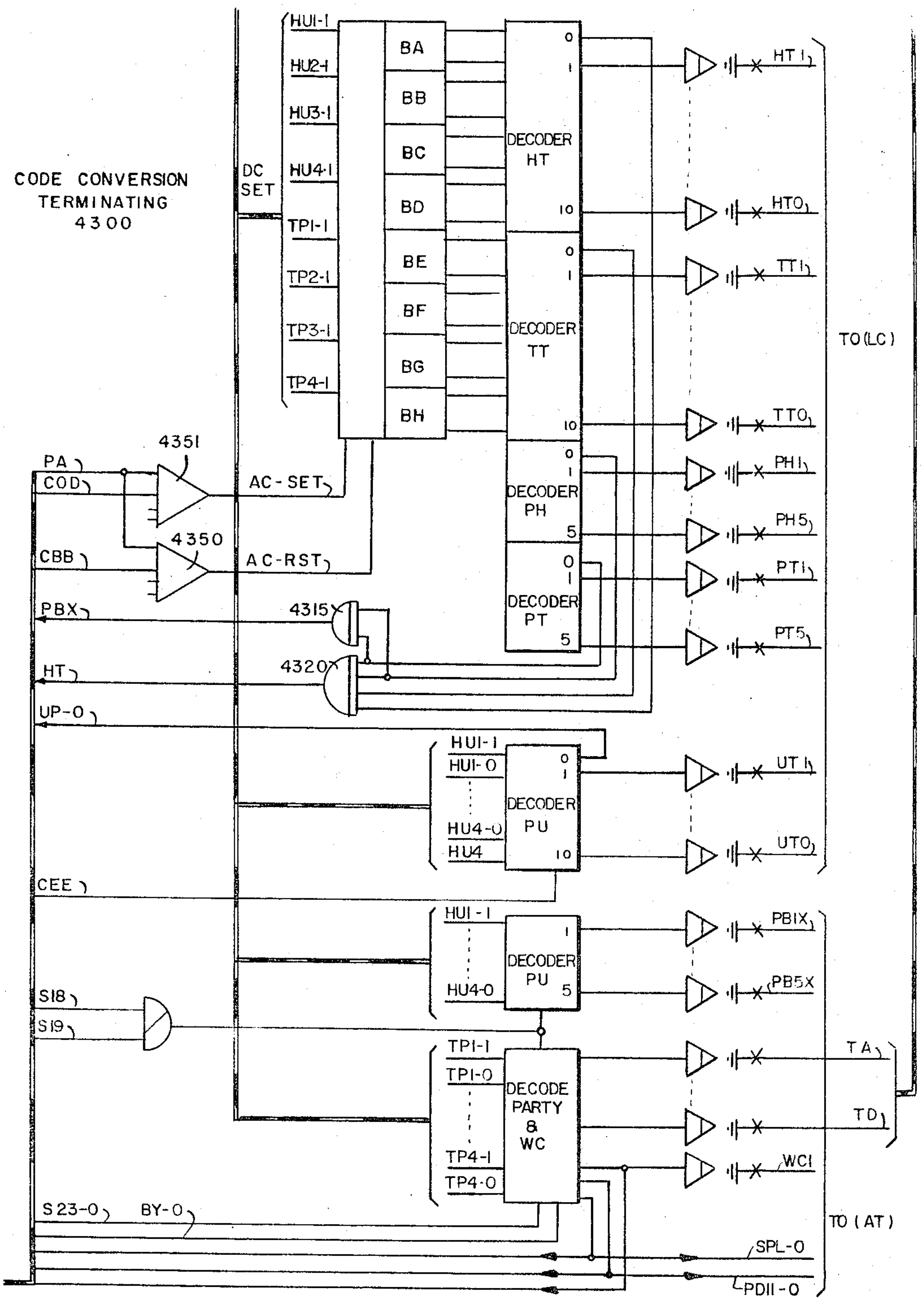

Reset shift register 4011=PA $\overline{ZS}$ OSC
Load shift register 4011=S10 PA
ZS=all zeros in shift register 4011
PARC=S10 $\overline{BF1}$ $\overline{BF2}$ SU PR1 $\overline{PR2}$ $\overline{SL}$ $\overline{CB1}$ $\overline{CB2}$ $\overline{CB3}$ $\overline{CB4}$
Operate driver 4101=PARC+S11
PS10=S9 2W ZS
PS11=S10 GO PARC
PS12=S11 6W PARD The terminating call shift register comprises flip-flop SU1, four flip-flops HU1–HU4 in FIG. 40, flip-flops TP1–TP4, flip-flop PR1, flip-flop BF1, and flip-flop BF2 in FIG. 41. Di-phase control circuits and various logic circuits for terminating calls are shown in FIG. 42, and decoder circuits associated with the terminating call shift register are shown in FIG. 42. Logic is provided for loading and sending instructions (i.e. trunk busy, resend, incomplete, etc.) to the register sender group. Logic is also provided for checking parity of the received data (even number of binary "ones" received), which is accomplished by flip-flops TM1 and PR2. These two flip-flops are used for both the originating shift register and the terminating shift register. Logic is also provided to clear and load data into the shift register.

The code conversion for the terminating portion of the send-receive circuit provides logic to store the information received in the terminating shift register and to change the stored binary information into decimal form for use by the other line group marker circuits. This data constitutes the equipment location identity of a line or PBX group to which the call will be terminated and comprises the hundreds decoder HT, tens decoder TT, units decoder UT, and the party digits and wire chief decoder. Special instructions such as verification and wire chief are processed as part of the party digit information. Decoders PH, PT, and PU generates the PBX information. Logic AND gate 4207 generates the connect signal which is sent to the sender when the transmission path is established thereto. Logic AND gate 4210 generates the incomplete or resend command which is decoded by the sender transmitter in the register sender group. Trunk busy, line busy, and line idle are generated by the sequence and supervisory circuit. Logic AND gate 4214 generates signal DZ which indicates all zeroes in the shift register. Logic AND gates 4238 and 4229 generate command ZR which is used by the sequence and supervisory circuit.

*Counters*

The scanners of the line control and path control circuits of the marker include transistor flip-flop counters. Each of these counters, and also the cycle counter 3902, is arranged to have twice as many counting steps as it has flip-flops. Typical input connections and output decoding gates are shown in detail in FIG. 47, and by blocks for the scanner counters in FIGS. 45, 46 and 48, and the cycle counter 3902 in FIG. 39. Each flip-flop has one set and one reset input pulse gate with the A.C. input connections thereof connected in common from a gated pulse amplifier which supplies advance pulses for the counter. Each flip-flop except the first has the set gate D.C. lead connected from the "1" output of the preceding flip-flop and the reset D.C. lead connected from the "0" output of the preceding flip-flop. The first flip-flop has the D.C. lead of the set gate connected from the "0" output of the last flip-flop and the reset D.C. lead connected from the "1" output of the last flip-flop. This connecting arrangement causes the counter to have twice as many steps as there are flip-flops, as shown in Table III for a typical counter having three flip-flops. In the table the state in which all flip-flops are reset is shown twice, e.g., at the first and last lines, and the five intermediate steps are shown on the lines in between.

TABLE III

| Flip-flop 1 | Flip-flop 2 | Flip-flop 3 |
|---|---|---|
| 0 | 0 | 0 |
| 1 | 0 | 0 |
| 1 | 1 | 0 |
| 1 | 1 | 1 |
| 0 | 1 | 1 |
| 0 | 0 | 1 |
| 0 | 0 | 0 |

Counters having two or five flip-flops will follow a similar pattern. Note that each advance pulse causes the state of each flip-flop except the last to be shifted to the succeeding flip-flop, and the inverted state of the last flip-flop is shifted to the first flip-flop. Some of the counters are also provided with a "reset counter" input from a gated pulse amplifier to separate reset gates of the flip-flops.

*Scanners*

Figure 29:
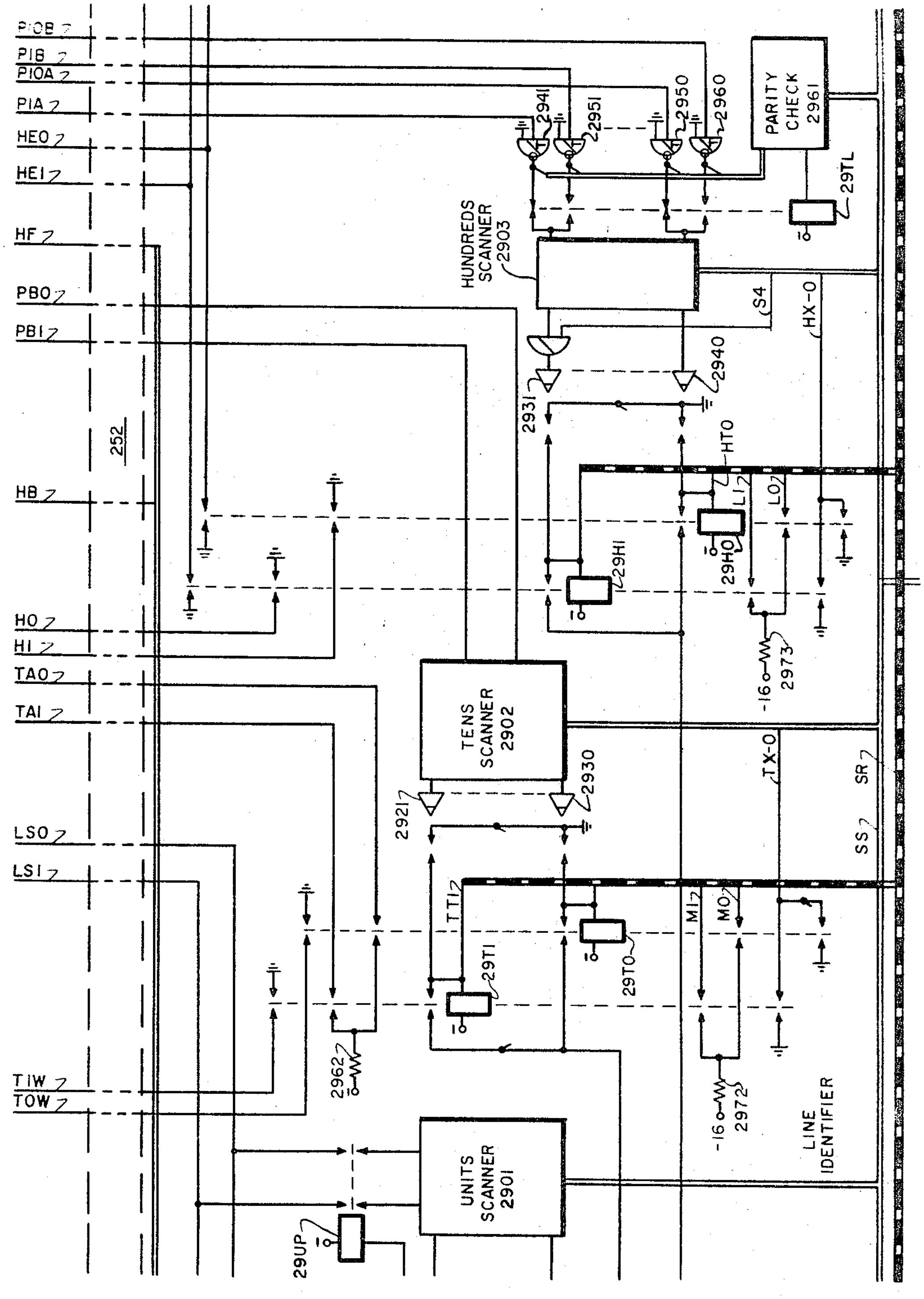
Figure 45:
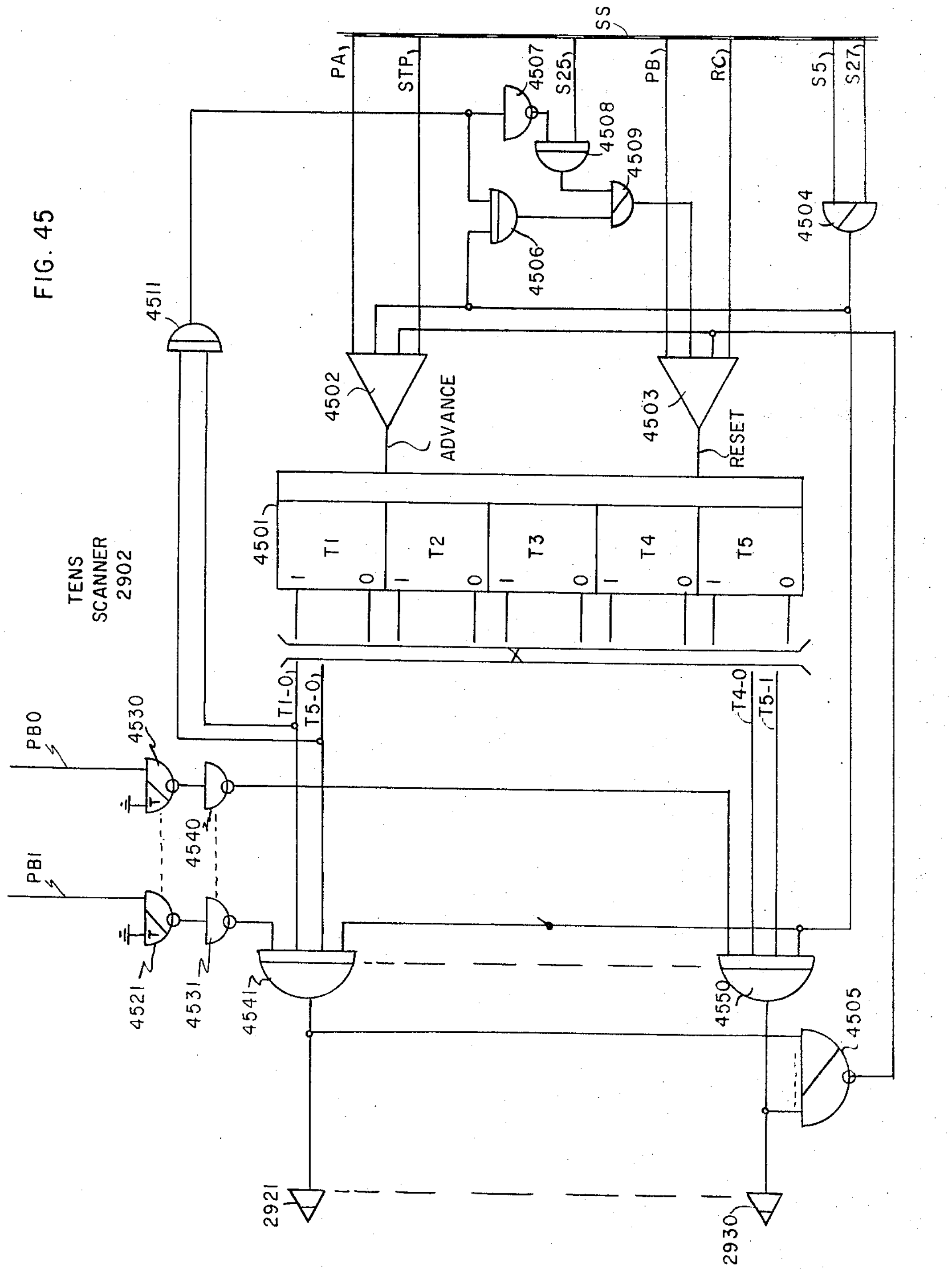
FIGS. 45, 46, 47 and 48 are functional block diagrams of the tens scanner, register selector, route selector and terminating call selector respectively.

The three line scanners of the line control shown in FIG. 29 are similar, and the tens scanner 2902 is shown in functional block diagram form in FIG. 45 by way of example. This scanner comprises a counter 4501 having five flip-flops T1–T5 with input logic in a block to the right. The output decoding gates are shown as 4541–4550 driving the output relay drivers 2921–2930. The states of the flip-flops for each of the ten steps of the counter is shown in Table IV. It may be seen that with this code the outputs from only two of the flip-flops need be connected to the decoding gates, as indicated by the underlining in the table.

TABLE IV

| | T1 | T2 | T3 | T4 | T5 |
|---|---|---|---|---|---|
| 1 | $\underline{0}$ | 0 | 0 | 0 | $\underline{0}$ |
| 2 | $\underline{1}$ | $\underline{0}$ | 0 | 0 | 0 |
| 3 | 1 | $\underline{1}$ | $\underline{0}$ | 0 | 0 |
| 4 | 1 | 1 | $\underline{1}$ | $\underline{0}$ | 0 |
| 5 | 1 | 1 | 1 | $\underline{1}$ | $\underline{0}$ |
| 6 | $\underline{1}$ | 1 | 1 | 1 | $\underline{1}$ |
| 7 | $\underline{0}$ | $\underline{1}$ | 1 | 1 | 1 |
| 8 | 0 | $\underline{0}$ | $\underline{1}$ | 1 | 1 |
| 9 | 0 | 0 | $\underline{0}$ | $\underline{1}$ | 1 |
| 10 | 0 | 0 | 0 | $\underline{0}$ | $\underline{1}$ |

The counter is advanced by PA pulses through gated pulse amplifier 4502 when there is coincidence of a true output from OR gate 4504 during states S5 or S27, and there is no true output signals from any of the gates 4541–4550, so that the output of NOR gate 4505 remains true. The line identification leads PB1–PB0 from the relay tree of the connect circuits are connected respectively to the detecting type NOR gates 4521–4530, which are designated with a T. The respective outputs are inverted by inverting amplifiers 4531–4540 and connected to the respective inputs of gates 4541–4550. These gates also have an enabling input from gate 4504 during the scanning states S5 or S27. A negative potential on any of the leads PB1–PB0 is detected and appears as a negative potential or true signal at the corresponding gates 4541–4550. Then when the counter 4501 is advanced to the corresponding step coincidence of a true signal at all of the inputs of that one of the gates 4541–4550 produces a true output signal which via NOR gate 4505 stops the advance of the counter, and also the corresponding one of the relay drivers 2921–2930 operates. Whenever the counter is in the state corresponding to tens digit 1 a decoding gate 4511 supplies a signal via gate 4506 and gate 4509 to the gated pulse amplifier 4503 to ensure that all of the flip-flops are reset to the zero state as they should be for this step. During sequence state S25, if the counter is not in the step for tens digit 1 gate 4508 is enabled to supply a signal via gate 4509 and gated pulse amplifier 4503 to reset the counter to the state for tens digit 1. This occurs during a terminating PBX call. At the end of each call the signal STP from gate 3547 causes the scanners to each advance one step, in this case by enabling gated pulse amplifier 4502.

In the hundreds scanner, the twenty detecting gates 2941–2960 corresponding to the ten gates 4521–4530 of the tens scanner. For hundreds digit 1 the relay driver 2931 may be set via an OR gate from either the scanners detecting coincidence in step one or by the signal S4. The other nine relay drivers are set in the ordinary manner only from the output of the scanner. The hundreds scanner is enabled via a gate corresponding to gate 4504 during states S3 or S26.

The units scanner 2901 is similar to the tens scanner 2902, and is enabled via a gate corresponding to gate 4504 during sequence states S7 or S28.

*Register selector*

Figure 46:
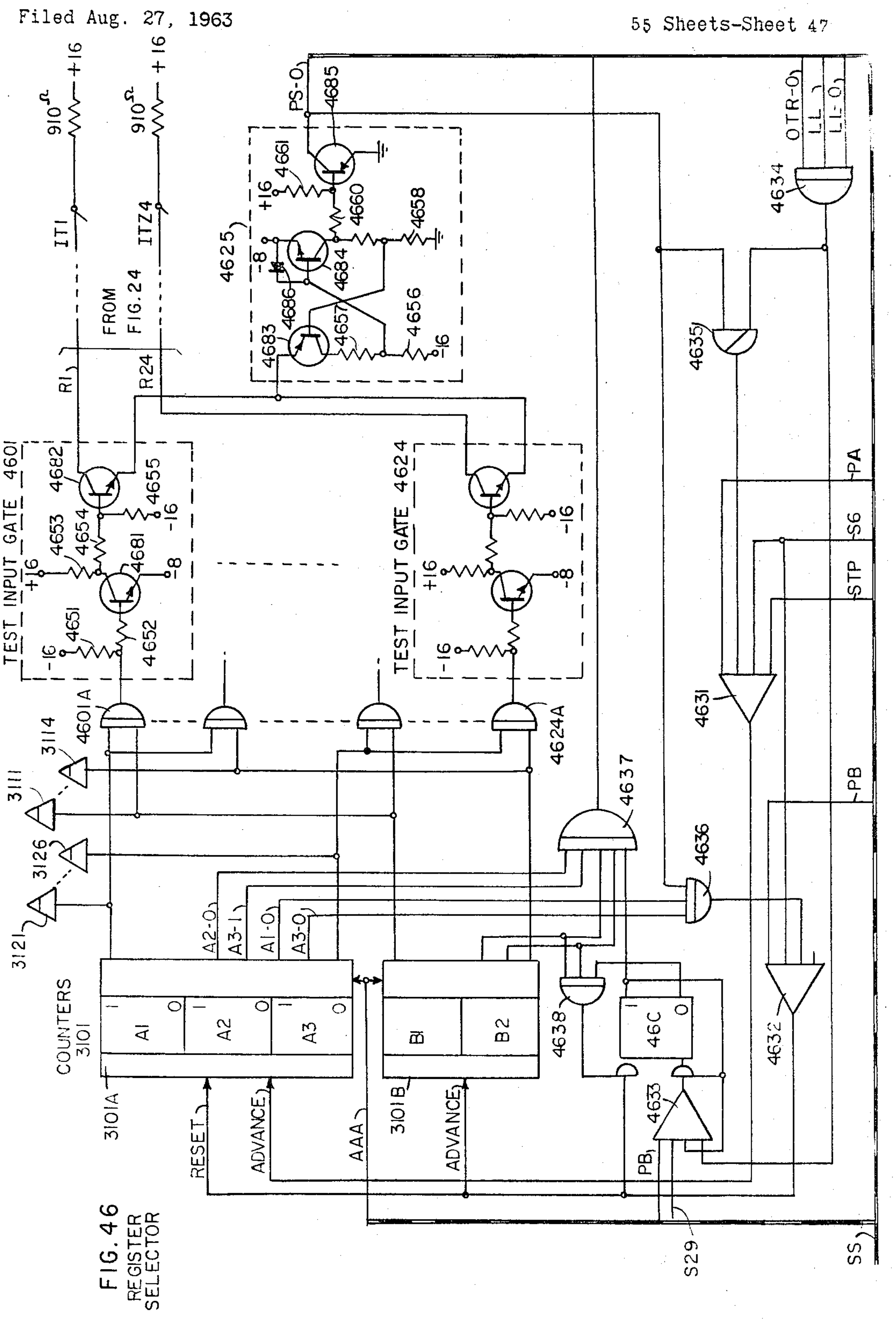

The register selector includes the parallel test and associated decoding gates 3102. In FIG. 46 the parallel test circuit is shown symbolically as comprising the twenty-four test input gates 4601–4624 along with a direct coupled bi-stable trigger circuit 4625. The test input gates are enabled in turn by the decoding gates 4601A–4624A from the two scanning counters **3101*a*** and 3101B. The test gates have connections via the respective conductors R1–R24 through the relay trees of FIG. 24 to the register junctor idle test leads IT1–IT24, which as shown in FIG. 53 extend through break contacts of two relays and a 910-ohm resistor to a +16 volt potential source. When the register junctor is busy one or both of the relay contacts open so that there is no positive potential on the idle test lead. Instead of the break contact arrangement in the register junctor a make contact arrangement could be provided to connect the idle test lead to a source of negative potential to indicate a busy register junctor. Each idle test lead is multipled to other markers, so that two or more markers may be scanning for registers at the same time and test at the same idle test lead in parallel. The parallel test arrangement provides circuits which permit only one marker to seize the register and lock out all other markers.

The parallel test circuit comprises a PNP transistor 4683 and an NPN transistor 4684 in a direct coupled bi-stable trigger circuit. A diode 4686 is connected between the emitter and base electrodes of transistor 4684 and reverse poled with respect to the emitter-base junction, and the emitter electrode is connected to a negative 8-volt source. In the normal "off" condition diode 4686 and resistor 4656 reverse bias transistor 4684.

The emitter electrode of transistor 4683 is connected in multiple to the emitter electrodes of transistors in the input gate circuits 4601–4624. For example in gate 4601 this conductor is connected to the emitter electrode of transistor 4682.

Normally gate 4601 has ground potential at its output and drives transistor 4681 into conduction. The collector electrode of transistor 4681 is then near negative 8 volt, and the gate transistor 4682 is reverse biased and maintained cut off. As long as all of the gates 4601–4624 are off, the transistor 4683 of the bi-stable trigger circuit is maintained cut off. Thus both transistors 4683 and 4684 are nonconducting and the parallel test circuit is in an off state. The bias connections for transistor 4682 insure that any leakage current is drained off, so that the transistor 4682 remains cut off.

Assume now that the scanner enables gate 4601A so that the ground potential is removed from its output. Then transistor 4681 is cut off and a positive potential is applied to the base electrode of transistor 4682. A path to the emitter electrode of transistor 4682, and thence through the emitter-base junction of transistor 4683 and resistor 4658 to ground forward biases the transistors 4682 and 4683. If no other parallel test circuit is connected via one of its test input gates to lead R1, current will now flow from the positive 16-volt source through the 910-ohm resistor, transistor 4682, transistor 4683, resistor 4657, and resistor 4656 to the negative 16-volt source. When the collector current of transistor 4683 reaches a sufficient value, the potential at the junction of resistors 4656 and 4657 reverse biases the diode 4686, and the emitter-base junction of transistor 4684 is forward biased to start transistor 4684 conducting. The collector current of transistor 4684 makes the junction of resistors 4658 and 4659 more negative and increases the forward bias of transistor 4683; thus both of the transistors 4683 and 4684 are both rapidly driven into full conduction. Output is taken from the collector electrode of transistor 4684 through resistor 5660 to switch the output transistor 4685 into conduction, placing the collector electrode near ground potential. This makes the output signal PS–0 false (signal PS true).

Consider now the situation in which two markers are connected to the idle test leads, and simultaneously the scanners of the two markers enable their test input gates to the same idle test lead, so that both of the parallel test circuits of the two markers are connected to the same idle test resistor, such as that connected to lead R1. Then current starts to conduct through transistors 4682 and 4683 in series, and at the same time through corresponding transistors in the parallel test circuit of the other marker. Because of the differences in the transient characteristics and conditions, one of the parallel test circuits will switch into full conduction, and this causes the other parallel test circuit to revert to the cutoff state. Thus the unique selection between two or more simultaneous tests is established.

In an exemplary embodiment of the parallel test circuit, the 910-ohm test resistors each have a power rating of 2 watts, and these along with all the other resistors have a tolerance of ±5%. The component types and values are given in the following table using the reference characters shown for gate 4601 and trigger circuit 4625.

| | |
|---|---|
| Transistors: | |
| **4681** | 2N1605 |
| **4682** | 2N1605A |
| **4683** | 2N404 |
| **4684** | 2N1605 |
| **4685** | 2N404 |
| Diode: | |
| **4686** | Sylvania D1034 |
| Resistors: | Ohms |
| **4651** | 10,000 |
| **4652** | 7,500 |
| **4653** | 2,000 |
| **4654** | 1,500 |
| **4655** | 12,000 |
| **4656** | 750 |
| **4657** | 51 |
| **4658** | 2,400 |
| **4659** | 100 |
| **4660** | 3,000 |
| **4661** | 33,000 |

During sequence state S6, as long as the signal PS–0 is true, the gated pulse amplifier 4631 is enabled by coincidence of its center two inputs and therefore gates the PA pulses to advance counter 3101A. Whenever counter 3103A is in the state in which flip-flops A1 and A3 are reset and signal PS–0 remains true gate 4636 supplies the signal which with signal S6 enables gated pulse amplifier 4632; which gates the PB pulses to advance the counter 3101B one step and supplies a reset signal to counter 3101A to make sure that all three flip-flops are in the reset condition. Thus each time the counter 3101A makes a cycle of six steps the counter 3101B is advanced to the next of its four steps, so that via the decoding gates 4601A–4624A all twenty-four of the test input gates 4601–4624 are enabled to test all of the register junctor idle test leads if necessary. When an idle register junctor is found the parallel test circuit causes the signal PS–0 to become false which via gates 4635 and 4636 inhibits the gater pulse amplifiers 4631 and 4632 respectively. Therefore the counters 3101 stop in the position corresponding to the selected idle register. The signal PS–0 is also supplied to the sequence circuits to advance to the next sequence state S7.

The lower input of gated pulse amplifier 4632 may be enabled via circuits not shown if it should happen that the counter 3101A is in a condition which is not one of the correct counting steps, to thereby cause the three flip-flops of counter 3101A to be reset to zero.

At one of the steps of counter 3101B gate 4638 supplies a D.C. set signal to the set input gate of flip-flops 46C, which is then set in response to the next pulse from gated pulse amplifier 4632. The AND gate 4637 has a pair of inputs representing the code for the same step of counter 3101B as is supplied to gate 4638, and there is also a pair of inputs to gate 4637 for one of the steps of counter 3101A. Thus with flip-flop 46C set, the next time this step of counter 3101B appears and the particular step of counter 3101A appears, then all of the registers have been scanned at least once, and the last register signal LR from gate 4637 becomes true. Flip-flop 46C is reset via gated pulse amplifier 4633 during the sequence state S29.

In state S29 the signal STP from gate 3547 enables gated pulse amplifier 4631 to advance counter 3101A one step.

*Route selector*

Figure 47:
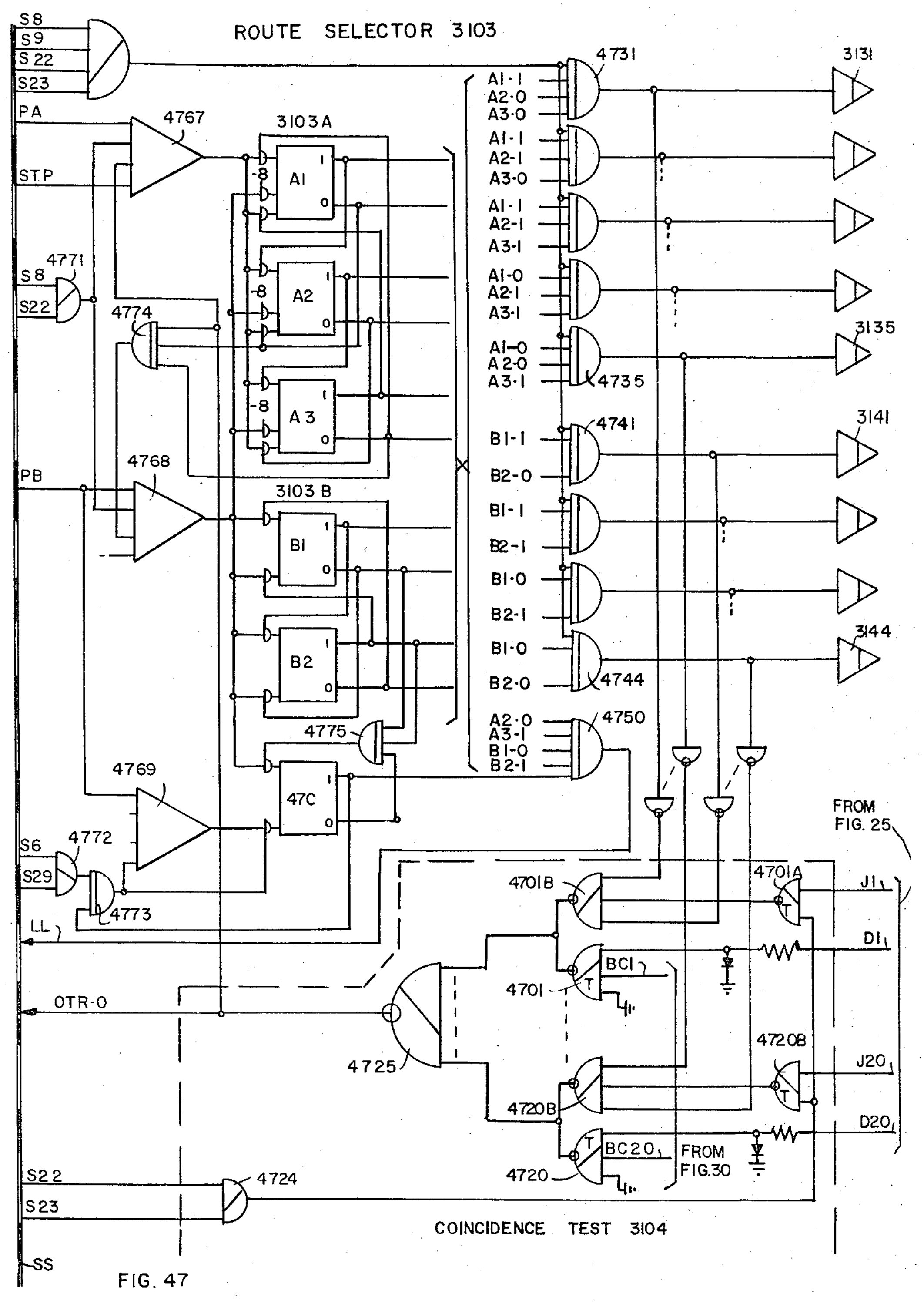

The route selector comprises a scanner 3103 and a coincidence test unit 3104 shown in FIG. 47. The scanner comprises a six-step counter 3103A of which five steps are used, and a four-step counter 3103B. With the sequence in state S8 or S22 via gate 4771, and with the true condition of signal OTR–0 from gate 4725 of the coincidence test unit, the scanner is enabled via gated pulse amplifier 4767, PA pulses are supplied as advance signals to counter 3103A. When the counter is in its unused step in which flip-flops A1 and A3 are reset, and signal OTR–0 is still true, the AND gate 4774 enables gate 4768 to supply PB pulses to advance counter 3103B, and supplies a reset signal to counter 3103A to insure that all three of its flip-flops are in the zero state. The decoding gates 4731–4735 and 4741–4744 are enabled via gate 4740 during sequence states S8, S9, S22 or S23.

Figure 25:
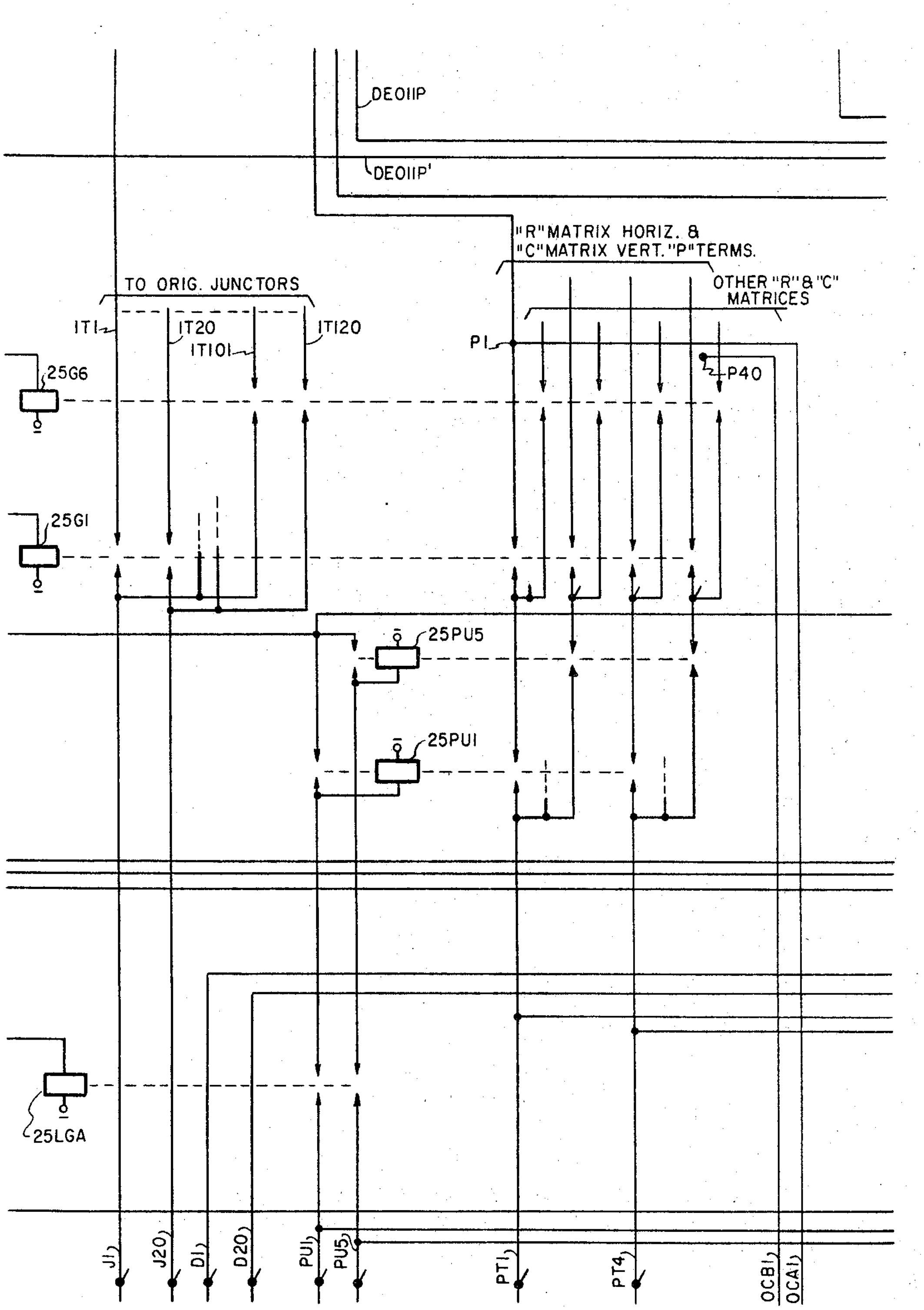

In the coincidence test unit 3104, the leads J1–J20 which come from the orginating junctor idle test leads via the relay tree in FIG. 25 are connected to the detecting type NOR gates 4701A–4720A. The leads D1–D20 from the DE links via the relay tree of FIG. 25 are connected via respective series resistors and shunt diodes to detecting type NOR gates 4701–4720. The leads BC1–BC20 from the link grouping circuits of FIG. 30 are also connected to inputs of gates 4701–4720. The outputs from gates 4701A–4720A are connected to NOR gates 4701B–4720B. Each of the gates 4701B–4720B also has one input via an inverting amplifier from a decoding gate of counter 3103A, and another input via an inverting amplifier from a decoding gate of counter 3103B. Each of the detecting NOR gates 4701–4720 has its output connected in parallel with the output of the corresponding one of the NOR gates 4701B–4720B. In this arrangement, as long as any one of the inputs of the pair is at negative potential the output is maintained at ground potential.

During sequence state S8 for an originating scan the OR gate 4724 supplies ground potential to each of the gates 4701A–4720A. Busy originating junctors supply ground potential to their idle test leads causing the outputs of the corresponding ones of gates 4701A–4720A to be at negative potential; and idle originating junctors supply negative potential to their idle test leads causing the corresponding ones of the gates 4701A–4720A to be at ground potential. The leads D1–D20 are all open at this time and therefore have no effect upon the coincidence test unit. On the leads BC1–BC20 for paths that are unavailable there will be negative potential and for those that are available there will be an open circuit condition. Assume that the originating junctor having its idle test lead connected to lead J1 is idle and that the scanner has advanced to the corresponding position. Then at gate 4701B the outputs of the inverting amplifiers from gates 4731 and 4741 are at ground potential and the output from gate 4701A is also at ground potential. At gate 4701 lead BC1 is open and lead D1 is also open. Therefore the output of the combination of gates 4701 and 4701B is true and causes the output of NOR gate 4725 to go to ground potential. This makes the signal OTR–0 false (OTR true) to stop the scanner 3103 and also supply a signal to the sequence supervisory circuit to advance the sequence state. The relay drivers 3131 and 3141 are now operated to mark the selected route.

During sequence state S22 for a terminating call scan, the output of OR gate 4724 is true and disables all of the gates 4701A–4720A. Routes in which the DE link is busy will have negative potential applied to the corresponding lead D1–D20, and routes in which the AB or BC link is unavailable will cause negative potential to be applied to the corresponding one of the leads BC1–BC20. In response to the scanner being in a position corresponding to an available route the output of the pair of gates such as gates 4701 and 4701B will be true and will cause the output of NOR gate 4725 to go to ground potential to stop the scanner 3103 and supply a signal to the sequence circuits to advance the sequence state.

One of the steps of counter 3103B enables gate 4775, which supplies the D.C. signal to the set input of flip-flop 47C, which is set on the next occurrence of a pulse from gated pulse amplifier 4768. Then if none of the twenty routes is available the next time this step of counter 3103B occurs in coincidence with a particular one of the outputs of counter 3103A, gate 4750 is enabled to generate the "last link" signal LL. Flip-flop 47C is reset via gated pulse amplifier 4769, which is enabled via gates 4772 and 4773 during state S6 if the sequence recycles to select another register, or in state S29 when the marker is released.

*Terminating selector*

Figure 33:
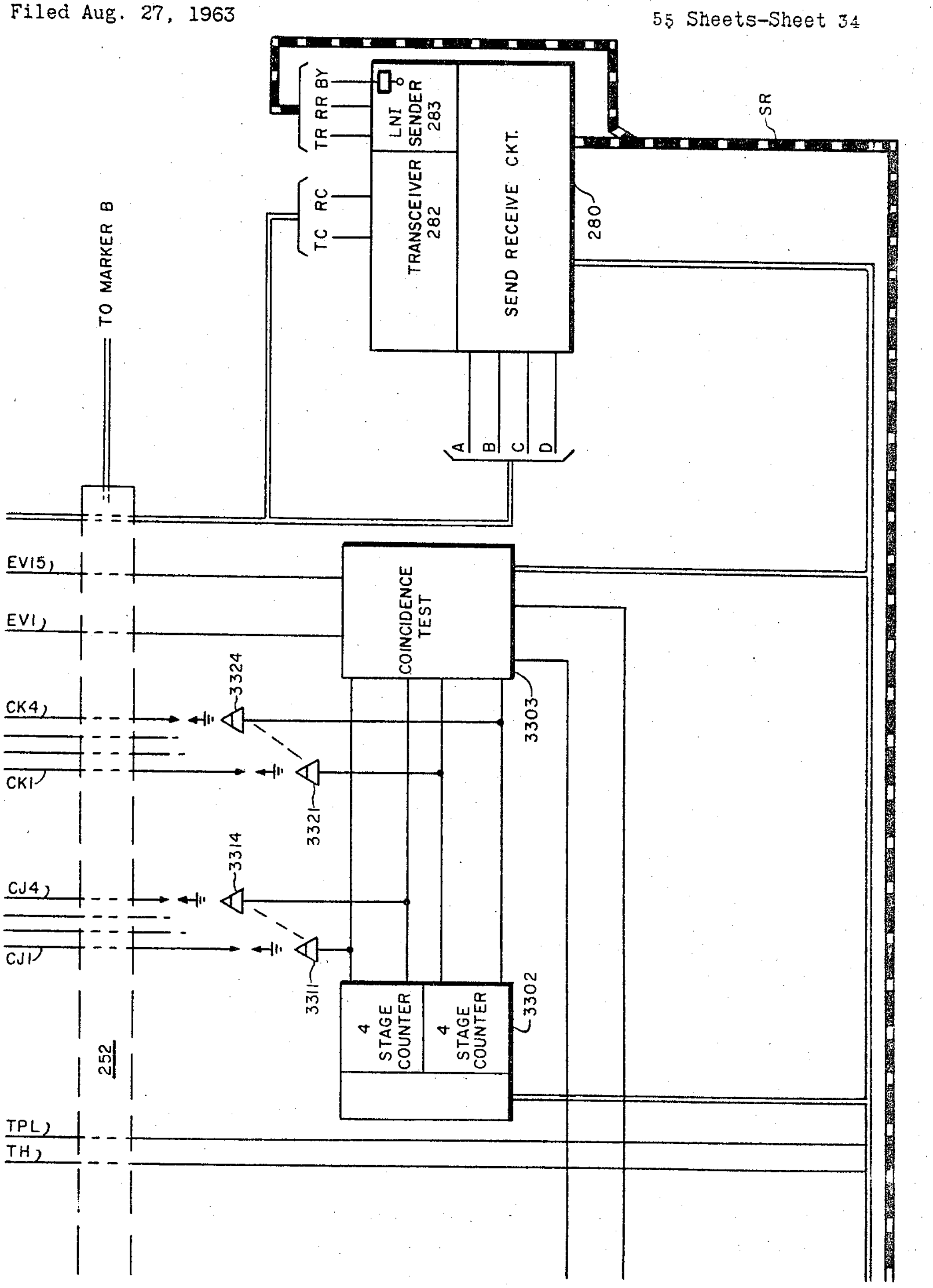
Figure 48:
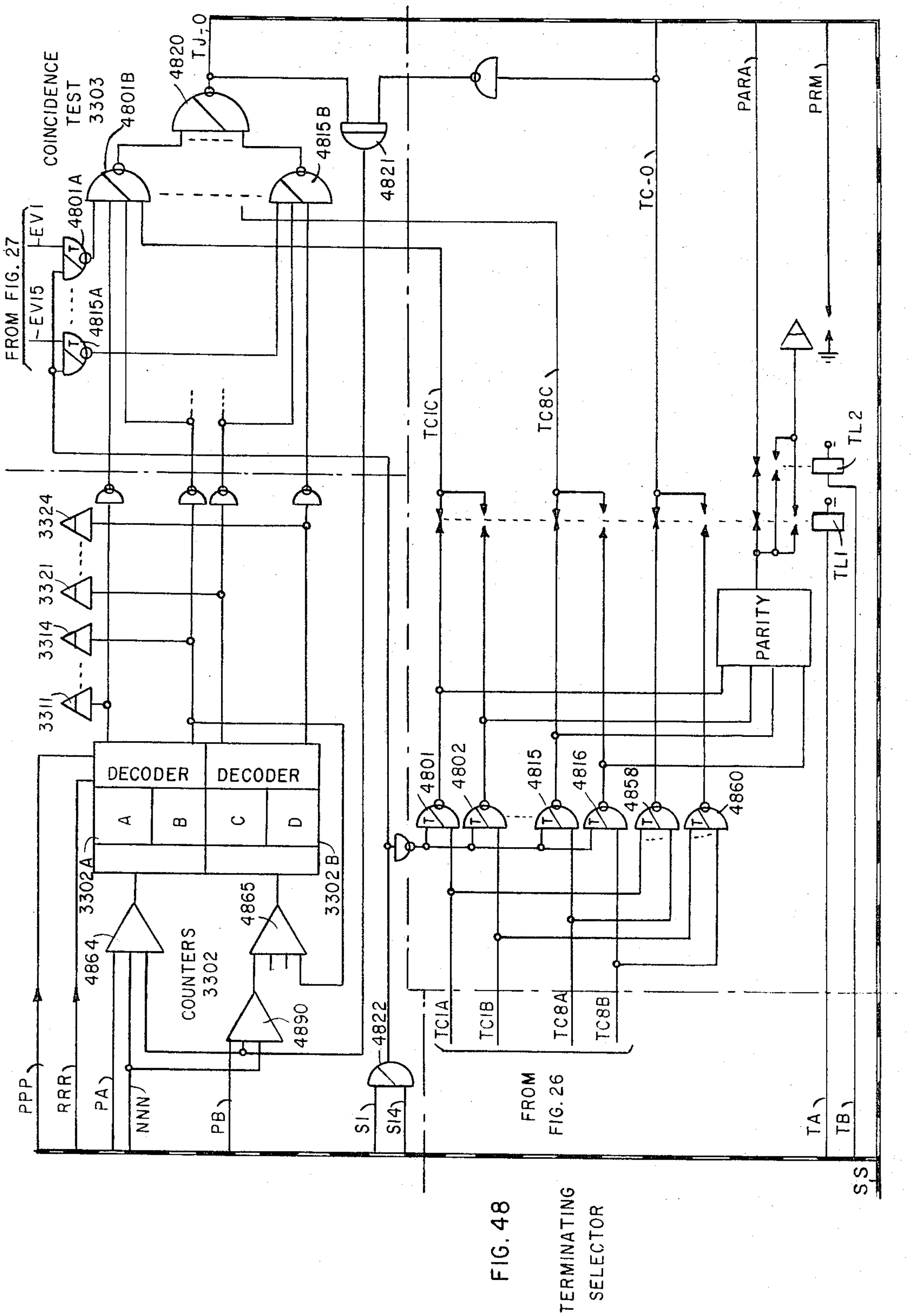

The terminating selector, shown in FIGS. 32 and 33 as comprises units 3201, 3202 and 3303, is shown in FIG. 48 in symbolic block form. The scanner comprises a counter 3202A having flip-flops A and B along with input and decoder circuits, and counter 3302B which comprises flip-flops C and D along with input and decoder circuits.

The gated pulse amplifier 4864 is actuated by the signal NNN from gate 3563 which is true during state S1 and in state S15 after the first four milliseconds, to supply pulses from the PA source to drive counter 3302A. The gated pulse amplifiers 4890 and 4865 cause the counter 3302B to be advanced from the PB pulse source when counter 3302A is in its fourth step. The signal PPP from gate 3556 via an inverter is an enabling input to the decoder gates of counter 3302A and first two decoder gates of counter 3302B. The signal RRR from gate 3558 via an inverter is an enabling input to the last two decoding gates of counter 3302B. During states S1 or S14 the signal PPP is true and the signal RRR is false. During the first four milliseconds of state S15 both of the signals PPP and RRR are false. During state S15 after 4 milliseconds both of the signals PPP and RRR are true.

The leads TC1A–TC8A from the E group matrices are connected to the odd numbered ones of the detecting type NOR gates 4801–4816, and the eight leads TC1B–TC8B are connected to the even numbered ones thereof. The outputs of these sixteen gates are connected to a parity circuit which among other things generates the parity signal PARA if there is parity of all E groups. The relay TR1 connects either the even or the odd ones of the gates 4801–4816 to the leads TC1C–TC8C. The leads TC1A–TC8A are connected as inputs to the detector type NOR gate 4858, and the leads TC1B–TC8B are connected to gate 4860 to make the signal TC true (ground potential on conductor TC–0) whenever there is a terminating call requesting service. The signal condition (TC $\overline{\text{TJ}}$) via gate 4821, along with the signal NNN enables the scanner. During states S1 or S14 the gate 4822 via an inverter supplies an enabling (zero) input signal to the NOR gates 4801–4816, and inhibits the gates 4801A–4815A. The leads TC1C–TC8C are connected respectively to the first eight of the coincidence gates, e.g. 4801B–4808B. At coincidence of all zeroes at the inputs of one of the gates 4801B–4808B, the output via NOR gate 4820 makes the signal TJ–0 false (TJ true) to stop the scanner and supply a signal to the sequence circuits to advance the sequence to state S14. State S14 provides an interval of 16 milliseconds time which one of the four relay drivers 3311–3314, and one of the relay drivers 3321 or 3322 is operated to operate the corresponding relays in the connect circuit. This completes the selection of the E group matrix and causes connection of 15 P leads from terminating junctors through a relay tree in FIG. 27 to the fifteen leads EV1–EV15.

The leads EV1–EV15 are connected respectively to the detecting type NOR gates 4801A–4815A, whose outputs are in turn connected as inputs to the coincidence test NOR gates 4801B–4815B. After a brief waiting period in state S15 the scanner is again started and upon coincidence of all zeros at one of the gates 4801B–4815B an output signal via NOR gate 4820 again makes the signal TJ true (conductor TJ–0 at ground potential) to stop the scanner and supply a signal to the sequence circuits.

OPERATION OF LINE GROUP MARKER—ORIGINATING CALL

Assume now that the subscriber at station S111 initiates a call. In response to the closing of the subscriber loop, the line relay 12L of line circuit LC111 operates and closes its contacts. Negative battery potential through the break contacts of relay 21LR is applied over conductor LR1 and resistor 1211 of line circuit LC111 and the contacts of relay 12L to the pull conductor L111P, thence through diode 1201 and winding 1202 on card A11, diode 1301 and pull winding 1302 on card B11, to conductor BC101P at the input of card C1. The potential is also applied through diode 1401 and winding 1402 of card C1 to the lead OJ1AP of vertical V1 to FIG. 25, thence by way of conductor OCA1 to an input of the allotter in FIG. 32. Note that the potential on the pull lead L111P is also applied through another path on P conductors through the A, B and C stages to a vertical P conductor of matrix C10 and thence by way of conductor OCB1 to another input of the allotter. Also at the horizontal input of card C10, the potential appears on conductor BC110P. This use of alternate signals by way of matrix C10 provides an extra margin of safety in case of failures of diodes in the switching network.

The signal to the allotter through OR gate 3261 operates the relay driver 3271 which at its contacts supplies ground for operating relay 32A1. The other line groups are locked out by allotter circuits not shown. The signal potential of conductor OCA1 and OCB1 through contacts 1 and 2 of relay 32A1 and through gates 3253 is supplied to conductor OC, and thence through cable SS to the sequence and supervisory circuit 290. At contacts 3 of relay 32A1 ground is applied to conductor LG1 to operate the relays 26LG, 24LG, 22LG, 21LG and 20LG which connects line group 1 to the marker. The signal on conductor LG1 through OR gate 3280 supplies a signal on conductor LG to the sequence and supervisory circuits. The signal HF through contacts of relay 22LG operates relay 22HE. Relay 22HE prepares operate circuits for the relays 22HEP1 to 22HEP0, connects through the conductors BC101P to BC001P through the ampliers 2941 to 2950 and the break contacts of relay TL to the hundreds scanner 2903, and also connects through the alternate conductors BC110P to BC010P.

Referring now to the flow chart, FIG. 44, and assuming that the marker was in the idle state S30, it can be seen that in response to the signals LG and OC from the allotter, and an allotter parity signal PARE, the sequence operation is started.

COMMAND: S30 LG PARE $\overline{\text{S30T}}$
ENTER STATE S29

COMMAND: S29 LG OC 2W $\overline{\text{RLS}}$ PARE $\overline{\text{S30T}}$
ENTER STATE S1

It is assumed that there is no terminating call, so the marker after checking parity of all E matrix groups, goes to the originating call sequence.

*COMMAND: S1 $\overline{\text{TC}}$ PARA
ENTER STATE S2

The marker checks parity of all hundreds groups (PARB), and determines whether there is a call in the priority hundreds group "1." If the call is in other than hundreds "1," a signal OCX is generated and the command S2 OCX $\overline{\text{OC1}}$ PARB steps the sequence to state S3, which causes a 10-step counter in the hundreds scanner 2903 to start and step until it finds coincidence of its output with a signal at one of the inputs to the scanner. The scanner then operates the corresponding one of the relay drivers 2931 to 2940, which places ground on lead HX–O.

However in our case the call is in hundreds "1," which is given priority, so a signal OC1 is generated, and the sequence goes to state S4.

COMMAND: S2 OC1 PARB
ENTER STATE S4

The signal S4 causes hundreds scanner 2903 to directly operate the relay driver 2931 which supplies ground potential to operate the relay 29H1. Relay 29H1 locks to ground potential at break contacts of relay 28LKM. Ground potential through contacts of relay 29H1 completes the operating path for relay 22HEP1. The conductors AB111P to AB101P from card B11 are connected through contacts of relay 22HEP1 and contacts of relay 22HE to the inputs of the tens scanner 2902. A ground signal at contacts of relay H1 is transmitted by way of conductor HX–O and cable SS to the sequence and supervisory circuits.

COMMAND: HX W (S3 OCX+S4 OC1)
ENTER STATE S5

This causes the tens scanner to start counting. Since the call is in tens group 1 the tens scanner finds coincidence at step 1 and operates the relay driver 2921, which in turn supplies ground potential to operate the relay 29T1. Relay 29T1 through its contacts locks to ground potential at break contacts of relay 28LKM.

Negative battery potential is supplied through resistor 2962 and contacts of relay 29T1 in multiple to the five line groups and through contacts of relay 22LG to ten of the 100 LS relays in line group 1 namely relays 22LS11 to 22LS01. Ground potential is supplied through contacts of relay 29H1 in multiple to the five line groups, and through blocking diodes to ten of the 100 LS relays of the line group, namely relays 22LS11 to 22LS10. Therefore relay 22LS11 in line group 1 operates.

The ten leads L111P to L110P from the horizontal inputs of card A11 are connected through contacts of relay 22LS11, of relay 22LG, and contacts of relay 29UP to the inputs of units scanner 2901. At contacts of relay 29T1 a ground signal is sent by by conductor TX–O and cable SS to the sequence and supervisory circuits.

COMMAND: S5 TX W
ENTER STATE S6

The marker now is ready to pre-select a register.

The register selector shown in FIG. 31 and FIG. 46 includes a scanner 3101 and other electronic circuits 3102. The scanner 3101 includes a four stage counter whose respective outputs are connected to unit 3102 and also operate the relay drivers 3111–3114; and a six stage counter whose outputs are connected to unit 3102 and also operate respectively relay drivers 3121–3126. Relay 24RJA has operated via lead ROB from gate 3401 and driver 3415 during (S3+S4+S5) and locked through contacts of relay 24LKA. The idle test leads from the twenty-four register junctors are connected from the IDF through contacts of relay 24RJA to the respective conductors R1–R24 to the parallel test circuit in unit 3102. The scanner 3101 is driven in response to signal condition (S6 $\overline{\text{PS}}$). The coding and coincidence gates along with the parallel test circuit in unit 3102 upon coincidence of the scanner position and an idle indicating potential on one of the leads R1–R24 places busy indicating potential on the idle test lead to prevent selection of the register junctor by another marker; and generates signal PS to stop the scan. Relay 22LNK and its slaves 23LNK and 24LNK are operated during states S6, S7 and S8 via lead HB from gate 3425 and driver 3426. One of the relay drivers 3121–3126 supplies ground over the corresponding conductor of G1–G6 through contacts of relay 24LNK to operate one of the relays 24G1–24G6.

COMMAND: S6 PS
ENTER STATE S7

This signal S7 causes the units scanner 2901 to start stepping. The counter finds coincidence at step 1 and operates the relay driver 2811 which in turn operates the relay 28U1. Relay 28U1 at its contacts and break contacts of relay 28LKM locks to ground.

With the relays 29H1, 29T1, and 28U1 operated the line L111 is identified.

The marker is now ready to select a route. First a check is made whether AB links are available to the A matrix. If all six of the AB links are busy, all of the relays 30AB1–30AB6 are operated, connecting ground to lead LNK to mark it false. Otherwise signal LNK is true, and along with the units scanner signal UX, advances the sequence.

COMMAND: S7 2W UX LNK
ENTER STATE S8

The route selector shown in FIG. 31 and FIG. 47 includes a scanner 3103 and an electronic coincidence gating unit 3104. The scanner 3103 includes a five stage counter with outputs connected to unit 3104 and also respectively to the relay drivers 3131–3135; and a four stage counter having outputs connected to unit 3104 and also respectively to relay drivers 3141–3144.

Preselection of an idle register defines a group of twenty originating junctors. One of the slave relays 25G1–25G6 is operated from the corresponding one of the relays 24G1–24G6, which depend upon which one of the six R matrices the register junctor is associated, to connect through the twenty idle test leads from the corresponding originating junctors to the twenty inputs J1–J20 of unit 3104.

Figure 23:
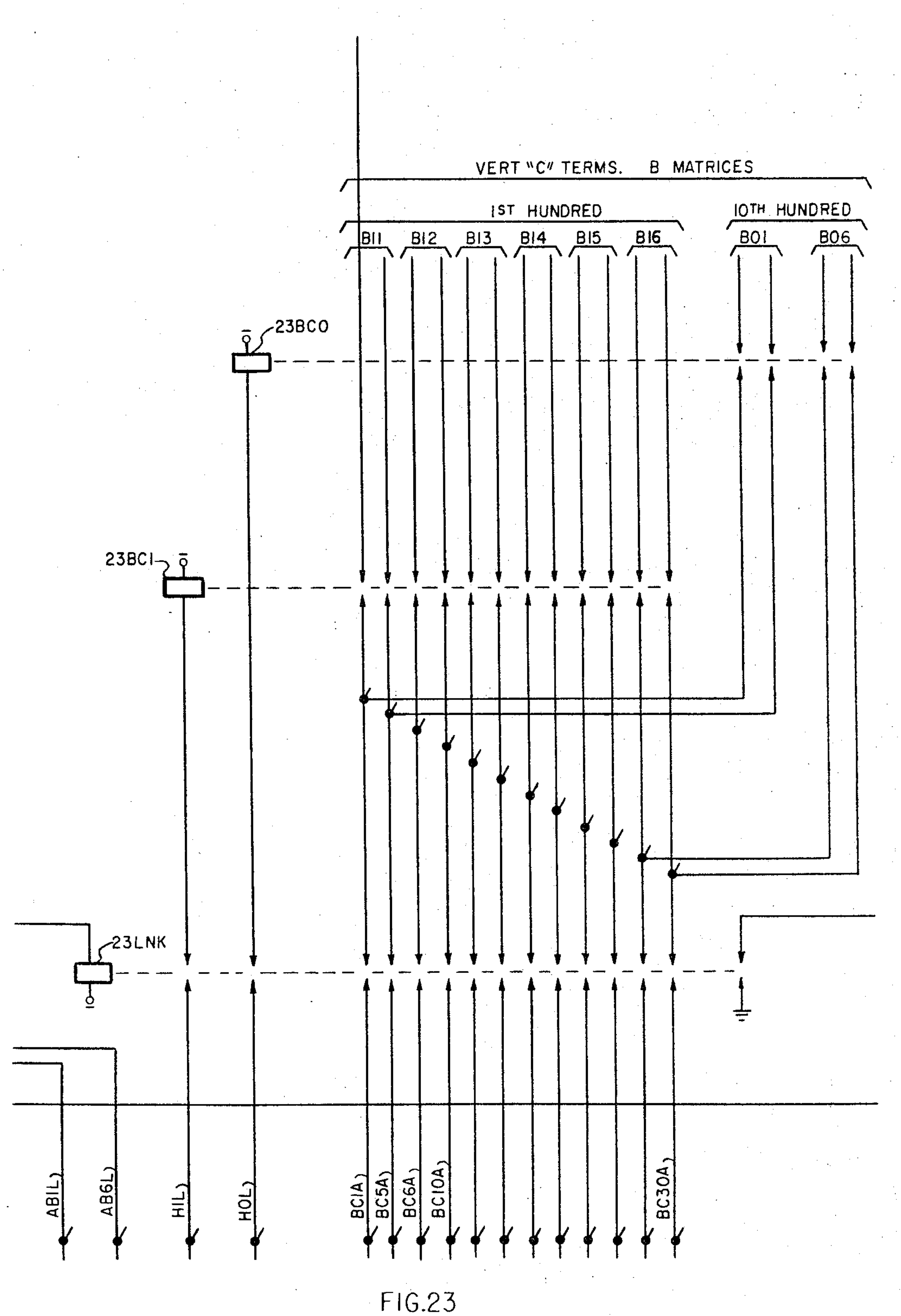
Figure 24:
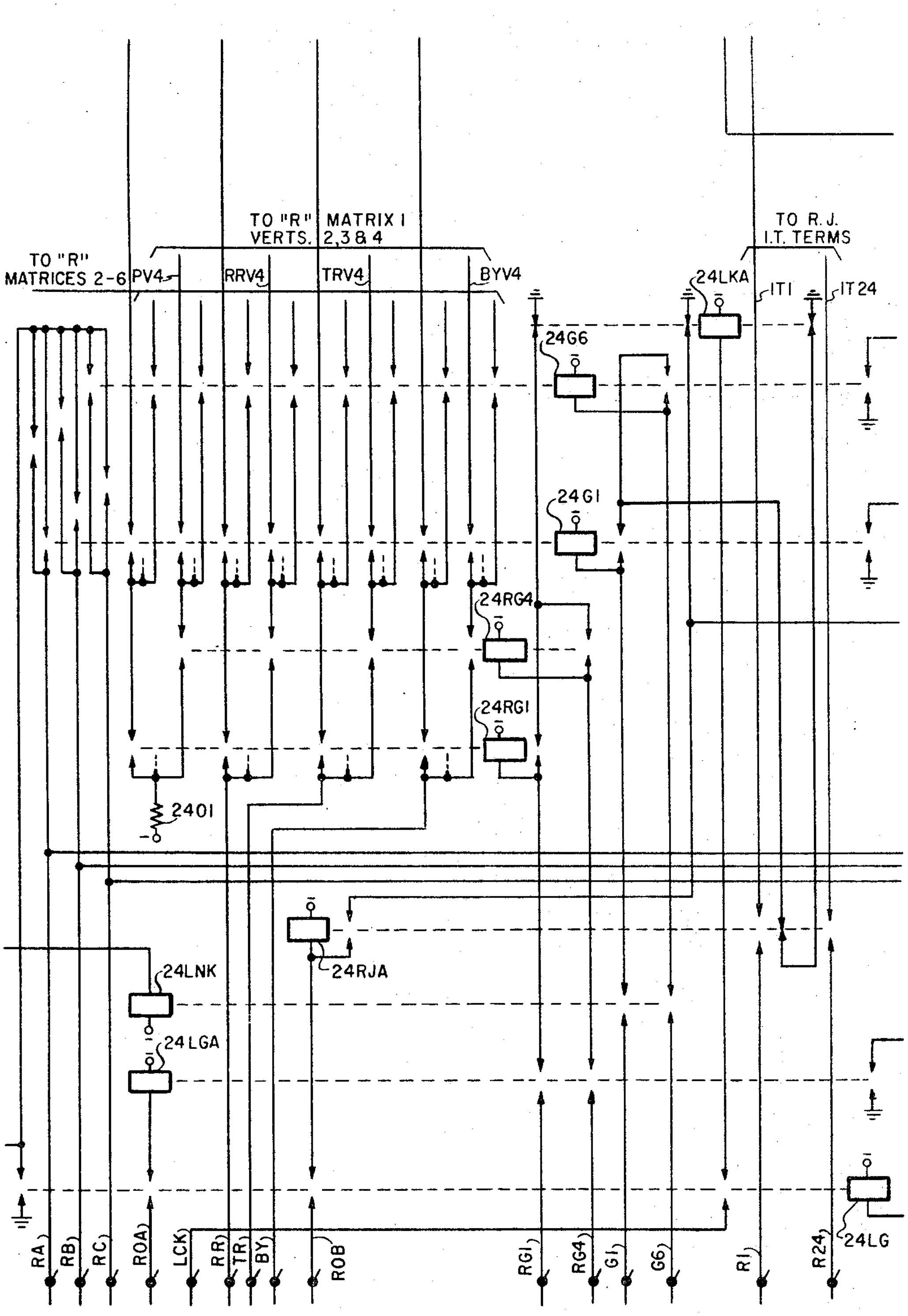

To test the interstage links for available paths, advantage is taken of the fact that the holding current in a busy path provides a negative potential on the C conductors of the links. To test the BC links, the vertical C terminals of the B matrices are connected as shown in FIG. 23, and grouped as shown in FIG. 30. One of the relays 23BC1–23BC0 is operated from ground at contacts of one of the relays 29H1–29H0. In this case relay 23BC1 is operated to connect through the thirty BC links which extend to the first hundreds group. These leads are connected through contacts of relay 23LNK via leads BC1A–BC30A to FIG. 30. One of the relays 30A, 30B or 30C is operated to select twenty of these leads corresponding to the twenty selected originating junctors. In this case relay 30A is operated over conductor RA from contacts of relay 24G1. There are six AB links to the A matrix which extends to the calling line. In this case the calling line is on matrix A11, and therefore relay 22LS11 has been operated by the line identifier. The C leads from these links are connected through contacts of relay 22LS11 and contacts of relay 22LNK via leads AB1L–AB6L through a detecting unit 3001 comprising detecting NOR gates followed by inverters to the respective relay drivers 3011–3016. For each link which is busy the relay driver operates and causes the operation of the corresponding one of the relays 30AB1–30AB6. Each busy AB link blocks paths via five BC links, which are made to appear busy by negative potential via resistors and contacts of the operated ones of the relays 30AB1–30AB6.

Thus the route selector, as the scanner 3103 steps, tests for coincidence of an idle BC link and a corresponding originating junctor idle test lead.

It is possible that an idle route does not exist between the idle preselected register, an originating junctor, and an idle path from there to the calling line. Therefore, if an originating route is not found, up to six attempts are made by cooperation between the register selector and the route selector scanners to find a route by preselecting idle registers which may define other originating junctor groups.

For example, assume that the last originating junctor of the initially selected group has been scanned and no route has been found. Then a signal LL is generated by scanner 3101, while the route-selected signal OTR remains false. Also all of the R matrices have not been scanned, so this is not the last cycle and therefore a signal LC remains false.

COMMAND: S8 $\overline{\text{OTR}}$ LL $\overline{\text{LC}}$
ENTER STATE S6

The signal condition (S6 PS) at gate 3916 advances the cycle counter 3902. The six-stage counter in scanner 3101 now advances in response to the signal condition (S6 $\overline{\text{OTR}}$ LL $\overline{\text{LC}}$), making signal PS false. The scanner then operates to pre-select another register, and thereby again generates signal PS.

COMMAND: S6 PS
ENTER STATE S7

The signal UX is still available from the units identifier.

COMMAND: S7 UX LNK 2W
ENTER STATE S8

A route search is made as before with the new group of twenty originating junctors. Upon finding a route a signal OTR is sent from unit 3104 to the sequence circuits to stop the scanner 3103.

COMMAND: S8 OTR
ENTER STATE S9

Relays 24LGA and 25LGA now operate to ground on conductor ROA from relay driver 3021 in response to signal S9. Relays 22LNK, 23LNK and 24LNK release. Relay 24LNK at a set of break contacts completes a locking path through break of relay 24LKA for the operated one of relays 24G1–24G6, before the operate path is opened at make contacts of relay 24LNK. One of the relay drivers 3111–3114 supplies ground potential through its contacts to the corresponding one of the conductors RG1–RG4 and through contacts of relay 24LGA operates the corresponding one of the relays 24RG1–24RG4, which locks at contacts of relay 24LKA.

Operation of one of the relays 24RG1–24RG4 and one of the relays 24G1–24G6 connects the leads RR, TR, and BY from the LNI sender portion 283 of the send receive circuit 280 (FIGS. 2 and 33) to one of the twenty-four vertical links from the R matrices, and negative potential through resistor 2401 to the P conductor of the corresponding vertical link. For example assume that the vertical 1 of matrix R1 has been preselected and therefore that relays 24RG1 and 24G1 are operated.

From the output of route scanner 3103, one of the relay drivers 3131–3135 extends ground through its contacts and by the corresponding one of the leads PU1–PU5 through contacts of relay 25LGA to operate a corresponding one of the relays 25PU1–25PU5, which locks to ground through break contacts of relay 24LKA. One of the relay drivers 3141–3144 at its contacts completes a path to operate a corresponding one of the relays 31PT1–31PT4, which locks to ground at break contacts of relay 31LCM.

For the duration of states S9, S10 and S11 gates 3411 and 3412 operate relay driver 3422, which supplies ground on lead LR to operate relay 21LR. This removes negative potential and places ground potential via lead LR1 and resistor 1211 to the P leads of all line circuits having their line relays operated. After eight milliseconds the signal (S9 W) via gates 3536 and 3534 on lead LA operates relay driver 2807 to complete a path from negative 50 volts and resistor 2804 to the pull lead L111P of the line circuit being serviced by the marker. Therefore only this one line has the class-of-service diodes in FIG. 20 marked with negative potential.

The signal on lead LFI from gate 3413 is false, so that relay driver 2803, and thereby relay 29UP, is released during states S9 to S13 inclusive to disconnect the inputs of the units scanner 2901.

The LNI shift register 4011 is cleared, producing a signal ZS. Logic 4012 supplies a signal PS10=S9 ZS 2W.

COMMAND: PS10
ENTER STATE S10

The shift register 4011 is now loaded via encoder 4010. The identity of the calling line is supplied through cable SR to the send receive circuit 280, from a negative 16 volt source through resistor 2973 and contacts of relay 29H1, through resistor 2972 and contacts of relay 29T1, and through resistor 2871 and contacts of relay 28U1.

Figure 20:
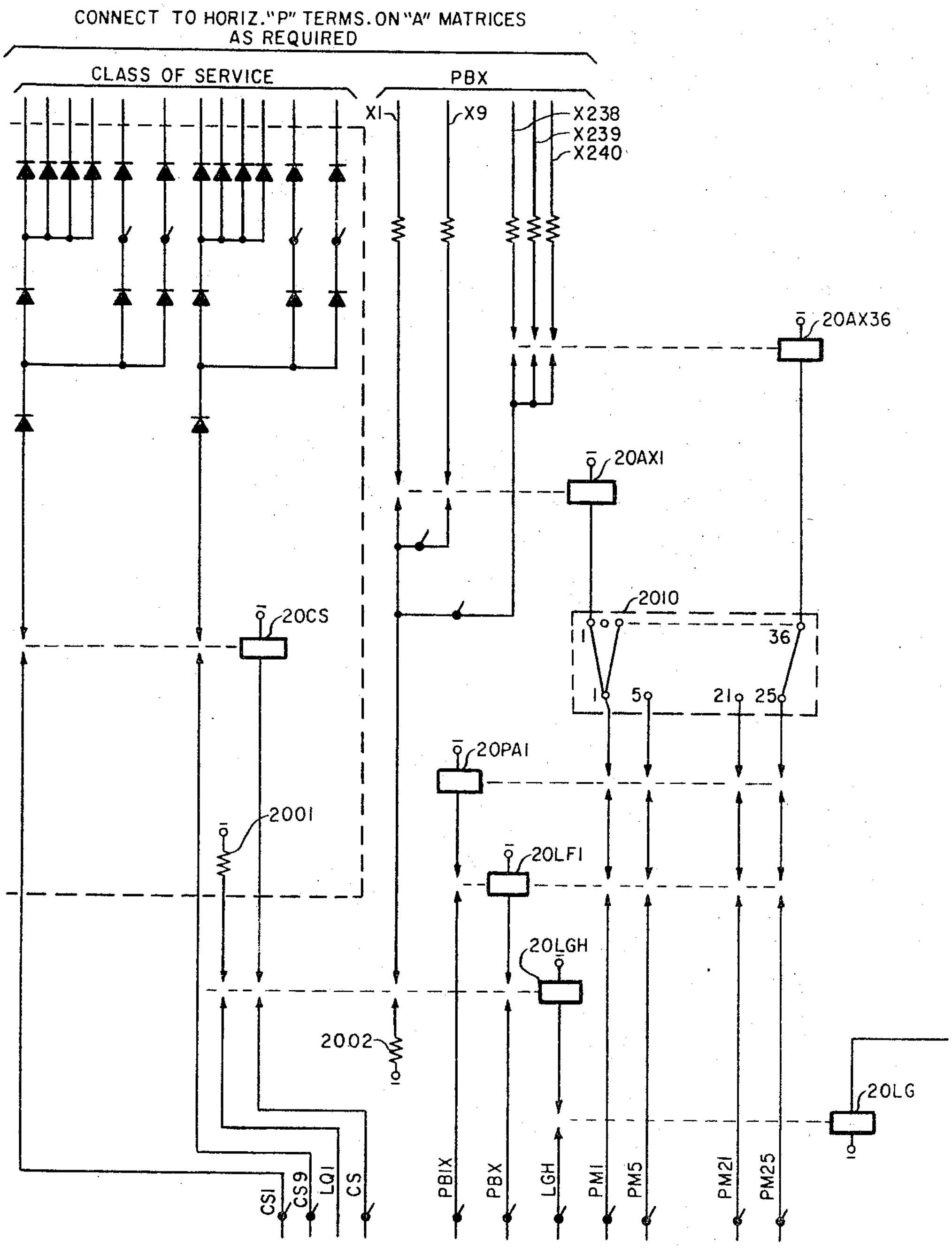
Figure 21:
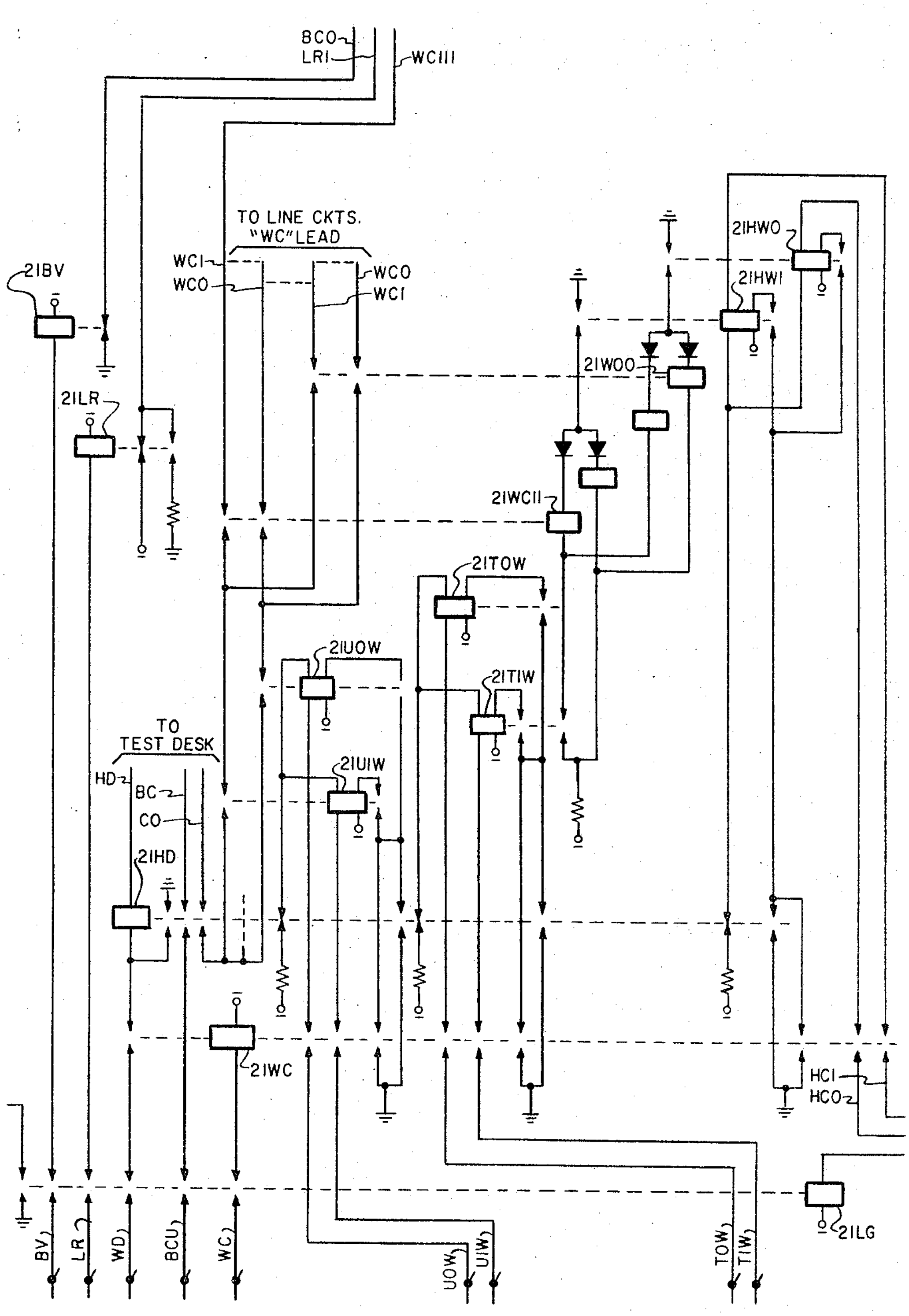
Figure 22:
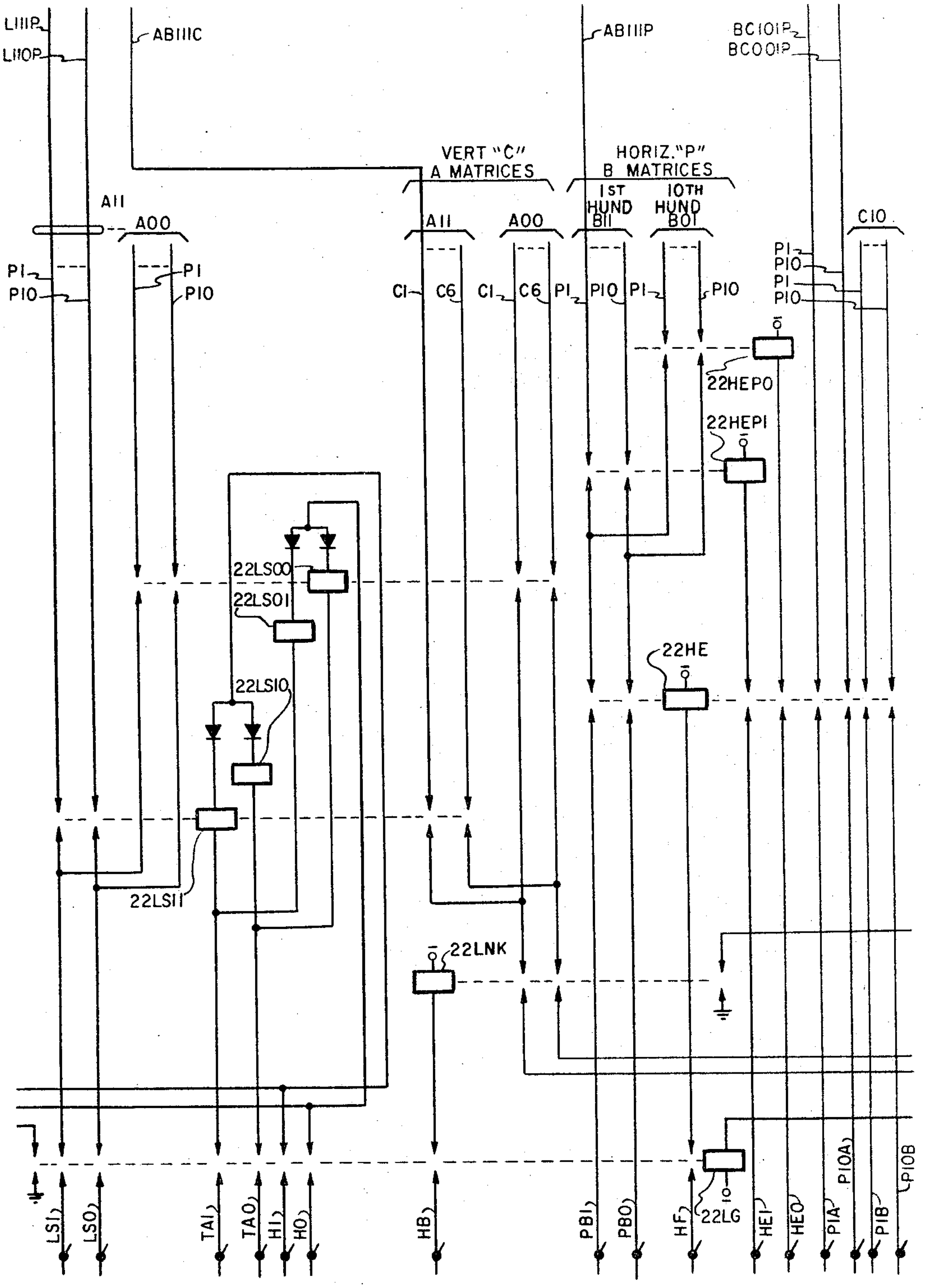

To provide a class of service indication, the P conductors of the line circuits connected from the horizontal P terminals of the A matrices to a diode field in FIG. 20 as required provides a signal on the conductors CS1–CS9 for the line circuit selected by the line identifier. Negative potential through a resistor 2001 identifies the line group. Operation of relay 20LGH at its contacts extends a signal CS to operate relay 20CS, and also connects resistor 2001 to a lead LQ1. This extends the signals on the lead CS1–CS9 and lead LQ1 to the send receive circuit.

A signal condition PARC from logic 4011 indicates correct fixed logic in the shift register. Relay driver 4101 is operated by signal condition (PARC+S11), closing a path from resistance battery through relay 41LNI to lead BY, which operates a relay in the register junctor, but not relay 41LNI. When ready, the register junctor responds by reducing the resistance to ground on lead BY, operating relay 41LNI. Relay 41GO operates, making signal GO true. The logic 4012 produces a signal PS11=S10 GO PARC.

COMMAND: PS11
ENTER STATE S11

The information is now transmitted from the shift register 4011 via leads TR and RR, by the path through contacts of relay 24RG1 and 24G1 to the vertical link one of matrix R1, and thence via the IDF and through the register junctor such as 601 (FIG. 6) to the register receiver 630. A signal condition PARD indicates that the information in the LNI shift register 4011 has been shifted to the last position. The logic 4012 generates a signal PS12=S11 PARD 6W.

COMMAND: PS12
ENTER STATE S12

After eight milliseconds the signal S12 (W+2W+3W) on lead CDP from gates 3561 and 3562 operates relay driver 3150.

Assume now that a route has been selected from line circuit LC111 by way of originating junctor OJ1 to the register junctor connected through the first vertical of matrix R1, and assume that the sequence circuit has activated the signals for pulling the connection. Then starting in FIG. 28, negative battery potential extends through resistor 2804 and contacts of relay drivers 2801, 2802 and 2807, through contacts of relay 28U1 to conductor LS1, and thence through contacts of relay 22LG and relay 22LS11 to conductor L111P, thence through diode 1201 and winding 2102 in matrix A11, diode 1301 and winding 1302 in matrix B11, diode 1401 and pull winding 1402 in matrix C1, to the P conductor OJ1AP, thence through contacts of relay 25G1 and relay 25PU1, contacts of relay 31PT1 to ground at contacts of relay driver 3150. Also negative battery potential is extended through resistor 2401, contacts of relays 24RG1, and 24G1, to the P conductor of the vertical V1 of matrix R1, through winding 1602 and diode 1601 to the P conductor OJ1AP to the ground on lead CDP. Therefore the crosspoints in the matrices A11, B11, and C1 operate in series, and the crosspoint in matrix R1 also operates. The register junctor applies the holding ground on lead CR which extends through the hold winding 1603 in the matrix R1 to operate relay 15JA in the originating junctor. This supplies a ground on the C lead which operates in series through the hold relays in the matrices C1, B11, and A11 to the cutoff relay 12CO in the line circuit to thereby hold the connection.

Operation of cutoff relay 12CO releases the line relay 12L, and also connects ground on lead BCO to the pull conductor L111P, which extends to lead LS1, contacts of relays 28U1 and 28HJ to resistor 2811, making signal LD true. This causes signal BSY to be true.

COMMAND: S12 BSY
ENTER STATE S13

The relay drivers 2807 and 3150 now release, which disconnects the pull potentials from the switching network.

COMMAND: S13 W BSY $\overline{TRX}$
ENTER STATE S29

Relay drivers 2808 and 3022 operate to cause the locking relays 28LKM, 24LKA and 31LCM to operate, thereby releasing all previously locked relays in the marker and connect circuits, but not those in the allotter. The marker is now ready to serve another call. Assume no call is waiting in the same line group.

COMMAND: S29 2W [$(\overline{OC}+\overline{TC})$PARE+S30T+RLS+$\overline{LG}$]
ENTER STATE S30

The allotter releases.
The marker is now idle.

ABANDONED ORIGINATING CALL

The off hook condition of the line may have been a short pulse such as a hook jiggle which ends during the marker cycle. If no call is found by the hundreds scanner 2903 the marker goes then to state S20. During the states S5 to S11 inclusive the cycle proceeds independently of the calling line condition. Another check is made of the line during state S12 if the cutoff relay does not operate and make the line busy before the end of time 3W. This can be due to defects in the switching network or to the call being abandoned. The signal condition S12 (4W+5W+6W) $\overline{BSY}$+S13 $\overline{BSY}$ operates relay 28HJ to connect lead HJ–O to the pull lead of the line. Also at the same time relay driver 2807 releases to disconnect the negative potential through resistor 2804. If the line relay is still operated negative potential on the pull lead makes signal HJ false, which is a trouble condition. If on the other hand the line relay has restored because of an abandoned call, signal HJ is true. Thus an abandoned call may be detected during states S3, S4, S12 or S13.

COMMAND: S3 W $\overline{OCX}$
+S4 W $\overline{OCI}$
+S12 5W HJ
+S13 W HJ
ENTER STATE S29

After establishing and verifying the connection as described, the marker releases to handle another call.

OPERATION OF LINE GROUP MARKER—TERMINATING CALL

The terminating junctor selector includes a scanner 3302 and an electronic coincidence gating unit 3303 shown in FIG. 33 and in FIG. 48. The scanner comprises two four stage counters. The first counter has its outputs connected to the unit 3303, and also respectively to the four relay drivers 3311–3314. The second counter has its outputs also connected to unit 3303 and respectively to the four relay drivers 3321–3324. The same scanner and logic is used for two distinct scanning operations. In the first operation the one of the eight E matrices and corresponding terminating junctor group in which the call appears is selected. In this operation the second counter is used as a two stage counter. In the second scanning operation the particular terminating junctor in the group is selected.

Assume now that a terminating call to subscriber S011 is being made, and terminating junctor TJ1 is seized by ground appearing on lead ECO of line TJ1A from the selector. Relay 17S operates and at its contacts 2 completes a path from negative battery through a 47,000-ohm resistor 1901, and contacts of relays 19AL2, 17S, 17SLK, and contacts of a busy key to lead P of line TJ1B. This potential extends to E matrix E1, through pull winding 1502 and diode 1501 to conductor DE011P and thence in FIG. 26 to break contacts of relay 26LGH. If the marker is in sequence state S30, this signal is then extended via lead TC1 to the allotter, FIG. 32, which causes operation of the line group relay 22LG and its slaves shown in the various figures. Signal LG is transmitted from OR gate 3280 to the sequence circuit.

COMMAND: S30 LG PARE $\overline{\text{S30T}}$
ENTER STATE S29

The signal LGH from relay driver 3418, which is operated via gate 3405 (SSE+S1+S29) operates relay 26LGH during states S29, S1, and all terminating call states. The signal on lead DE011P is then extended through make contacts of relay 26LGH to the conductor TC1A to unit 3201. The call signal is extended through E matrix E1 to the P conductor of the horizontal H20 and through other contacts of relay 26LGH to the conductor TC1B. The unit 3201 comprises parity check and gating apparatus which selects and gates through either the eight conductors TC1A–TC8A or the eight conductors TC1B–TC8B to the respective conductors TC1C–TC8C. These conductors extend to the coincidence test unit 3303. The unit 3201 supplies signal TC to the sequence circuits.

COMMAND: S29 TC LG $\overline{\text{RLS}}$ PARE $\overline{\text{S30T}}$
ENTER STATE S1

In state S1 the scanner 3202 and coincidence unit 3203 scan to find the E group having the terminating call. Since the call is in E matrix E1, coincidence occurs and the scanner stops. In response to coincidence, unit 3303 transmits signal TJ to the sequence circuits. A signal PARA from unit 3201 indicates parity of all E groups.

COMMAND: S1 TJ PARA
ENTER STATE S14

Ground on conductors CJ1 and CK1 through contacts of relay 27LGH operates relays 27J1 and 27K1. Relays 27EG1 and 26GE1 then operate and lock at break contacts of relay 24LKA, to switch through various conductors associated with E group E1.

Figure 27:
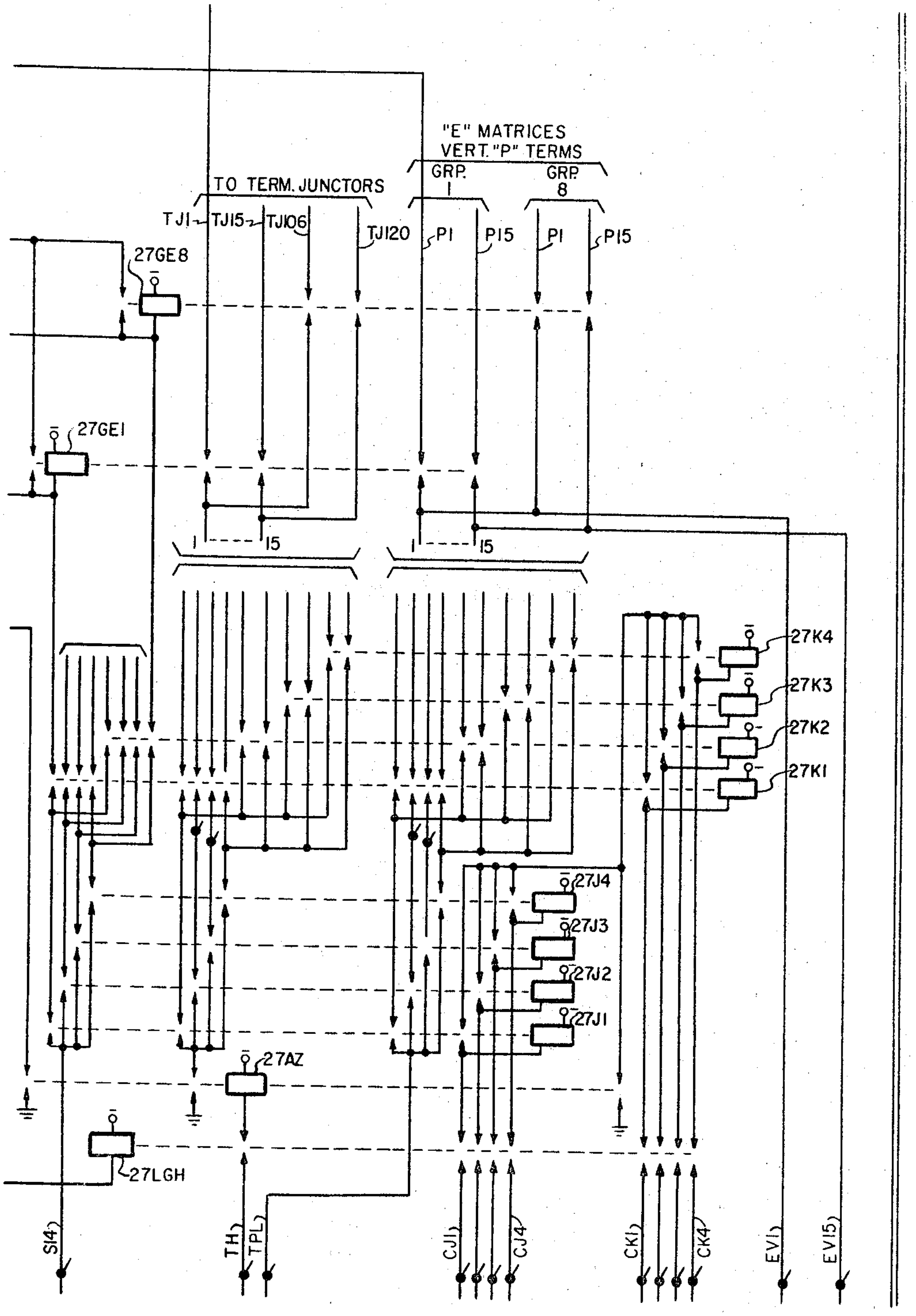
Figure 28:
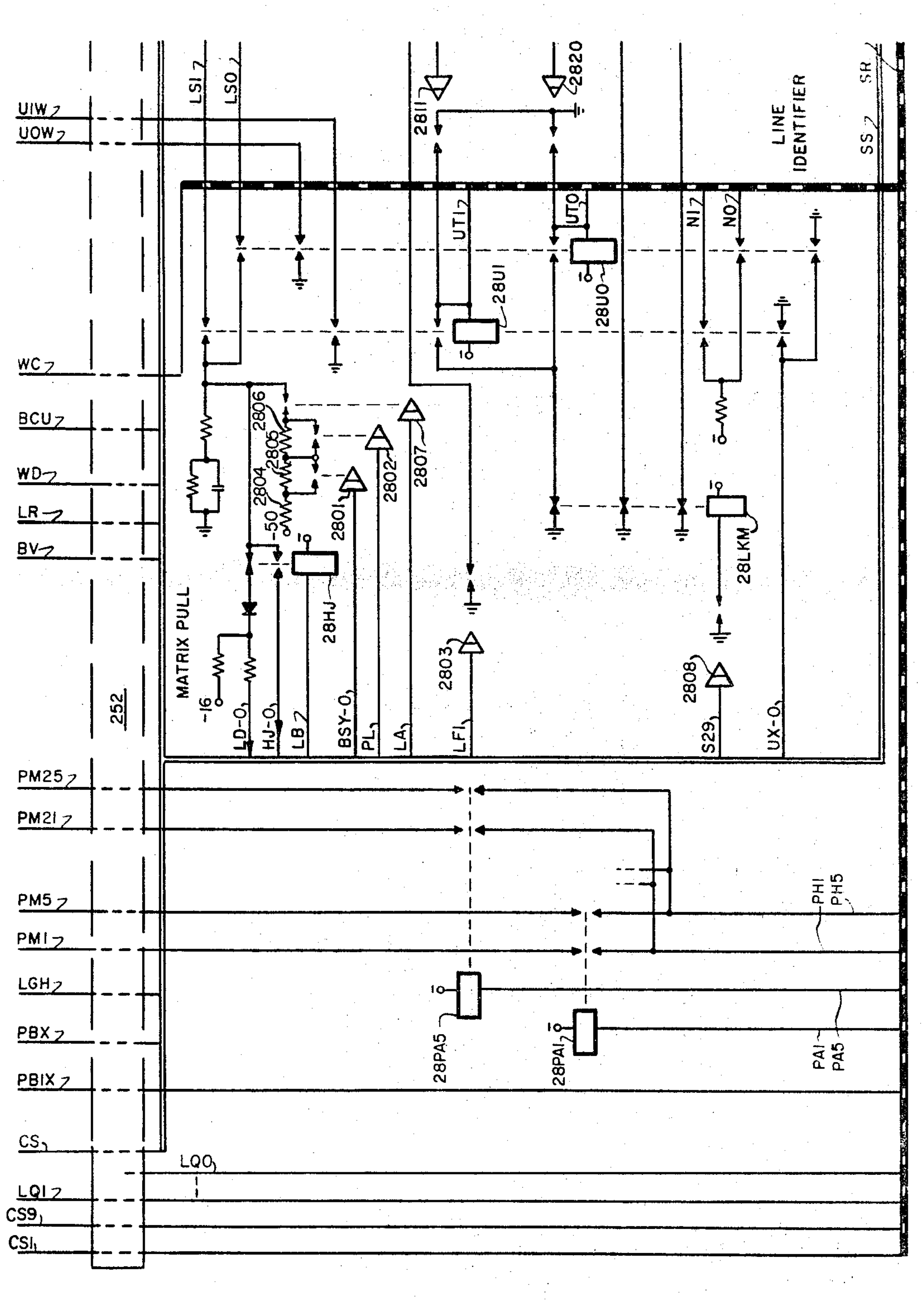

The fifteen vertical P conductors of E matrix E1 are then extended in FIG. 27 through contacts of relay 27GE1 to the leads EV1–EV15 which extend to the coincidence unit 3303.

Relay driver 3416, which supplies ground over lead TH to relay 27AZ, is released by gates 3402, 3403 and 3404 during states S29, S1, S14, and the first four milliseconds of state S15; and is operated at all other times during the terminating call sequence. Therefore relays 27J1 and 27K1 do not lock at this time. The sequence remains in state S14 for sixteen milliseconds.

COMMAND: S14 2W
ENTER STATE S15

The scanner 3302 and unit 3303 after four milliseconds now operate again to find a terminating junctor requesting service in the selected E group. Upon finding the call signal, which in this case is on lead EV1, scanner 3302 stops and unit 3303 again transmits signal TJ to the sequence circuits. After four milliseconds in state S15, relay 27AZ operates, which locks the relays 27J1 and 27K1 when they operate after the completion of scanning to indicate the particular terminating junctor in the group and switch through corresponding leads.

Figure 2:
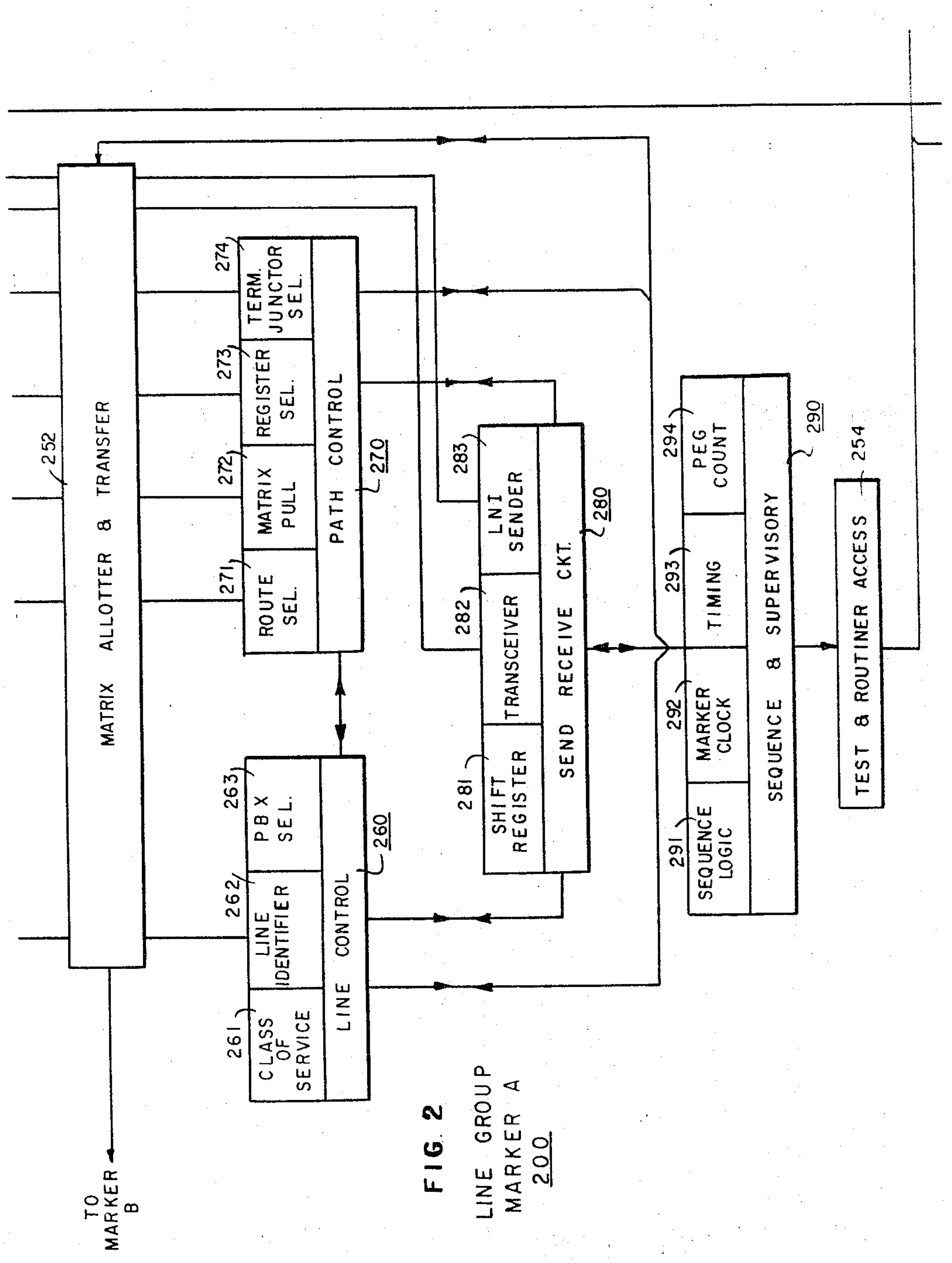
Figure 3:
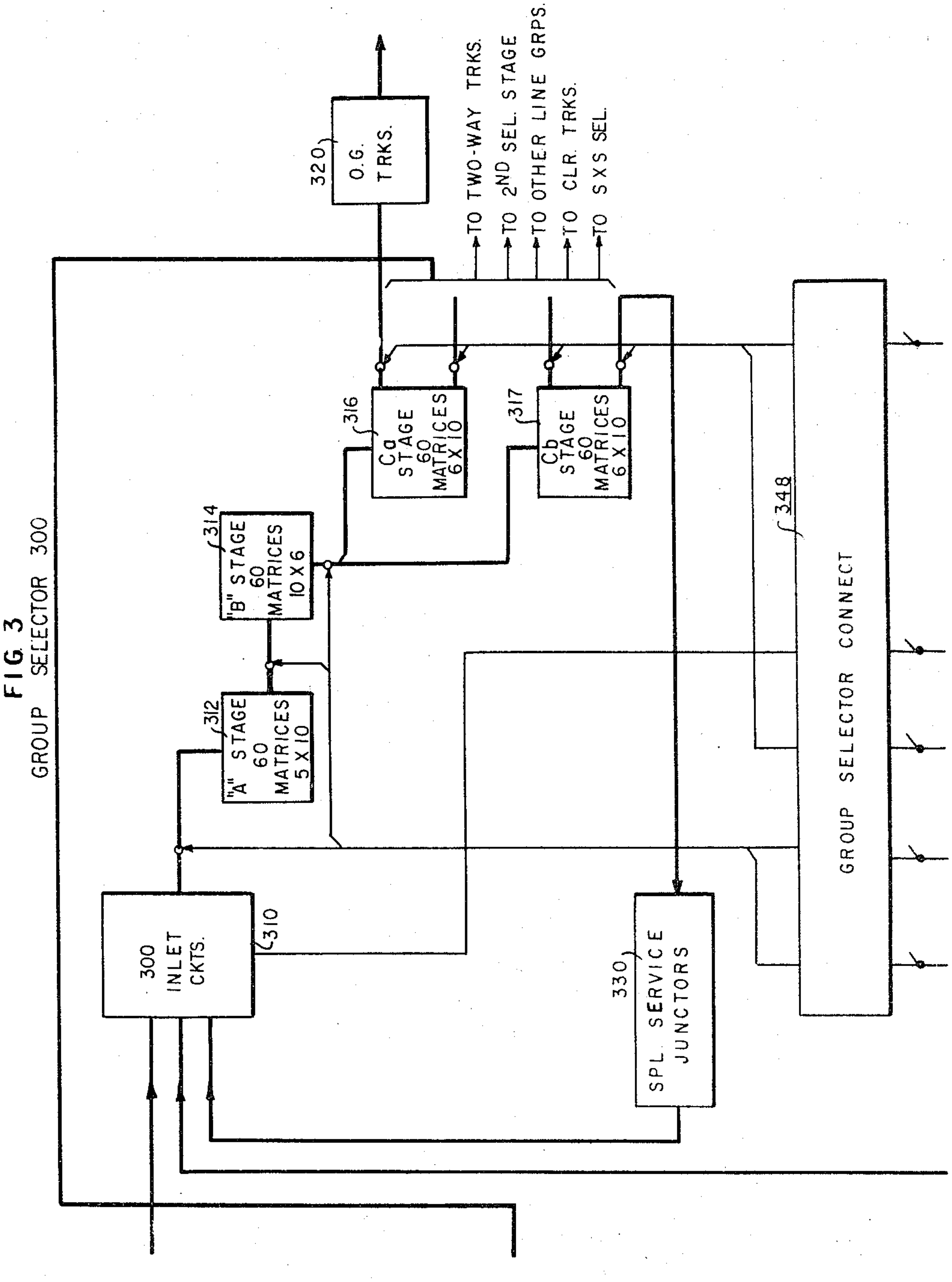
Figure 4:
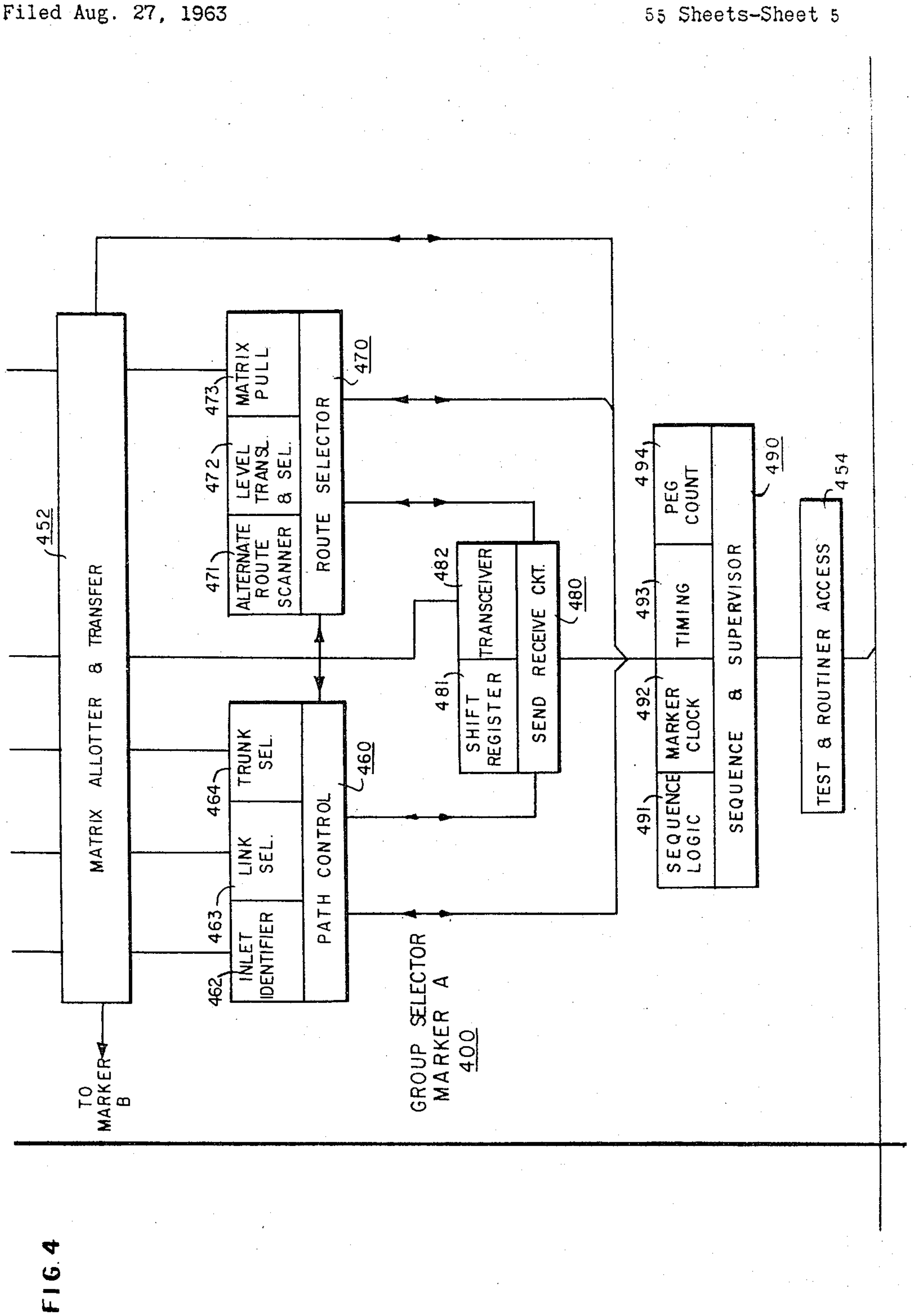
Figure 5:
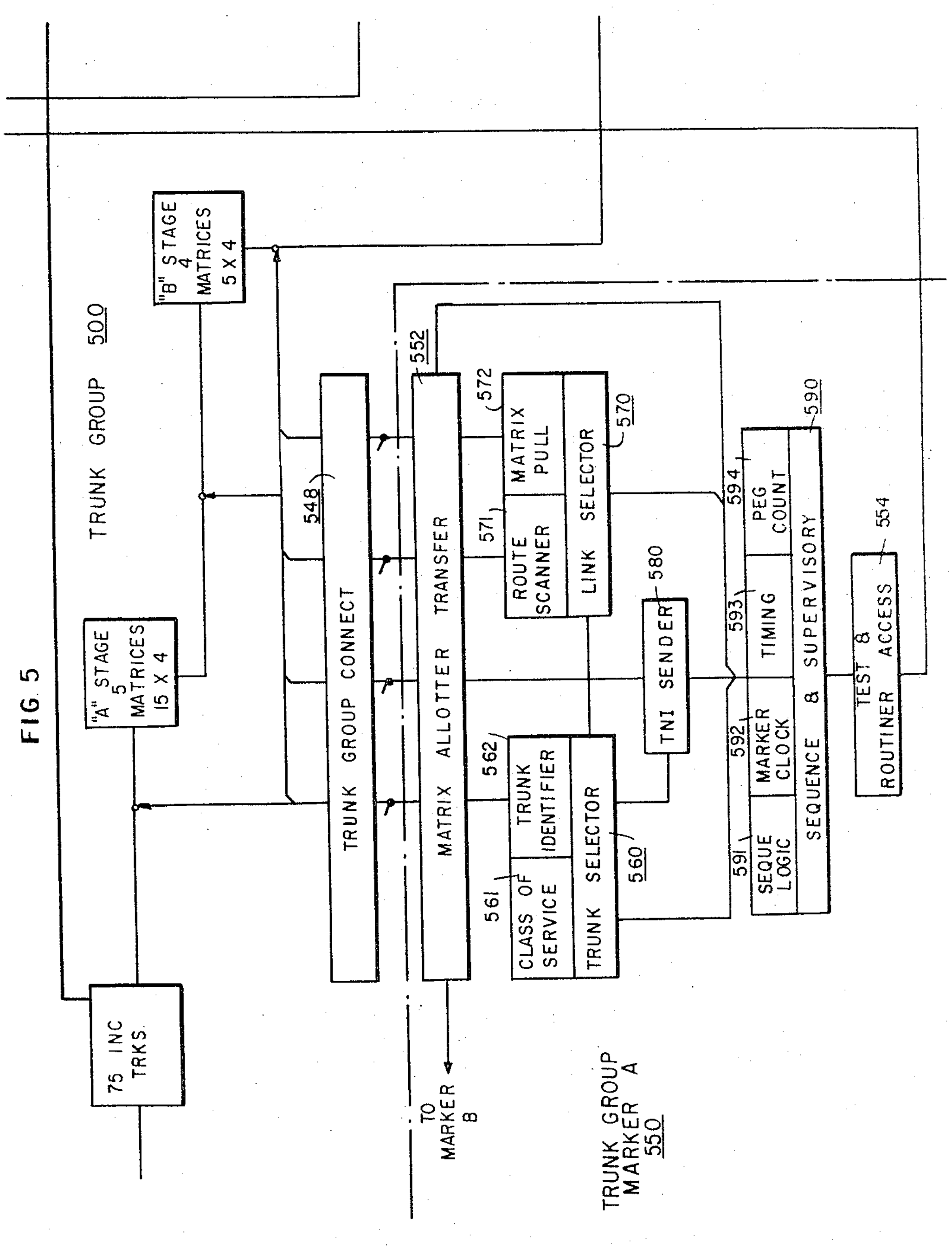
Figure 6:
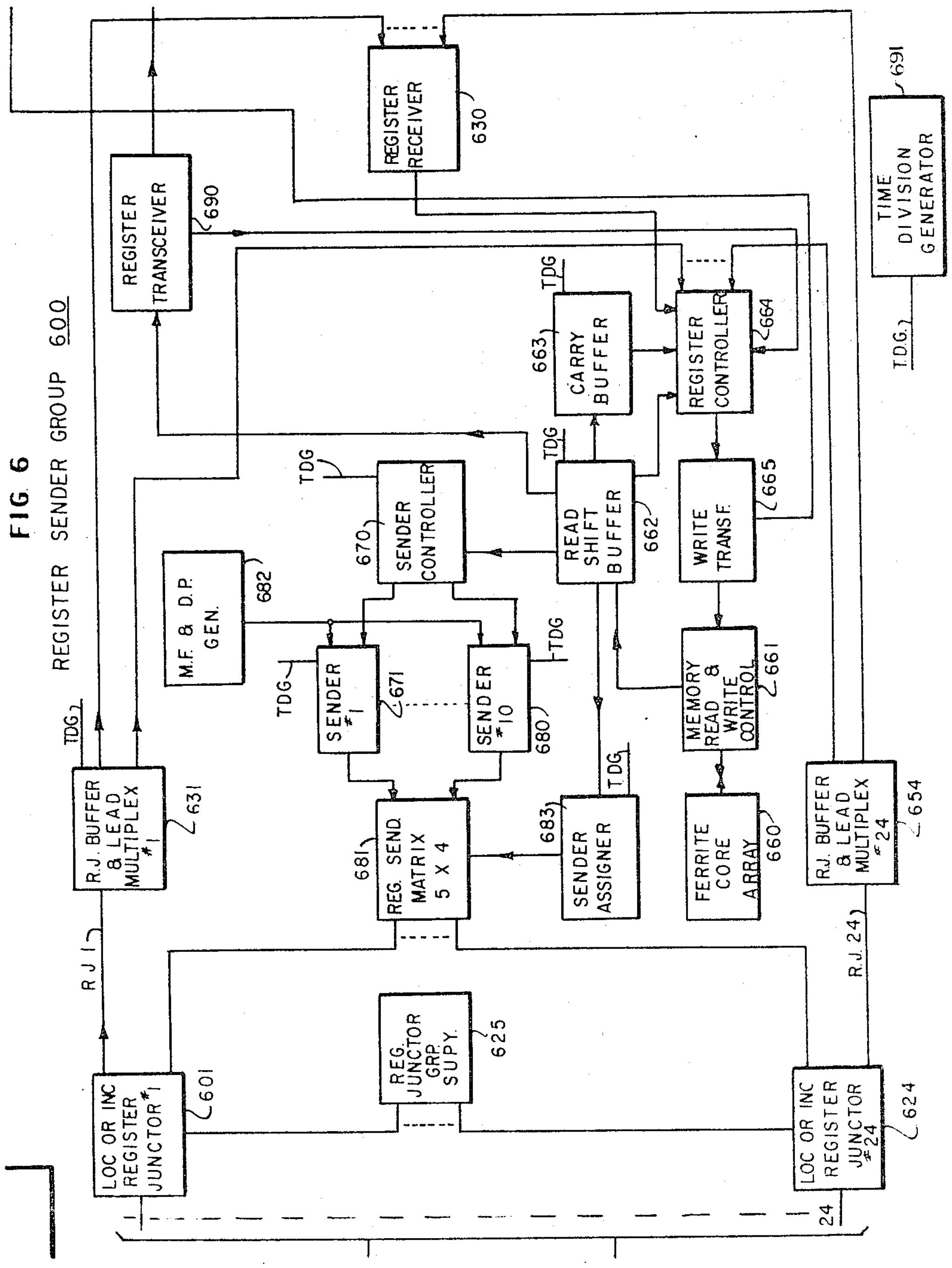
Figure 7:
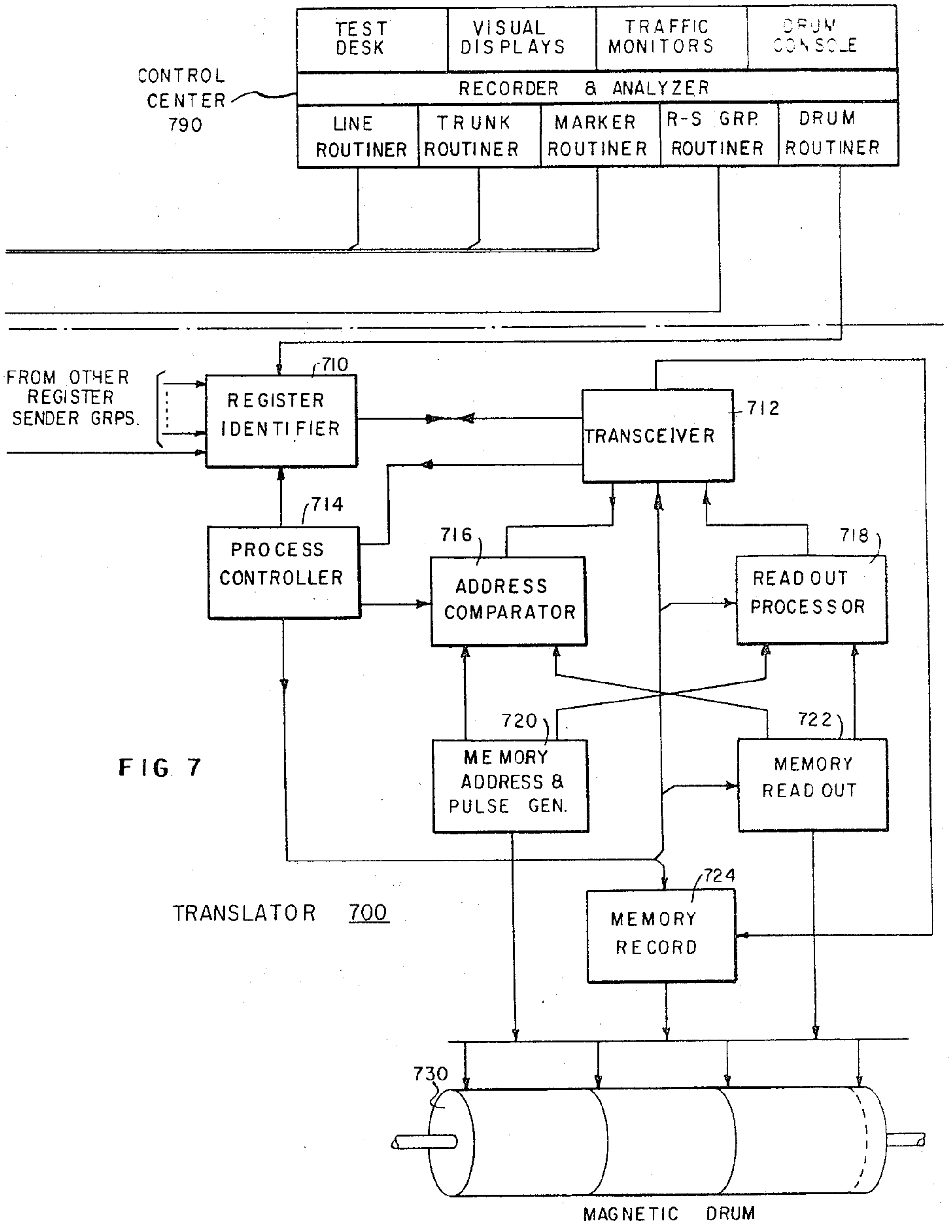
Figure 8:
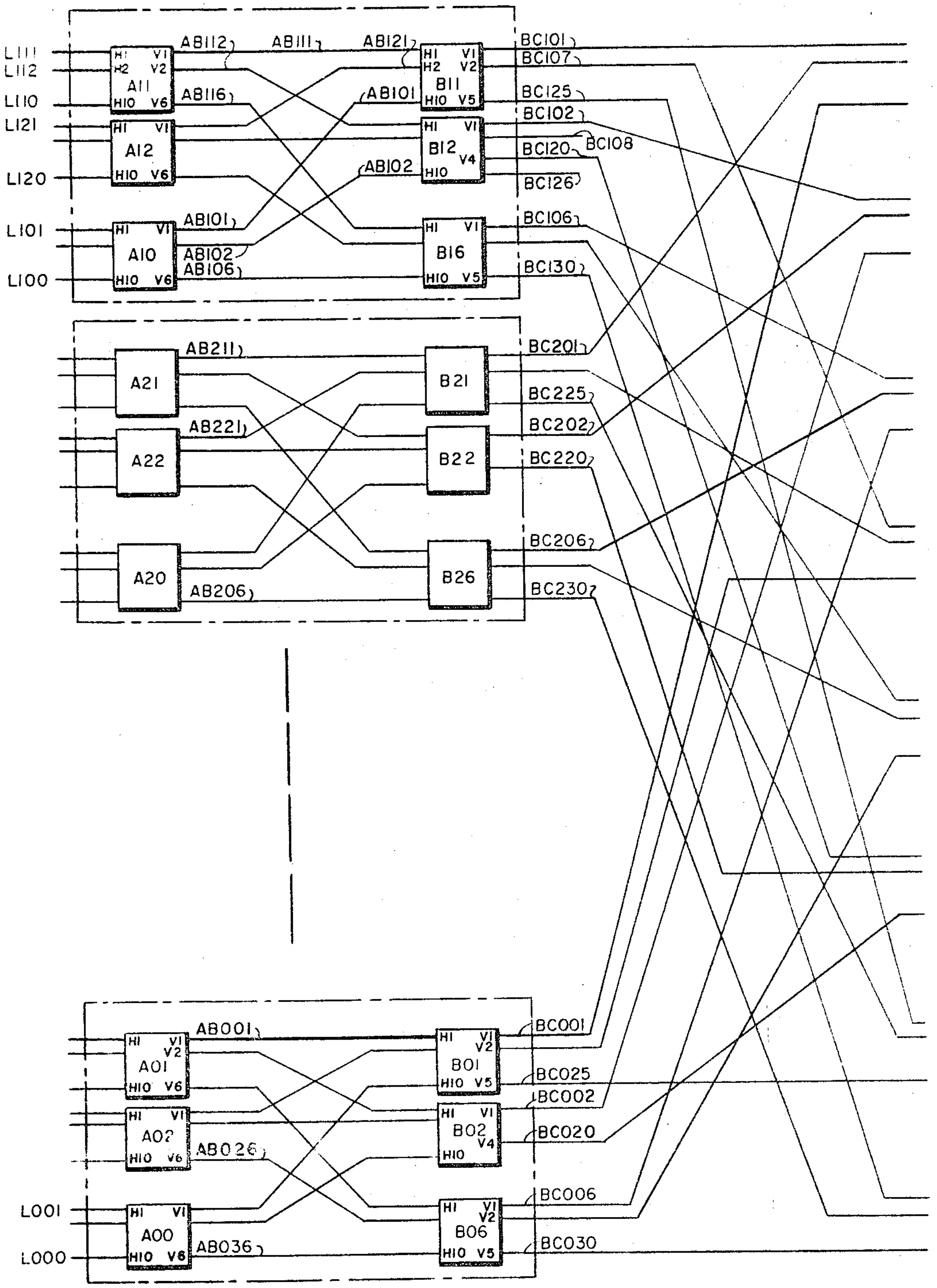
Figure 9:
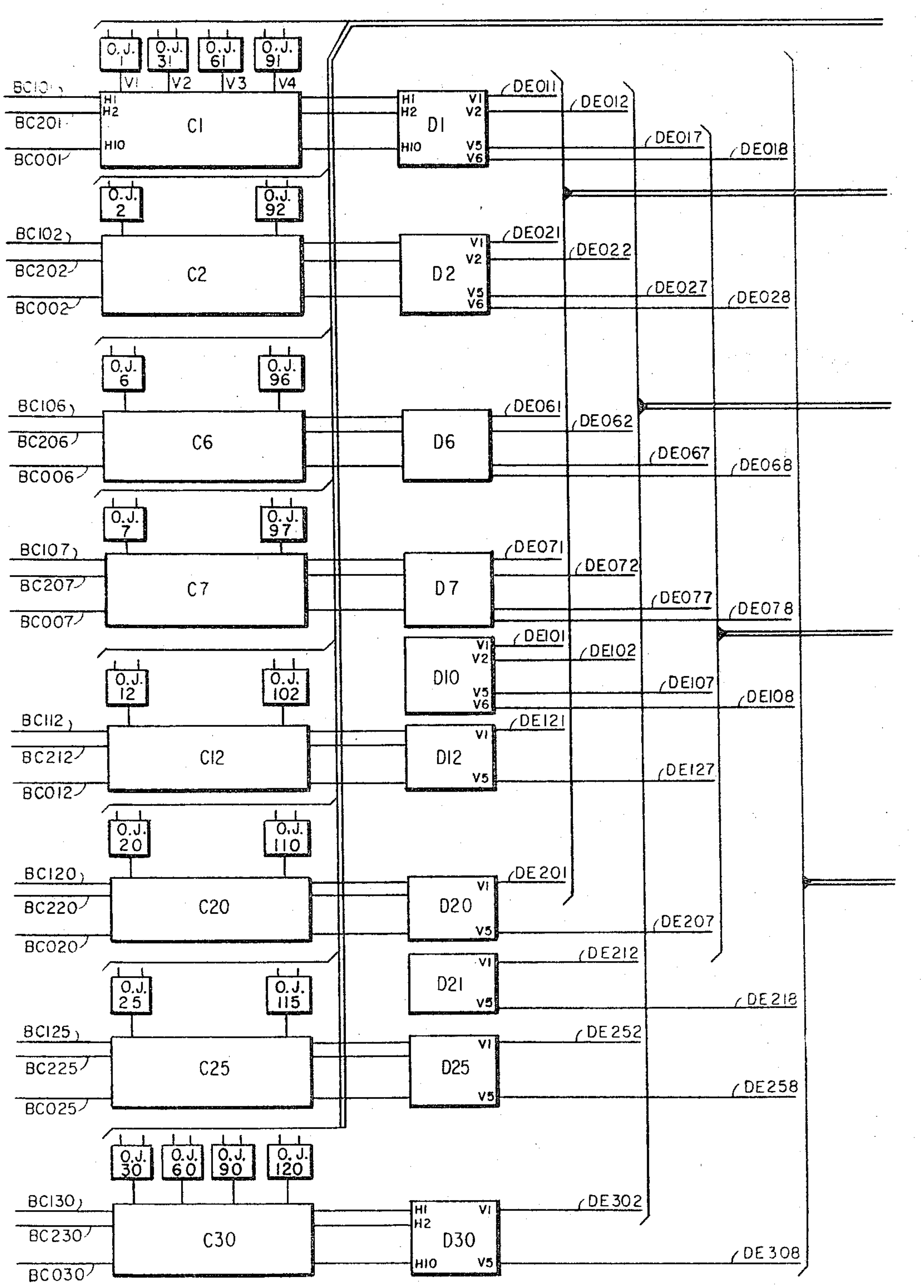
Figure 10:
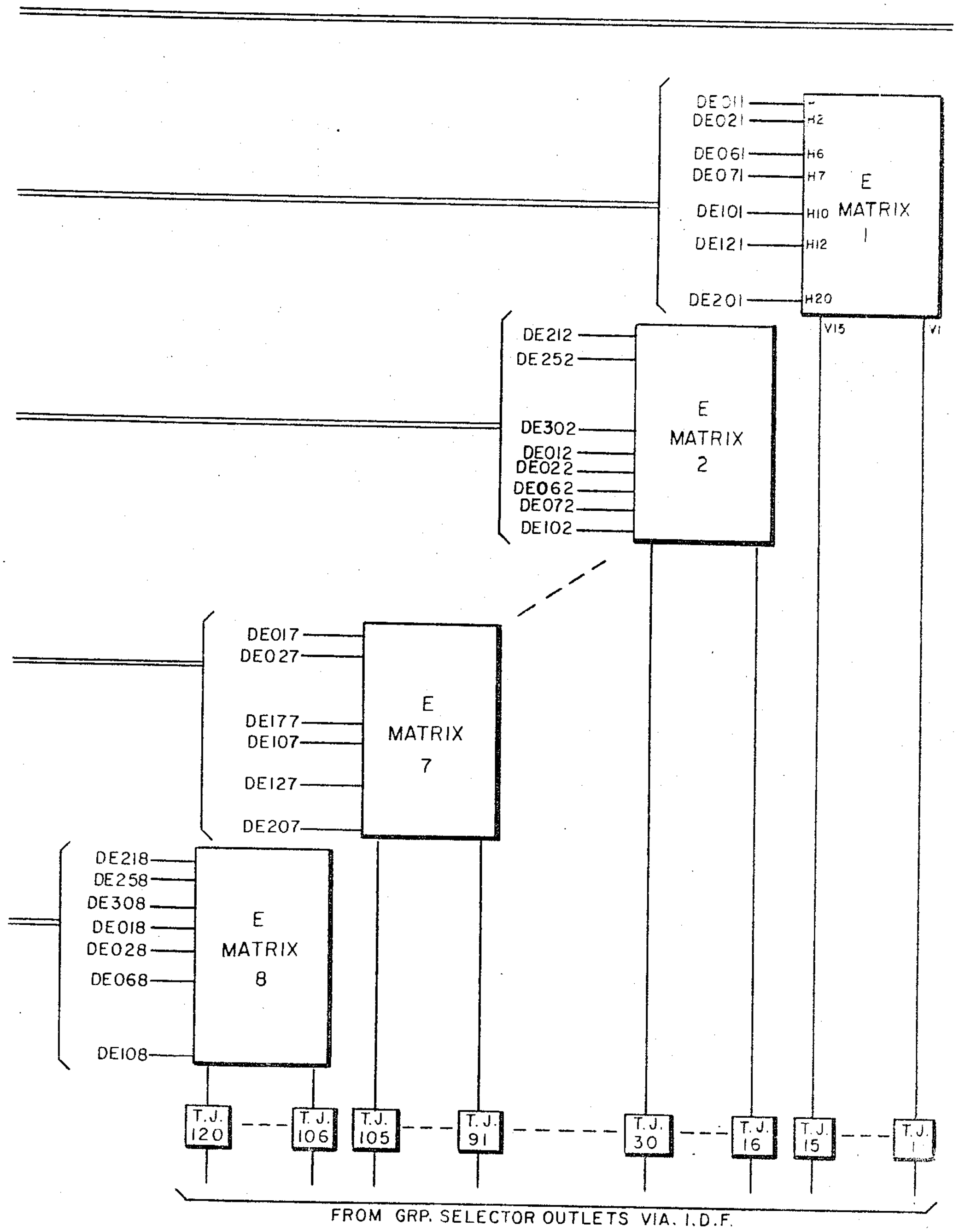
Figure 11:
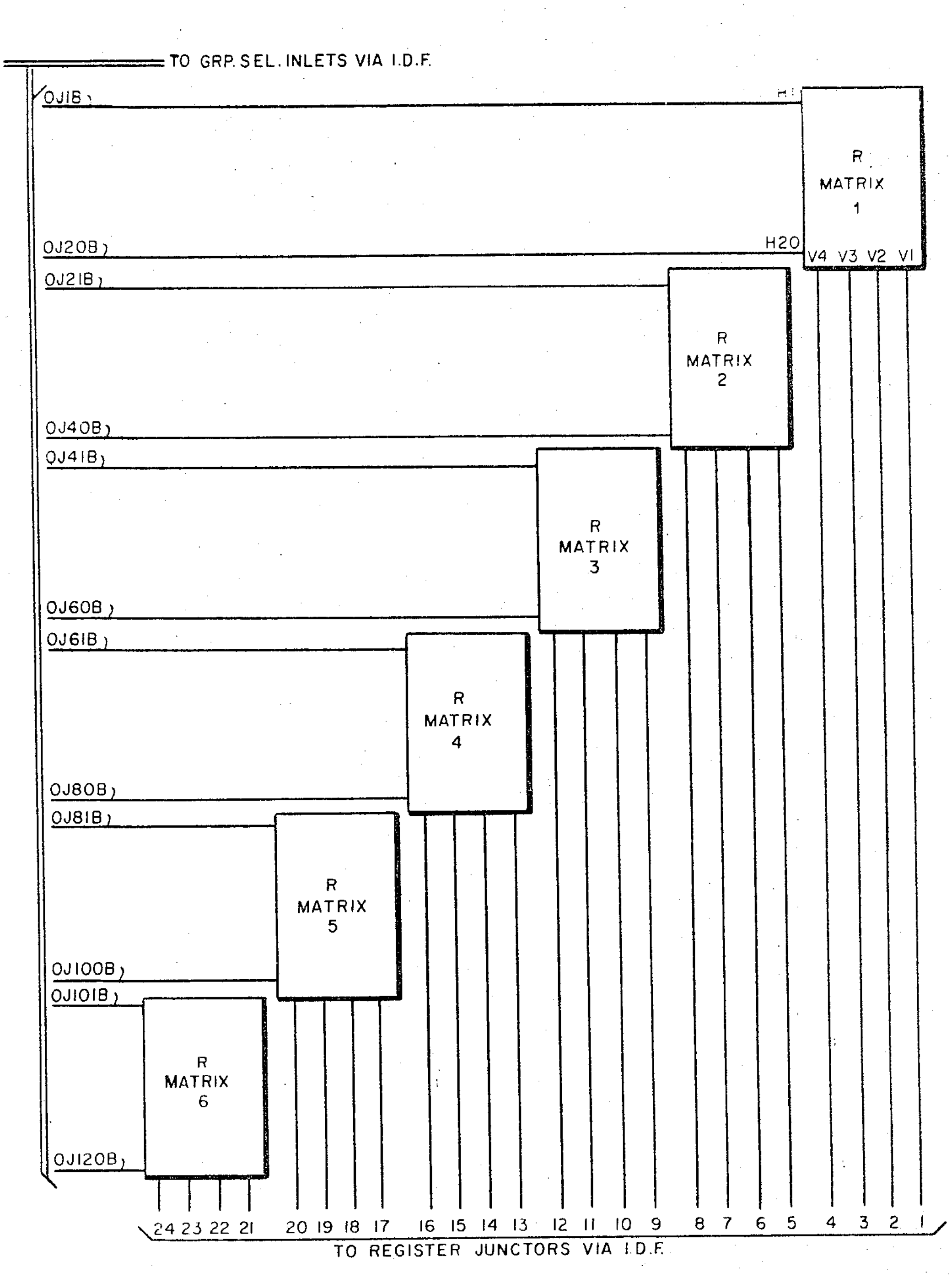
Figure 12:
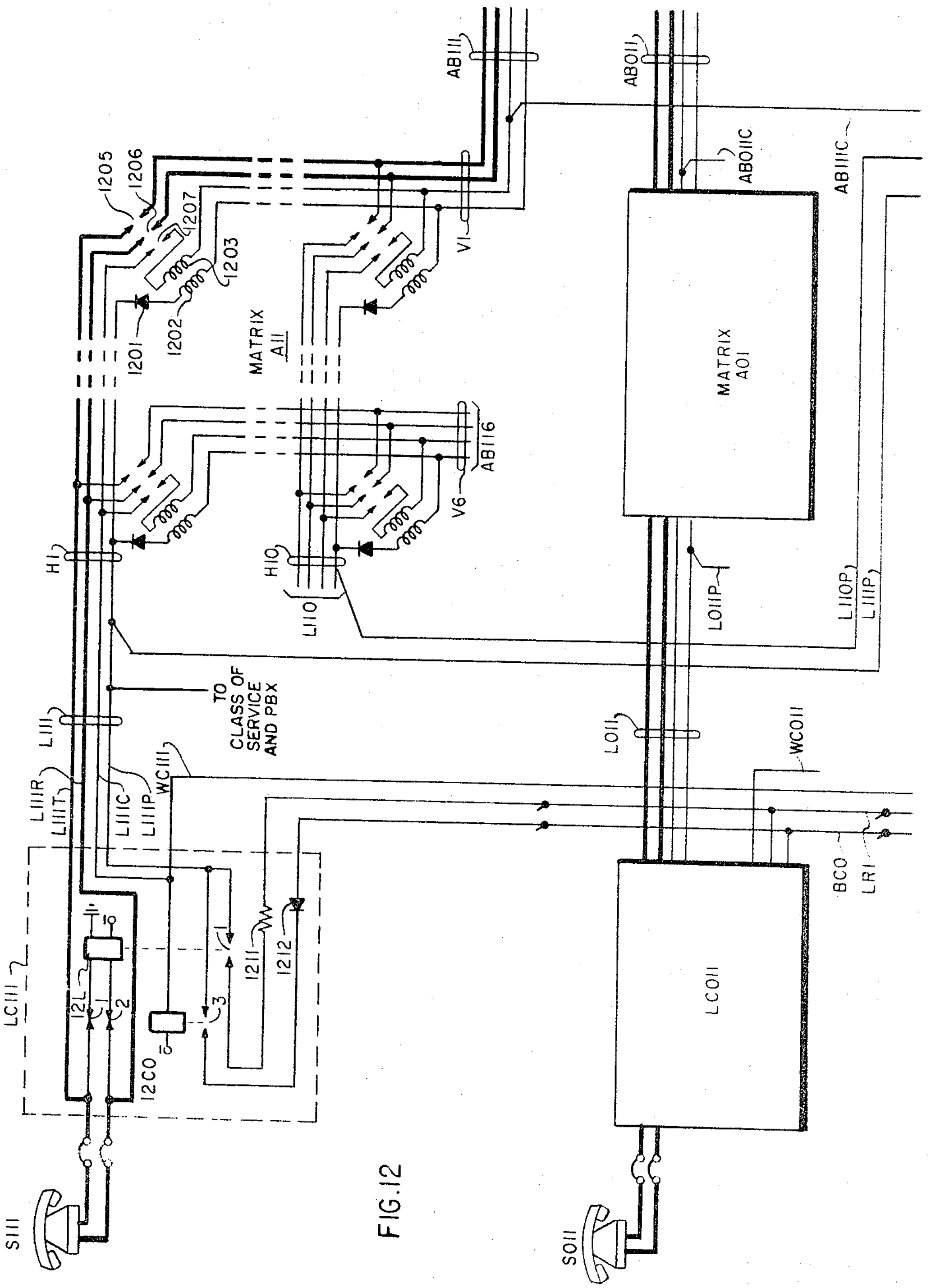
Figure 13:
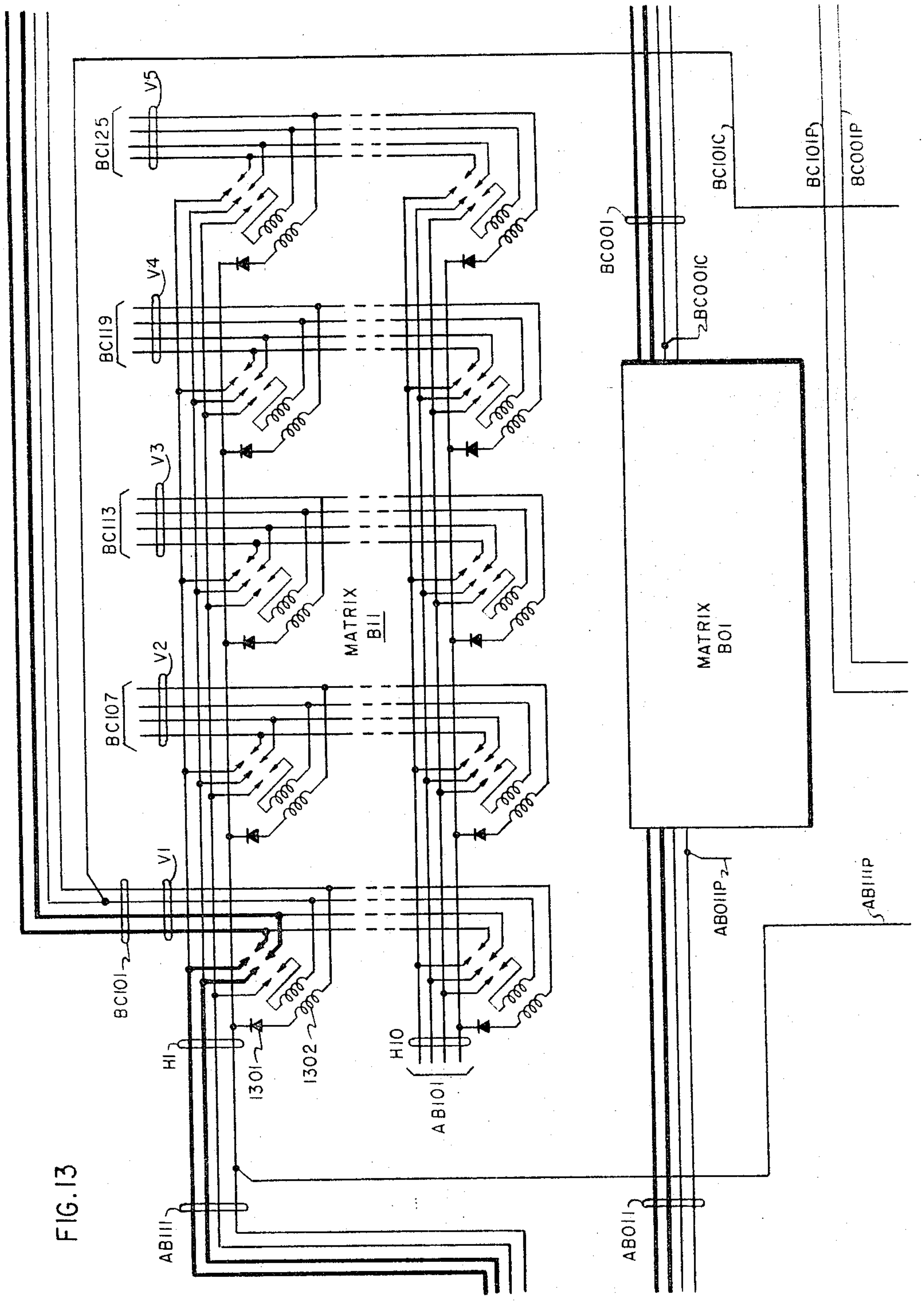
Figure 14:
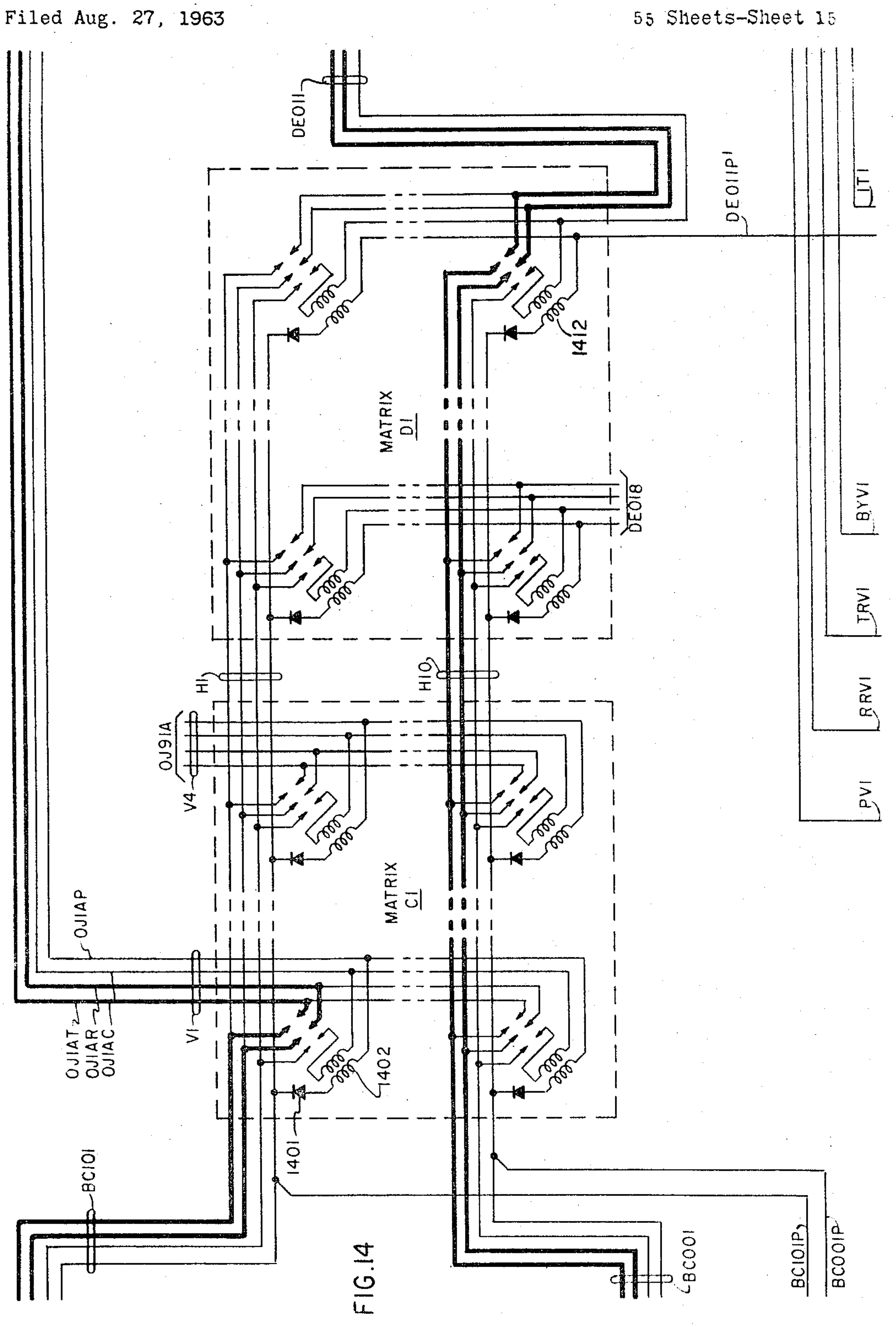
Figure 15:
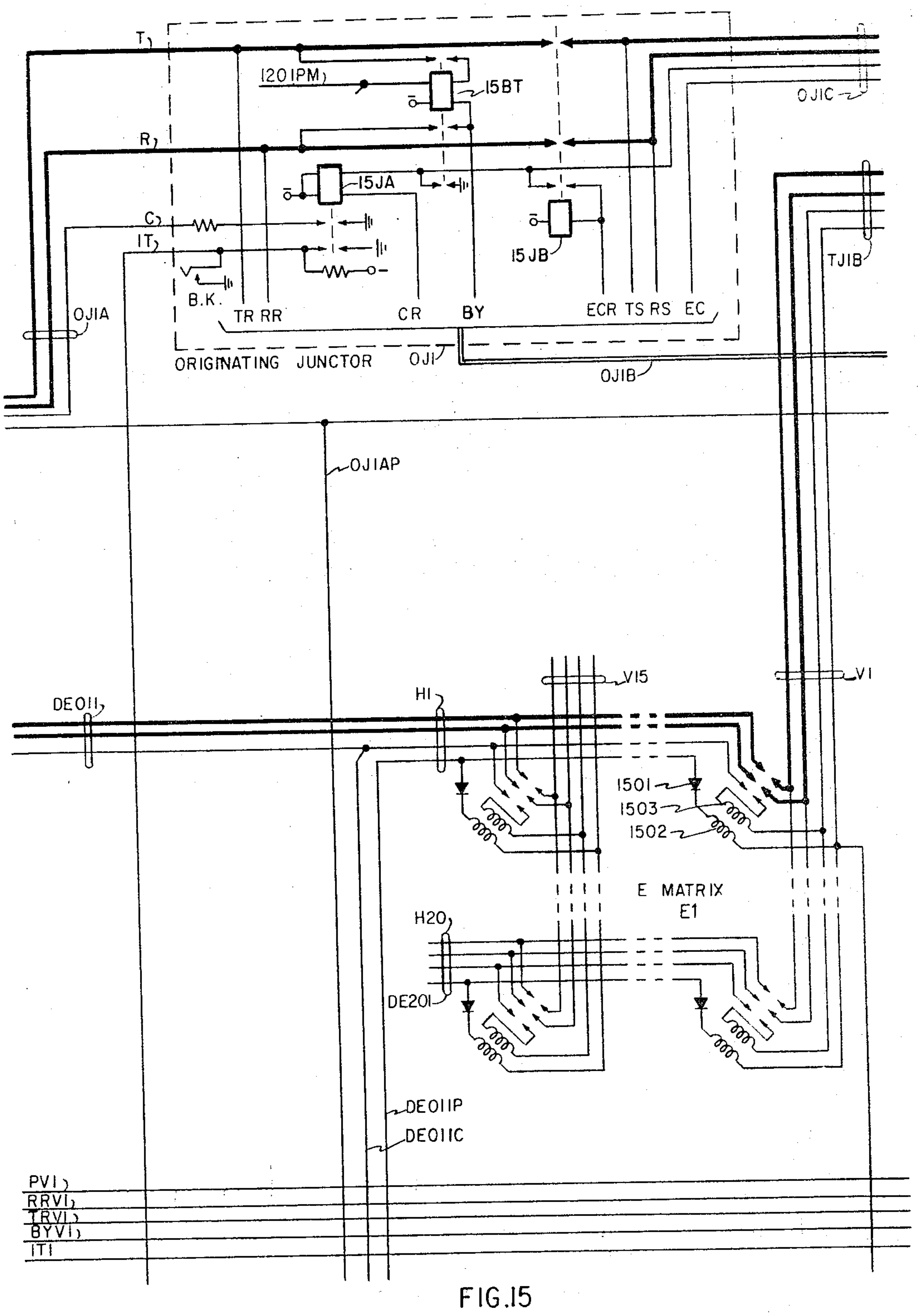
Figure 16:
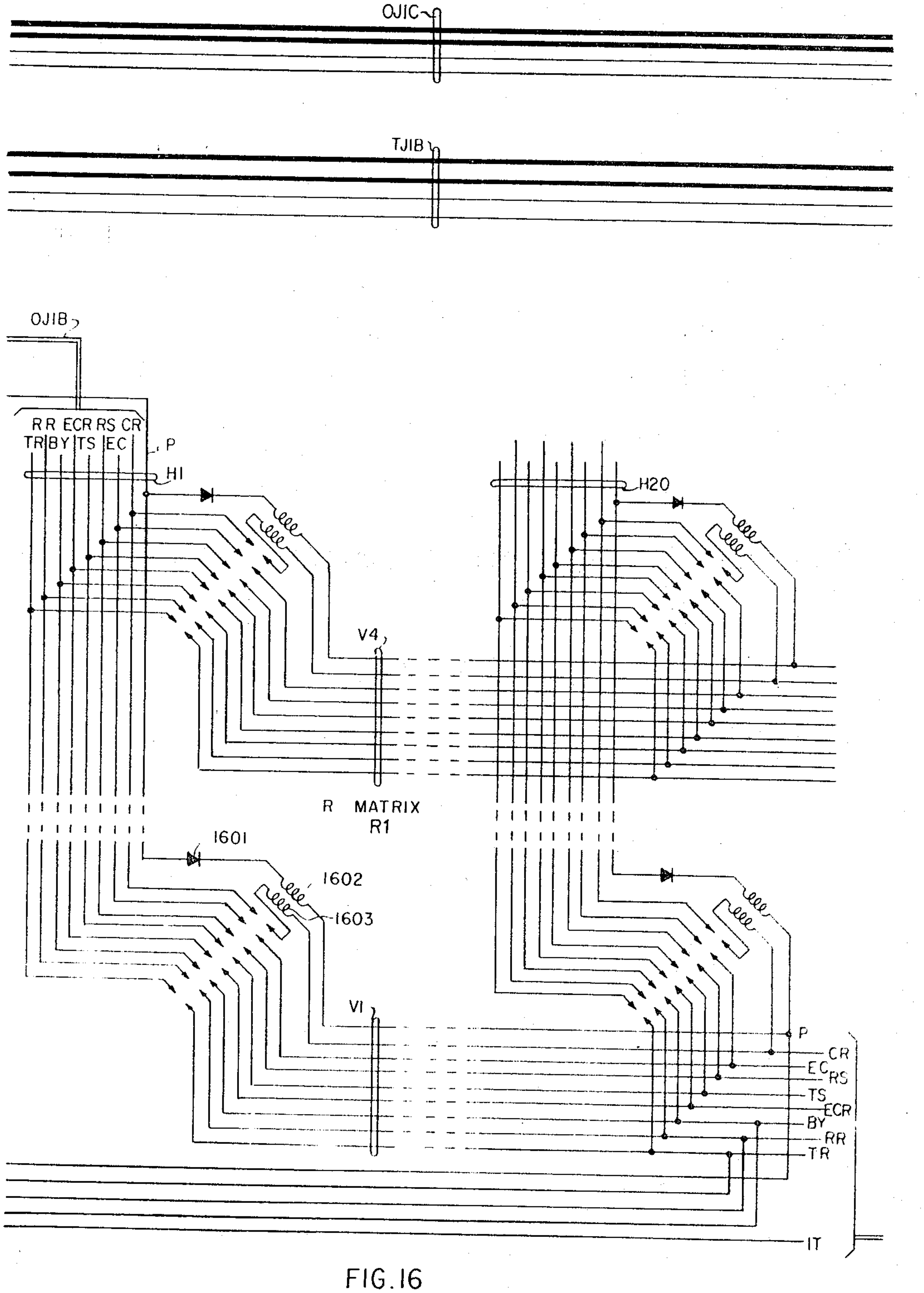

Ground through contacts of relay 27AZ and contacts of relay 27J1 and 27K1, thence through contacts of the group relay 27GE1 extends to the terminating junctor to operate the relay 17TJS. The tip and ring conductors of the communication path which have been extended from the sender through the originating junctor and the selector, are extended through contacts of relay 17TJS to leads TC and RC to the transceiver of the send receive circuit 280 (FIGS. 2, 33 and 41).

Control of the transceiver for receiving the called line number occurs during states S16, S17 and S18. The sequence circuit cycles through these three states for each transmission of two digits to the transceiver. A cycle counter whose output designates R states advances each time the sequence enters state S17. This counter is reset to RO during state S15.

A signal ZR indicates that the shift register has all zeros, and is thus ready for information. Gates 3692 and 3694 supply the signal PS16=S15 TJ ZR RO 2W.

COMMAND: PS16
ENTER STATE S16 RO

A "pattern" of ones and zeros is now loaded into the terminating shift register of the send receive circuit 280, and a signal WUZ from gate 4207 indicates the correct loading thereof.

COMMAND: S16 RO WUZ
ENTER STATE S17 R1

The "pattern" is now transmitted by the transceiver to the sender in the register-sender group as an instruction to commence sending. A signal ZR indicates that the shift register has all zeros, meaning that sending is completed.

COMMAND: S17 R1 ZR
ENTER STATE S18 R1

The hundreds and tens digits are now received by the transceiver into the shift register. When the prefix bit has been received, a signal PR is generated. If there is correct odd-even parity signal PARG is true.

COMMAND: S18 R1 PR PARG $\overline{\text{HT}}$
ENTER STATE S19 R1

The information from the shift register is loaded into a buffer store in send-receive circuit 280, and a signal HT from gate 4320 made true. The erase flip-flop ER is then set.

COMMAND: S19 R1 HT
SET ER

The shift register is erased and the signal ZR generated, causing gates 3693 and 3694 to produce PS16=ER ZR.

COMMAND: PS16
ENTER STATE S16 R1
COMMAND: ZR ER
RESET ER

The shift register is now loaded with a combination indicating "incomplete," after which a signal (INC+RESEND) from gate 4210 is true.

COMMAND: S16 R1 INC
ENTER STATE S17 R2

The instruction "incomplete" is transmitted to the sender, with the end of the transmission indicated by signal ZR.

COMMAND: S17 R2 ZR
ENTER STATE S18 R2

The units and party digit are now received, causing the send-receive circuit to produce a signal UP. The signals PR and PARG also again become true when reception is complete. A signal PBX is true or false according to whether or not the call is to a PBX group. Assume that this is not a PBX call.

COMMAND: S18 R2 PR PARG UP $\overline{\text{PBX}}$
ENTER STATE S20

The called line identification is now complete. We are assuming that the call is to line L011. Relays 29H0 and 29T1 were operated during state S19 R1, and relay 28U1 now operates, via signals on leads HT0, TT1, and UT1 from send-receive circuit 280. These relays return signals HX, TX, and UX to the sequence circuits. Lead L011P is connected via a path (not shown) through contacts (not shown) of relay 22LS10 to lead LS1 and thence through contacts of relay 28U1. This connection extends through contacts of relay 28HJ, a diode, and resistor 2811 to lead LD–0, for making the busy test.

*Called line idle*

If the called line is idle, negative 16 volts on lead LD–0 makes signal BSY false at gates 3531–3533.

COMMAND: S20 $\overline{\text{BSY}}$ HX TX UX W
ENTER STATE S21

If one or more of the six AB links to the called line is idle, the corresponding one or more of the relays 30AB1–30AB6 remains unoperated and signal LNK is true.

COMMAND: S21 LNK 2W
ENTER STATE S22

The route search is now made in the same manner as in state S8 for an originating call, using the same route scanner 3103 and 3104, except that instead of inputs J1–J20, inputs D1–D20 are used. These leads extend to the horizontal "C" leads of E matrix E1, via contacts of relays 26GE1 and 26LGH; and are used to test the DE links. If a route is found signal OTR from unit 3104 becomes true.

COMMAND: S22 OTR
ENTER STATE S23

The connection is now ready to be established. Relay drivers 2801 and 2802 are normally operated. Relay driver 2803 is operated during states S20 to S24 inclusive to disconnect the inputs of the units scanner at contacts of relay 29UP. Relay drivers 2807, 3150, 3554, and 3417 associated with leads LA, CDP, KKK and TPL operate now as we enter state S23. The pull path is established from negative battery through resistor 2804 and relay driver contacts to lead LS1, thence through contacts of relay 22LG and contacts (not shown) of relay LS01 to the horizontal P conductor of matrix A01 then through the pull windings of matrices A01 and B01 to the P conductor of link BC001, thence through the pull winding 1412 of matrix D1 to the conductor DE011P'. Negative battery at relay driver 3332 to lead TPL is also extended through contacts of relays 27J1, 27K1 and 27GE1 to the P conductor of the first vertical link of E matrix E1, thence through pull winding 1502 and its associated diode to lead DE011P. The two leads DE011P and DE011P' are extended in FIG. 26 through contacts of relay 26GE1, and thence through contacts of relay 27LU1 to the conductor PT1 and through contacts of relay 31PT1 to ground at contacts of relay driver 3150. The crosspoints then operate in matrices A01, B01, and D1 in series; and also in matrix E1 to establish the path. The path is held by ground on the C lead and a terminating junctor via line TJ1B and the hold windings of the four matrices E1, D1, B01, and A01, and the cutoff relay of line circuit LC011 in series.

A code designating the party, or other information regarding the call, is transmitted from the send receive circuit 280 via leads A, B, C and D to the terminating junctor.

Operation of the cutoff relay extends ground from lead BCO to the pull lead L011P, which is connected to lead LD–0 in FIG. 28. This makes signal BSY true.

COMMAND: S23 2W BSY
ENTER STATE S24

COMMAND: S24 BSY W $\overline{\text{TRX}}$
SET ER

The terminating shift register of send-receive circuit 280 is erased and signal ZR becomes true. PS16=ER ZR.

COMMAND: P16
ENTER STATE S16 R2
COMMAND: ER ZR
RESET ER

An instruction "idle" is loaded into the shift register, making ZR false.

COMMAND: S16 R2 $\overline{\text{ZR}}$ $\overline{\text{PBXO}}$
ENTER STATE S17 R3

The instruction "idle" is transmitted to the sender, and ZR becomes true.

COMMAND: S17 R3 ZR W $\overline{\text{PBXO}}$
ENTER STATE S29

The locking relays operate to release the marker, as on an originating call.

*Called number designates PBX group*

A call to a PBX group proceeds as other terminating calls until the called number is completely received in state (S18 R2); and the send-receive circuit generates signal PBX.

COMMAND: S18 R2 PR PBX UP PARG
ENTER STATE S25

The PBX group circuits in FIGS. 20 and 28 are now used. An arrangement is provided for placing negative potential on the horizontal P conductors of all of the idle line circuits of a group. A jumper field 2010 having input leads through contacts of a relay 20PA1, and output leads to thirty-six relays AX1–AX36 is provided. If additional facilities are required, one or two additional jumper fields with inputs through contacts of respective relays 20PA2 and 20PA3 (not shown) and their own output grouping relays may be provided. For each PBX group one of the twenty-five input terminals of jumper field 2010 is used and is jumpered to one or more of the thirty-six output terminals. Each of the relays 20AX1–20AX36 may have a number of contacts, for example relay AX1 has nine contacts connected through respective resistors to the leads X1–X9, and relay 20AX36 has three contacts extending through respective resistors to the leads X238–X240. Negative battery potential is applied to all of these contacts through a resistor 2002 and contacts of relay 20LGH. The P conductors of the line circuits are connected from the horizontal P terminals of the A matrices to respective ones of the conductors X1–X240 as required to provide the PBX grouping. The called number code for the PBX group includes a signal on lead PB1X which through contacts of relay 20LF1 operates relay 20PA1, or a signal on a corresponding one the other leads (not shown) to operate a corresponding relay, for the other jumper fields. A signal on one of the leads PA1–PA5 operates one of the relays 28PA1–28PA5; and a signal on one of the leads PH1–PH5 is extended through the contacts of the operated last mentioned relay to one of the conductors PM1–PM25 thence through contacts of relay 20LF1 and relay 20PA1 and through the jumper field 2010 to operate the relay or relays for that PBX group. The negative potential from resistor 2002 is now connected to the P leads at the line circuits of all lines of the group. However for busy lines of the group, the P lead is maintained at ground potential through contacts of the cutoff relay to lead BCO. For the idle lines, the negative potential on the P lead appears to be an originating call request, and signal OC is generated in the allotter, in the same manner as explained at the beginning of an originating call. Gates 3410 and 3417 and relay driver 3422 place ground on lead LR in states S25 to S28 inclusive, and operates relay 21LR to disconnect negative potential from lead LR1, and substitute ground potential; which makes lines having actual call requests look busy.

The line identifier scanners 2903, 2902 and 2901 are reset respectively to hundreds digit "1," tens digit "1," and units digit "1."

COMMAND: S25 OC 2W
ENTER STATE S26

In states S26, S27 and S28 the line identifier operates in the same manner as in states S3, S5 and S7 to identify hundreds, tens and units.

COMMAND: S26 HX OC W
ENTER STATE S27
COMMAND: S27 TX 2W
ENTER STATE S28
COMMAND: S28 UX W $\overline{\text{SPL}}$
ENTER STATE S21

There is now operated one of relays 29H1–29H0, one of relays 29T1–29T0, and one of relays 28U1–28U0; identifying the selected idle line of the PBX group. The call now proceeds as for other terminating calls.

*Busy conditions*

On either an ordinary or a PBX call, various busy conditions or link blockages can occur. In each such instance the erase flip-flop ER is set, and the sequence advanced to state S16. On a PBX call the overflow flip-flop PX0 is first set.

COMMAND: S25 $\overline{\text{OC}}$ 2W
+S26 $\overline{\text{OC}}$ W
SET PX0
COMMAND: S20 W BSY $\overline{\text{SPL}}$ $\overline{\text{RLB}}$
+S21 $\overline{\text{LNK}}$ 2W
+S22 $\overline{\text{OTR}}$ LL
+S25 PX0 5W
+S26 PX0 5W
SET ER
PS16=ER ZR
COMMAND: PS16
ENTER STATE S16 R2
COMMAND: S16 R2 $\overline{\text{ZR}}$ (PX0 5W+$\overline{\text{PX0}}$)
ENTER STATE S17 R3
COMMAND: S17 R3 ZR (W $\overline{\text{PX0}}$+5W $\overline{\text{PX0}}$)
ENTER STATE S29

In each case an instruction is loaded in state S16 R2 into the terminating shift-register and transmitted in state S17 R3 to the sender in the register-sender group. In state S20 the called line itself is tested and the signal BSY indicates that it is busy; so the instruction transmitted indicates "busy." In state S21 the signal $\overline{\text{LNK}}$ means that all AB links to the called line A matrix are busy and therefore no route is possible; so the instruction transmitted indicates "trunk busy." In state S22 the signal $\overline{\text{OTR}}$ means that no route is available between the particular terminating junctor and the called line, but there may be one from another terminating junctor; so the instruction is "resend." This causes the sender to make a new attempt to complete the call.

In states S25 and S26 the signal $\overline{\text{OC}}$ means that there is no idle line in the PBX group, which causes flip-flop PX0 to be set to record the overflow condition, and flip-flop ER is set in response to the signal PX0. The instruction transmitted is "busy."

In each case the marker releases after the instruction is transmitted.

To illustrate the typical electronic building blocks, FIG. 51 shows in schematic form part of the tens scanner 2902 of FIG. 45.

The gated pulse amplifier 4502 comprises four transistors in a circuit arrangement having four input leads and one output lead. The upper input lead designated GP is the pulse input. The second and third inputs designated *a* and *b* to respective diodes form an AND gate for D.C. input control signals. The lower input designated *c* is for a single direct current control input. Thus the gate is enabled with true (negative potential) signals at inputs *a* and *b* in coincidence, or by a single input *c*. When the gated pulse amplifier is in the enabled condition the pulses at input GP, in this case the pulse train PA, are gated through and amplified to the output lead.

The flip-flop T1 of counter 4501, designated 4501(T1) in FIG. 51, comprises four transistors. As drawn in FIG. 51, the lower output lead is the "one" output, and the upper lead is the "zero" lead on the right hand side of the flip-flop. At the left hand side the four input pulse coincidence gates are shown. Each of these gates has an A.C. input via a capacitor and a D.C. input via a resistor. Each D.C. input has a negative potential biasing arrangement. The two upper coincidence gates are connected through respective diodes forming an OR gate to the set input of the flip-flop. The two lower coincidence gates are connected through respective diodes to the reset input of the flip-flop. With the biasing arrangement as shown, unused inputs may be left open circuited. However if it is desired to protect against stray transient pulses the unused D.C. inputs may be grounded to disable them.

FIG. 51 shows how the AND gate function supplied by gate 4541 in FIG. 45 may be implemented by means of a NOR gate 4541′. Using a NOR gate for the AND function requires that each of the input signals be inverted. Thus the inverter 4531 of FIG. 45 is omitted and gate 4521 is connected directly to an input of gate 4541′. Also instead of the inputs T1–0 and T5–0 to AND gate 4541, we use the inputs T1–1 and T5–1 to NOR gate 4541′.

The NOR gate 4541′ comprises a single transistor with resistance input circuits to the base electrode. The collector bias potential is supplied by the succeeding circuit through a resistor to a negative 16-volt source. The emitter electrode is grounded.

The OR gate 4504 of FIG. 45 is shown implemented in FIG. 51 by a NOR gate 4504A followed by an inverter 4504B. The inverter 4504B is similar to a NOR gate except that it has only a single input. Gates 4504A and 4541′ show how with an OR function followed by an AND function the inverters may be omitted even though NOR gates are used for the functions.

The reed relay driver circuit 2921 comprises a transistor circuit with a relay winding in series with its collector electrode. This winding operates a single contact not shown in FIG. 51.

The gate 4521 is an example of the detecting type NOR gates designated by T. This gate is similar to a NOR gate except that there is no connection to the negative bias source at the input terminals. It is necessary that these detector gates always have one of the inputs connected to ground. Input leads having negative potential on them from the circuits being tested cause the transistor to operate and connect ground potential from the emitter to the collector electrode for use by the succeeding gate. If one of the input leads is at ground potential and all of the others are either open circuit or ground potential, the transistor remains in the cutoff condition.

While the principles of the invention have been described in connection with specific apparatus, it is to be clearly understood that this description is made only by way of example and not as a limitation to the scope of the invention. Patent No. 3,170,041 by K. K. Spellnes, for Communication Switching System, issued February 16, 1965, covers features of the switching system described herein, and in columns 33–35 thereof lists other related patent applications, all owned by the same assignee, some of which claim features disclosed herein. This list is made a part hereof as though fully set forth.

What is claimed is:

1. Marker apparatus for a communication switching system to select paths and establish connections between a first set of terminals and a second set of terminals through a plurality of switching stages arranged in tandem between terminals of the first set and terminals of the second set, each of said stages comprising a plurality of relays arranged in coordinate arrays, each relay having an operate winding and a hold winding, with a unidirectional device individual to each of said relays and connected in series with the operate winding thereof, at the coordinate points of each of said arrays, each relay having a normally open set of its own contacts connected in series with its hold winding, there being links interconnecting adjacent stages, each link including an operate conductor interconnecting the series combination of the operate winding and unidirectional device and a hold conductor interconnecting the series combination of the hold winding and normally open contacts of a relay in each of the adjacent stages, busy links having the hold path contacts closed at each end and having holding current flowing through the hold windings so that a given potential appears on the hold conductor;

said marker apparatus comprising an arrangement for selecting a group of possible links for a given connection and for connecting the hold conductors thereof to individual inputs of a detecting arrangement, means in the detecting arrangement to distinguish between the circuit condition on an idle link and the said potential on a busy link hold conductor, a route selector comprising a scanning arrangement having counting means and coincidence checking means, with connections from the counting means and the detecting arrangement to the coincidence checking means, means to produce a path-found signal from the coincidence checking means responsive to the counting means being in a position corresponding to a path via idle links, means for applying a first marking potential to the terminal of the first set and a second marking potential to the terminal of the second set of the selected path which produces a potential difference in the forward direction of said unidirectional devices between the two selected terminals through a series path including the operate winding of one coordinate point relay of each of said stages, which causes said relays in the path between the selected terminals to operate and thereby establish a communication path, a holding circuit being then completed in series through the hold windings and said series contacts of the relays in the established path, and means effective subsequent to the establishment of the holding path for removing said marking potentials and thereby open the operate circuit.

2. Marker apparatus as claimed in claim 1, which includes an arrangement for identifying one terminal of the first set, and an arrangement for defining a group of terminals of the second set to which a given connection may be established;

wherein each of said stages comprises a plurality of coordinate matrices, with any terminal of the first set connectible through one matrix of a first stage to M first-second stage links extending to M different matrices of a second stage, with each of these M links connectible through the second stage to N second-third stage links, so that any terminal of the first set is connectible to $M \times N$ second-third stage links, each of which extends to a different third stage matrix, each terminal of said defined group of the second set being associated with a different one of the third-stage matrices and connectible through it to one of these second-third stage links;

means to connect the hold conductors of the M first-second stage links which are connectible to the identified terminal of the first set to individual detector-arrangement inputs, means responsive to the detection of a busy first-second stage link to apply a potential to the hold conductors of the N second-third stage links connectible thereto which is equivalent to the potential on a busy second-third stage link hold conductor, to thereby block the selection of a path including one of these links.

3. Marker apparatus as claimed in claim 2, wherein said coincidence checking means comprises a number of coincidence gates equal to the number of terminals in said defined group of the second set, each gate having an input which shows the busy-idle state of one terminal of the defined group, one input which shows the availability of the corresponding second-third stage link, and an input for a corresponding state of the counting means, means including a source of pulses to step the counting means to thereby enable the coincidence gates in turn one at a time until coincidence is found to generate said path-found signal, means responsive to the path-found signal to stop the counting means so that the position of the counting means corresponds to the path found.

4. Marker apparatus as claimed in claim 1, which includes an arrangement for identifying one terminal of the first set, and an arrangement for defining a group of terminals of the second set to which a given connection may be established;

wherein each of said stages comprises a plurality of coordinate matrices, with any terminal of the first set connectible through one matrix of a first stage to M first-second stage links extending to M different matrices of a second stage, with each of these M links connectible through the second stage to N second-third stage links, so that any terminal of the first set is connectible to $M \times N$ second-third stage links, each of which extends to a different third stage matrix, each terminal of said defined group of the second set being associated with a different one of the third-stage matrices and connectible through it to one of these second-third stage links;

means to connect the hold conductors of the M first-second stage links which are connectible to the identified terminal of the first set to individual detector-arrangement inputs;

wherein said coincidence checking means comprises a number of coincidence gates equal to the number of terminals in said defined group of the second set, each gate having inputs which show the busy-idle state of one terminal of the defined group, the availability of the corresponding second-third stage link, the availability of said M first-second stage links connectible to the identified terminal of first set and a corresponding state of the counting means;

means including a source of pulses to step the counting means to thereby enable the coincidence gates in turn one at a time until coincidence is found to generate said path-found signal, means responsive to the path-found signal to stop the counting means so that the position of the counting means corresponds to the path found.

5. Marker apparatus as claimed in claim 4, wherein there is a third set of terminals and a fourth switching stage comprising a plurality of coordinate matrices between the second and third sets of terminals, said defined group of terminals in the second set being those connected to one matrix of the fourth stage, and said arrangement for defining the group comprises means to identify one terminal of the third set for the given connection, so that the defined group is the terminals of the second set connected to the same fourth-stage matrix as the identified terminal of the third set, said arrangement comprising scanning means having counting means and coincidence checking means.

6. Marker apparatus as claimed in claim 5, wherein the number of terminals in said defined group of the second set is less than $M \times N$, means effective in accordance with the identity of the fourth-stage matrix to which the identified terminal of the third set is connected to connect only those second-third links to the detecting arrangement which extend to third-stage matrices having connections to terminals of the second set in the defined group.

7. Marker apparatus as claimed in claim 5, wherein the given connection is for a terminating call from a terminal of the third set to a terminal of the first set, and wherein said means to identify one terminal of the third set comprises a terminating call selector having a scanning arrangement with counting means and coincidence checking means, and means to drive the counting means until a terminal of the third set is found having a call request.

8. Marker apparatus as claimed in claim 5, wherein the given connection is for an originating call from said terminal of the first set, and said terminals of the third set are associated with registers, and wherein said means to identify one terminal of the third set comprises a register selector having a scanning arrangement with counting means and coincidence checking means, means to drive the counting means until an idle terminal of the third set is found the route selector being actuated after this selection of a terminal of the third set and the identification of the terminal of the first set; means in the route selector responsive to the scanning of all paths to the defined group of second terminals without finding coincidence to produce a signal which advances the counting means of the register selector and causes the scan to continue to select a terminal of the third set connected to a different fourth-stage matrix, thereby defining another group of terminals of the second set for another scan by the route selector.

9. Marker apparatus as claimed in claim 8, wherein the register selector continues to be actuated to scan each time the route selector scans the defined group without finding coincidence, and means to count each time the register selector is thus actuated and to produce a signal responsive to a count showing that scans have been made for all fourth-stage matrices, for use to generate an all-routes-busy indication and to release the marker apparatus.

10. Marker apparatus as claimed in claim 8, wherein there is another set of terminals for terminating calls, and a terminating switching stage comprising a plurality of coordinate matrices betwen the last said terminals and terminals of the second set;

a terminating call selector having a scanning arrangement with counting means and coincidence checking means, means responsive to a terminating-call service request to drive the counting means for a first scan to identify a matrix of the terminating switching stage on which the call appears, means effective in accordance with the position of the counting means to connect the terminals of the identified matrix via detecting means to the coincidence checking means, and to drive the counting means for a second scan to identify a particular terminal of the terminating-call set which is requesting service;

the terminal of the first set which is being called being also identified, and the route selector being then actuated to find a path to complete the connection.

11. Marker apparatus as claimed in claim 10, wherein said scanners comprise transistor circuits for the counting means and coincidence checking means, and the means to connect the links to the detecting arrangement comprise relay trees which are operated in accordance with the position of the counters of completed scans.

12. Marker apparatus to select paths and establish connections in a communication switching system through a plurality of switching stages arranged in tandem between terminals of a first set and terminals of a second set, there being links interconnecting adjacent stages;

said marker apparatus comprising an arrangement to select groups of possible links between different stages for a given connection and to connect them to individual inputs of a detecting arrangement, means in the detecting arrangement to distinguish between idle links and busy links;

a route selector comprising a scanning arrangement having counting means and coincidence checking means, with connections from the counting means and the detecting arrangement to the coincidence checking means, means to produce a path-found signal responsive to the counting means being in a position corresponding to a path having an idle link at each stage, and means responsive to said signal to stop the counting means so that its portion corresponds to the path selected.

13. Marker apparatus as claimed in claim 12, wherein a connection is to be made from a given terminal of the first set to any idle terminal of the second set;

a second-set selector having a scanning arrangement with counting means and coincidence checking means, means to drive the counting means until an idle terminal of the second set is found;

the route selector being actuated after this selection of a terminal of the second set and identification of the terminal of the first set; means in the route selector responsive to the scanning of all paths to the selected terminal of the second set without finding coincidence to produce a signal which advances the counting means of the second-set selector and causes the scan to continue to select a terminal of the second set accessible via different interstage links, and means to then again actuate the route selector for a scan of the different paths.

14. Marker apparatus as claimed in claim 13, wherein the second-set selector continues to be actuated to scan each time the route selector scans a group of paths to a second-set terminal without finding coincidence, and means to count each time the second-set selector is thus actuated and to produce a signal responsive to a count showing that scans have been made of all paths from the given terminal of the first set, for use to generate an all-routes-busy indication and to release the marker apparatus.

No references cited.

KATHLEEN H. CLAFFY, *Primary Examiner.*

WILLIAM C. COOPER, *Examiner.*